United States Patent [19]

Nielsen et al.

[11] Patent Number: 5,509,959
[45] Date of Patent: Apr. 23, 1996

[54] PRECURSOR COATING COMPOSITIONS SUITABLE FOR SPRAYING WITH SUPERCRITICAL FLUIDS AS DILUENTS

[75] Inventors: Kenneth A. Nielsen, Charleston; Charles W. Glancy, South Charleston, both of W. Va.

[73] Assignee: Union Carbide Chemicals & Plastics Technology Corporation, Danbury, Conn.

[21] Appl. No.: 684,490

[22] Filed: Apr. 15, 1991

Related U.S. Application Data

[63] Continuation of Ser. No. 327,484, Mar. 22, 1989, abandoned.

[51] Int. Cl.$^6$ .................. C09D 5/00; C09D 201/00
[52] U.S. Cl. .................. 106/287.35; 106/203; 106/208; 106/236; 106/237; 106/239; 106/285; 106/287.23; 106/287.20; 106/287.25; 106/287.26; 106/287.28; 523/1; 523/340; 524/1; 524/80; 524/81; 524/259; 524/315; 524/317; 524/356; 524/366; 524/377; 524/379; 524/462; 524/464; 524/474; 524/476; 524/481; 524/484
[58] Field of Search .................. 106/201, 208, 106/236, 237, 239, 285, 287.23, 287.24, 287.25, 287.26, 287.28, 287.35; 523/340; 524/1, 80, 81, 259, 315, 317, 356, 366, 377, 379, 462, 464, 474, 476, 481, 484

[56] References Cited

U.S. PATENT DOCUMENTS

| | | | |
|---|---|---|---|
| 3,951,899 | 4/1976 | Steiner | 427/331 |
| 4,124,528 | 11/1978 | Modell | 352/411 |
| 4,189,914 | 2/1980 | Marek et al. | 60/726 |
| 4,375,387 | 3/1983 | deFilippi et al. | 210/54 |
| 4,578,285 | 3/1986 | Viola | 427/209 |
| 4,582,731 | 4/1986 | Smith | 427/421 |
| 4,619,735 | 10/1986 | Norton | 162/135 |
| 4,680,204 | 7/1986 | Das | 427/407.1 |
| 4,734,227 | 3/1986 | Smith | 264/13 |
| 4,734,451 | 3/1986 | Smith | 524/493 |
| 4,737,384 | 4/1988 | Murthy et al. | 407/369 |
| 5,165,969 | 11/1992 | Bartlett et al. | 427/421 |
| 5,290,504 | 3/1994 | Milkovich et al. | |

FOREIGN PATENT DOCUMENTS

| | | |
|---|---|---|
| 2603664 | 8/1977 | Germany. |
| 2853066 | 6/1980 | Germany. |
| 55-84328 | 6/1980 | Japan. |
| 58-168674 | 10/1983 | Japan. |
| 59-16703 | 1/1984 | Japan. |
| 62-152505 | 7/1987 | Japan. |
| 868051 | 4/1988 | South Africa. |

OTHER PUBLICATIONS

Francis, A. W., "Ternary Systems of Liquid Carbon Dioxide", J. Phys. Chem. 58:1099, (Dec., 1954).

Smith, R. D., et al., "Direct Fluid Injection Interface for Capillary Supercritical Fluid Chromatography–Mass Spectrometry" J. Chromatog. 247(1982):231–243.

Krukonis, V., "Supercritical Fluid Nucleation of Difficult-to-Comminute Solids", paper presented at 1984 Annual Meeting, AIChE, San Francisco, California, (Nov. 25–30, 1984.).

Dandage, D. K., et al., "Structure Solubility Correlations: Organic Compounds and Dense Carbon Dioxide Binary Systems", Ind. Eng. Chem. Prod. Res. Dev. 24: 162–166 (1985).

Matson, D. W., et al., "Production of Powders and Films by the Rapid Expansion of Supercritical Solutions", J. Materials Science 22: 1919–1928 (1987).

(List continued on next page.)

Primary Examiner—David Brunsman
Attorney, Agent, or Firm—M. N. Reinisch

[57] ABSTRACT

The present invention relates to precursor coating compositions which are particularly suitable for being admixed with at least one supercritical fluid used as a viscosity reduction diluent and then spraying this resultant liquid mixture of supercritical fluid and precursor coating composition onto a substrate to be coated.

**32 Cla

OTHER PUBLICATIONS

McHugh, M. A. et al., "Supercritical Fluid Extraction, Principles and Practice", Butterworth Publishers (1986) Contents and Appendix.

Cobbs, W. et al., "High Solids Coatings Above 80% By Volume", Water–Borne & High Solids Coatings Symposium, (Mar. 1980).

Matson, D. W. et al., "Production of Fine Powders by the Rapid Expansion of Supercritical Fluid Solutions", Advances in Ceramics, vol. 21, pp. 109–121 (1987) No Month Avail.

Kitamura, Y., et al., "Critical Superheat for Flashing of Super–heated Liquid Jets", Ind. Eng. Chem. Fund. 25:206–211 (1986) No Month Avail.

Petersen, R. C. et al., "The Formation of Polymer Fibers From the Rapid Expansion of SCF Solutions" Pol. Eng. & Sci. (1987) No Month Avail. V. 27 p. 1693.

Doolittle, "The Technology of Solvents and Plasticizers," Library Congress Catalog Number: 54–9035, (1954) No Month Avail, pp. 354–355.

Jacobs, et al., "Chemical Analysis of Industrial Solvents," Interscience Publishers, Inc., N.Y., Interscience Publishers LTD., London, (1953) No Month Avail, pp. 38–45.

Mellan, "Industrial Solvents," Reinhold Publishing Corp., (1944) No Month Avail, pp. 58–61.

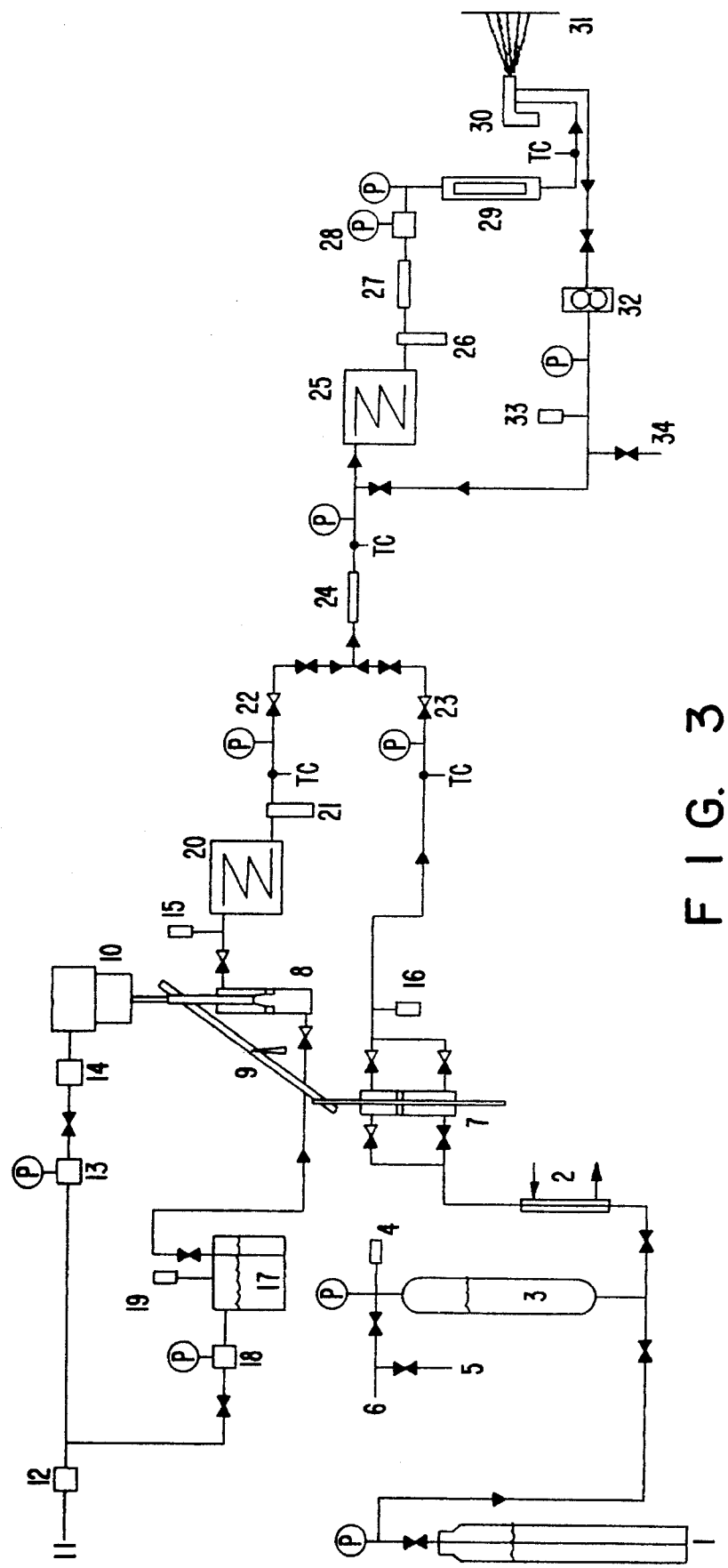
F I G. 3

PRECURSOR COATING COMPOSITIONS SUITABLE FOR SPRAYING WITH SUPERCRITICAL FLUIDS AS DILUENTS

This application is a Continuation of prior U.S. application: Ser. No. 327,484 Filing date Mar. 22, 1989 now abandoned.

RELATED PATENT APPLICATIONS

This application contains subject matter related to application Ser. No. 133,068, filed Dec. 21, 1987, which application is a continuation-in-part of application Ser. No. 883,156, filed Jul. 8, 1986, now abandoned. This application also contains subject matter related to U.S. patent applications Ser. No. 218,896, filed Jul. 14, 1988; and Ser. No. 218,910, filed Jul. 14, 1988.

FIELD OF THE INVENTION

This invention, in general, pertains to the field of coating compositions. More specifically, the present invention relates to precursor coating compositions which are particularly suitable for being admixed with at least one supercritical fluid used as a viscosity reduction diluent. The resultant admixed liquid mixture of supercritical fluid and precursor coating composition can then be sprayed onto a substrate to be coated.

BACKGROUND OF THE INVENTION

Prior to the present invention, the liquid spray application of coatings, such as lacquers, enamels and varnishes, was effected solely through the use of organic solvents as viscosity reduction diluents. However, because of increased environmental concern, efforts have been directed to reducing the pollution resulting from painting and finishing operations. For this reason there has been a great deal of emphasis placed on the development of new coatings technologies which diminish the emission of organic solvent vapors. A number of technologies have emerged as having met most but not all of the performance and application requirements, and at the same time meeting emission requirements and regulations. They are: (a) powder coatings, (b) water-borne dispersions, (c) water-borne solutions, (d) non-aqueous dispersions, and (e) high solids coatings. Each of these technologies has been employed in certain applications and each has found a niche in a particular industry. However, at the present time, none has provided the performance and application properties that were initially expected.

Powder coatings, for example, while providing ultra low emission of organic vapors, are characterized by poor gloss or good gloss with heavy orange peel, poor distinctness of image gloss (DOI), and poor film uniformity. Moreover, to obtain even these limited performance properties generally requires excessive film thicknesses and/or high curing temperatures. Pigmentation of powder coatings is often difficult, requiring at times milling and extrusion of the polymer-pigment composite mixture followed by cryogenic grinding. In addition, changing colors of the coating often requires its complete cleaning, because of dust contamination of the application equipment and finishing area.

Water-borne coatings are very difficult to apply under conditions of high relative humidity without serious coating defects. These defects result from the fact that under conditions of high humidity, water evaporates more slowly than the organic cosolvents of the coalescing aid, and as might be expected in the case of aqueous dispersions, the loss of the organic cosolvent/coalescing aid interferes with film formation. Poor gloss, poor uniformity, and pin holes unfortunately often result. Additionally, water-borne coatings are not as resistant to corrosive environments as are the more conventional solvent borne coatings.

Coatings applied with organic solvents at high solids levels avoid many of the pitfalls of powder and water-borne coatings. However, in these systems the molecular weight of the polymer has been decreased and reactive functionality has been incorporated therein so that further polymerization and crosslinking can take place after the coating has been applied. It has been hoped that this type of coating will meet the ever-increasing regulatory requirements and yet meet the most exacting coatings performance demands. However, there is a limit as to the ability of this technology to meet the performance requirement of a commercial coating operation. Present high solids systems have difficulty in application to vertical surfaces without running and sagging of the coating. Often, they are also prone to cratering and pin holing of the coating. If they possess good reactivity, they often have poor shelf and pot life. However, if they have adequate shelf stability, they cure and/or crosslink slowly or require high temperature to effect an adequate coating on the substrate.

Clearly, what is needed is an environmentally safe, non-polluting diluent that can be used to thin very highly viscous polymer and coatings compositions to liquid spray application consistency. Such a diluent would allow utilization of the best aspects of organic solvent borne coatings applications and performance while reducing the environmental concerns to an acceptable level. Such a coating system could meet the requirements of shop- and field-applied liquid spray coatings as well as factory-applied finishes and still be in compliance with environmental regulations.

Such a needed diluent has now been found and is discussed in the aforementioned related applications which teach, among other things, the utilization of supercritical fluids, such as supercritical carbon dioxide fluid, as diluents in highly viscous organic solvent borne and/or highly viscous non-aqueous dispersions coatings compositions to dilute these compositions to application viscosity required for liquid spray techniques.

U.S. patent application Ser. No. 133,068, filed Dec. 21, 1987, to Hoy, et al., disclose processes and apparatus for the liquid spray application of coatings to a substrate that minimize the use of environmentally undesirable organic diluents. The broadest process embodiment of that application involves:

(1) forming a liquid mixture in a closed system, said liquid mixture comprising:
   (a) at least one polymeric compound capable of forming a coating on a substrate; and
   (b) at least one supercritical fluid, in at least an amount which when added to (a) is sufficient to render the viscosity of said mixture of (a) and (b) to a point suitable for spray application; and (2) spraying said liquid mixture onto a substrate to form a liquid coating thereon.

That application is also directed to a liquid spray process in which at least one active organic solvent (c) is admixed with (a) and (b) above prior to the liquid spray application of the resulting mixture to a substrate. The preferred supercritical fluid is supercritical carbon dioxide. The process employs an apparatus in which the mixture of the components of the liquid spray mixture can be blended and sprayed onto an appropriate substrate. The apparatus contains (1) means for supplying at least one polymeric compound capable of forming a continuous, adherent coating;

(2) means for supplying at least one active organic solvent;

(3) means for supplying supercritical carbon dioxide fluid;

(4) means for forming a liquid mixture of components supplied from (1)–(3); and (5) means for spraying said liquid mixture onto a substrate.

The apparatus may also provide for (6) means for heating any of said components and/or said liquid mixture of components. U.S. patent application Ser. No. 133,068 demonstrates the use of supercritical fluids, such as supercritical carbon dioxide fluid, as diluents in highly viscous organic solvent borne and/or highly viscous non-aqueous dispersions coatings compositions to dilute the compositions to application viscosity required for liquid spray techniques. It further demonstrates that the method is generally applicable to all organic solvent-borne coatings systems.

Copending U.S. application Ser. No. 218,910, filed Jul. 14, 1988, is directed to a liquid coatings application process and apparatus in which supercritical fluids, such as supercritical carbon dioxide fluid, are used to reduce to application consistency, viscous coatings compositions to allow for their application as liquid sprays. The coatings compositions are sprayed by passing the composition under pressure through an orifice into the environment of the substrate.

In particular, the process of U.S. application Ser. No. 218,910 for liquid spray application of coatings to a substrate comprises:

(1) forming a liquid mixture in a closed system, said liquid mixture comprising:
   (a) at least one polymeric component capable of forming a coating on a substrate; and
   (b) a solvent component containing at least one supercritical fluid, in at least an amount which when added to (a) is sufficient to render the viscosity of said mixture to a point suitable for spray application; and (2) spraying said liquid mixture onto a substrate to form a liquid coating thereon by passing the mixture under pressure through an orifice into the environment of the substrate to form a liquid spray.

U.S. application Ser. No. 218,895, filed Jul. 14, 1988, is directed to a process and apparatus for coating substrates by a liquid spray in which 1) supercritical fluid, such as supercritical carbon dioxide fluid, is used as a viscosity reduction diluent for coating formulations, 2) the mixture of supercritical fluid and coating formulation is passed under pressure through an orifice into the environment of the substrate to form the liquid spray, and 3) the liquid spray is electrically charged by a high electrical voltage relative to the substrate.

In particular, the process of U.S. application Ser. No. 218,895 for electrostatic liquid spray application of coatings to a substrate comprises:

(1) forming a liquid mixture in a closed system, said liquid mixture comprising:
   (a) at least one polymeric component capable of forming a coating on a substrate; and
   (b) a solvent component containing at least one supercritical fluid, in at least an amount which when added to (a) is sufficient to render the viscosity of said mixture to a point suitable for spray application;

(2) spraying said liquid mixture onto a substrate to form a liquid coating thereon by passing the mixture under pressure through an orifice into the environment of the substrate to form a liquid spray; and (3) electrically charging said liquid spray by a high electrical voltage relative to the substrate and electric current.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

In general, coating compositions are formulated to help minimize the coating defects that may occur after the coating composition has been sprayed by any of the above means onto the substrate and then dried. Such defects include, but are certainly not limited to, orange peel conditions, runs or sags, pin holing and solvent pops, fish eyes, blistering, and the like, all of which are well known to those skilled in this art.

Indeed, some coating formulations are provided in concentrated form, that is, with a relatively high solids content, so that they may be custom tailored on site by the user. Thus, the user adds an appropriate amount of a particular solvent mixture to accommodate a particular end use spraying condition which may include variable wind conditions, ambient temperatures, drying conditions, humidity, and other such spraying condition factors.

While the above-noted related patent applications all utilize supercritical fluids as a diluent to help reduce the viscosity of highly viscous organic solvent-borne and/or highly viscous non-aqueous dispersions coating compositions so as to facilitate the application of these compositions by liquid spray techniques, and by doing so, desirably reduce the amount of organic solvent which would otherwise be used, the overall objective, of course, is still to obtain a coated substrate having a uniform, smooth, continuous coating and substantially none of the above-noted defects.

For obvious reasons, none of the prior art coating compositions have been formulated with the intent of having these compositions combined with a supercritical fluid as a diluent and then spraying the resultant admixed liquid mixture through an orifice and onto a substrate to form a liquid coating which is then dried and/or cured.

Indeed, prior to the inventions described in the above-noted related applications and the present invention, it was unknown how a high concentration of highly volatile supercritical fluid, such as supercritical carbon dioxide fluid, would affect formation of a liquid spray containing a solids fraction; a diluent fraction in which said solids fraction is dissolved, suspended or dispersed; and a portion of the supercritical fluid. A spray mixture undergoes a large and rapid drop in pressure as it goes through the orifice. Accordingly, one of ordinary skill in the art could theorize that the supercritical spray mixture would produce a foam like shaving cream instead of a spray, because nucleation to form gas bubbles would be so rapid and intense. Alternatively, one of ordinary skill in the art could also expect that the spray mixture would produce a mist or fog of microdroplets instead of a spray, because atomization would be so intense. Another result that one could theorize is that the spray mixture would produce a spray of bubbles instead of droplets. Furthermore, even if a spray were formed, one skilled in the art could expect that the sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, there is no assurance that the spray could be used to produce quality coherent polymeric coatings on a substrate. One of ordinary skill in the art could surmise that the liquid droplets would be so small or have so little momentum that they could not be deposited well onto the substrate. One could also theorize that foaming droplets or supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. Furthermore, the coating material would contain less volatile organic solvent than normal. Therefore, it is not unreasonable to expect that higher viscosity would prevent or hinder coalescence of the deposited droplets to form a coherent liquid coating; that it would reduce how much the droplets spread out on the substrate, so that thin coatings could not be produced; and that it would reduce the surface flow that produces a smooth coating. One can further theorize that moisture would condense onto the droplets and harm the coating, because the spray would be cooled below the dew point.

Surprisingly, however, it has been shown, as discussed in application Ser. No. 883,156 noted above, that liquid sprays can indeed be formed by using supercritical fluids as viscosity reduction diluents and that such sprays can be used to deposit quality coherent polymeric coatings onto substrates.

However, a need still exists to provide a precursor coating composition which is formulated to:

(a) be particularly compatible for subsequent admixture with a supercritical fluid diluent;

(b) be particularly suitable, once admixed with the supercritical fluid, to help minimize any of the phenomena that may occur which are peculiarly associated with the utilization of such supercritical fluid, which phenomena may interfere with proper atomization of the admixed liquid mixture and/or proper diffusion of the supercritical fluid once atomized; and (c) provide the necessary coating characteristics such that once sprayed onto a substrate, it will help provide the necessary coalescence of the deposited droplets to form a coherent liquid coating while still not causing sagging or runs and help minimize any of the other defects noted above while at the same time, still allow for the release of any residual supercritical fluid that may be present after the coating has been applied to the substrate.

Accordingly, the precursor coating compositions of the present invention are particularly suitable for subsequent admixture with at least one supercritical fluid which admixture is then sprayed through an orifice, such as airless spray or air-assisted airless spray methods, to apply an admixed coating composition onto a substrate. Advantageously, the coatings are substantially uniform, continuous and substantially defect-free.

SUMMARY OF THE INVENTION

The present invention, in its more broader aspects, is directed to coating compositions which are intended for admixture with at least one supercritical fluid and then subsequently sprayed onto a substrate as a liquid coating, and formulated so as to provide such coating compositions with physical and/or chemical characteristics which make them eminently suitable for such intended use.

In particular, by optimizing one or more specific physical and/or chemical properties of a coating composition, a number of factors influencing and affecting the overall coating process, which includes the utilization of a supercritical fluid, are significantly improved. Such factors include, but are not limited to, for example, (1) the ease with which the supercritical fluid is admixed with such compositions; (2) the amount of supercritical fluid that is capable of being admixed with the composition while still desirably maintaining a single phase; (3) the ease with which the resulting liquid admixture is sprayed; (4) the quality of the atomized spray droplets that are produced; (5) the ability of the supercritical fluid to rapidly diffuse from the atomized sprayed droplets; (6) the ability of the atomized liquid droplets to be deposited efficiently onto the substrate; (7) the ability of the atomized liquid droplets, once applied to the substrate, to sufficiently coalesce and form a coherent liquid coating; (8) the ability for any residual supercritical fluid still remaining in the coating applied to the substrate to effectively diffuse and escape; (9) the ability to help form an essentially defect free coating; and the like, all of which are affected, at least in part, by the characteristics of the precursor coating composition.

It is recognized that variables other than the coating composition per se may have an affect on some or all of the above noted factors. For example, the spray temperature, the spray pressure, the particular supercritical fluid being used, the amount of supercritical fluid admixed with the precursor coating composition, the temperature and pressure of the environment in which the substrate is present, the distance between the spray orifice and the substrate, and the like, all have an affect upon the spraying process and the coating results that are obtained. Generally, however, assuming that all of such process variables are kept constant, the formulation of the precursor coating composition will still play a significant role in the overall spraying process and the resulting coating that is obtained.

In particular, the invention comprises a precursor coating composition comprising a liquid mixture of:
  (a) a solids fraction containing at least one polymeric compound capable of forming a coating on a substrate; and
  (b) a solvent fraction containing at least one solvent in which said at least one polymeric compound is at least partially soluble; said liquid mixture having:
    (i) a viscosity of less than about 6,000 centipoise and having less than about 650 grams of the solvent fraction per liter of mixture;
    (ii) a solubility with at least one supercritical fluid, above the critical temperature and pressure of the supercritical fluid, of greater than 5% by weight of the supercritical fluid in said mixture;
    (iii) a viscosity of less than about 300 centipoise when admixed with a sufficient amount of the at least one supercritical fluid, above the critical temperature and pressure of the supercritical fluid, so as to render the mixture suitable for spray application; and
    (iv) a solubility with the supercritical fluid in the non-supercritical state, at 25° C. and one atmosphere absolute pressure of said fluid, of less than about 0.8% by weight of fluid in said mixture.

As used herein, the "critical temperature" is defined as the temperature above which a gas cannot be liquefied by an increase in pressure. Also, as used herein, the "critical pressure" is defined as that pressure which is just sufficient to cause the appearance of two phases at the critical temperature.

The invention is also directed to a precursor coating composition as described above to which pigments, pigment extenders, metallic flakes, fillers, drying agents, anti-foaming agents, anti-skinning agents, wetting agents, ultraviolet absorbers, cross-linking agents, and other coating additives are admixed with (a) and (b).

As used herein, it is understood that the phrase "precursor coating composition" is a composition which is primarily intended and particularly suitable for admixture with at least one supercritical fluid for subsequent liquid spraying onto a substrate to provide a liquid coating thereon which, when dried or cured, helps produce a substantially uniform, continuous, substantially defect-free coating. However, if desired, this precursor coating composition may, of course, be utilized for an entirely different purpose although such use would not constitute the preferred objective of the present invention. Thus, the precursor coating composition may be utilized, if desired, by simply adding a suitable solvent to the composition (other than a supercritical fluid) and then using such a diluted composition as a coating medium in any conventional manner. It is to be understood that the scope of the present invention is not narrowly limited to using the precursor coating composition only with supercritical fluid and then spraying the resulting admixture. The precursor coating composition of the present invention is believed to be unique regardless of the manner in which it is eventually used.

Also as used herein, it is understood that the phrases "admixed coating composition" or "admixed liquid mixture" are intended to mean a sprayable mixture of the precursor coating composition and at least one supercritical fluid.

BRIEF DESCRIPTION OF THE DRAWINGS

FIG. 3 is a schematic diagram of yet another spray apparatus that can be used with the precursor coating composition of the present invention.

DETAILED DESCRIPTION OF THE INVENTION

Figure 1:
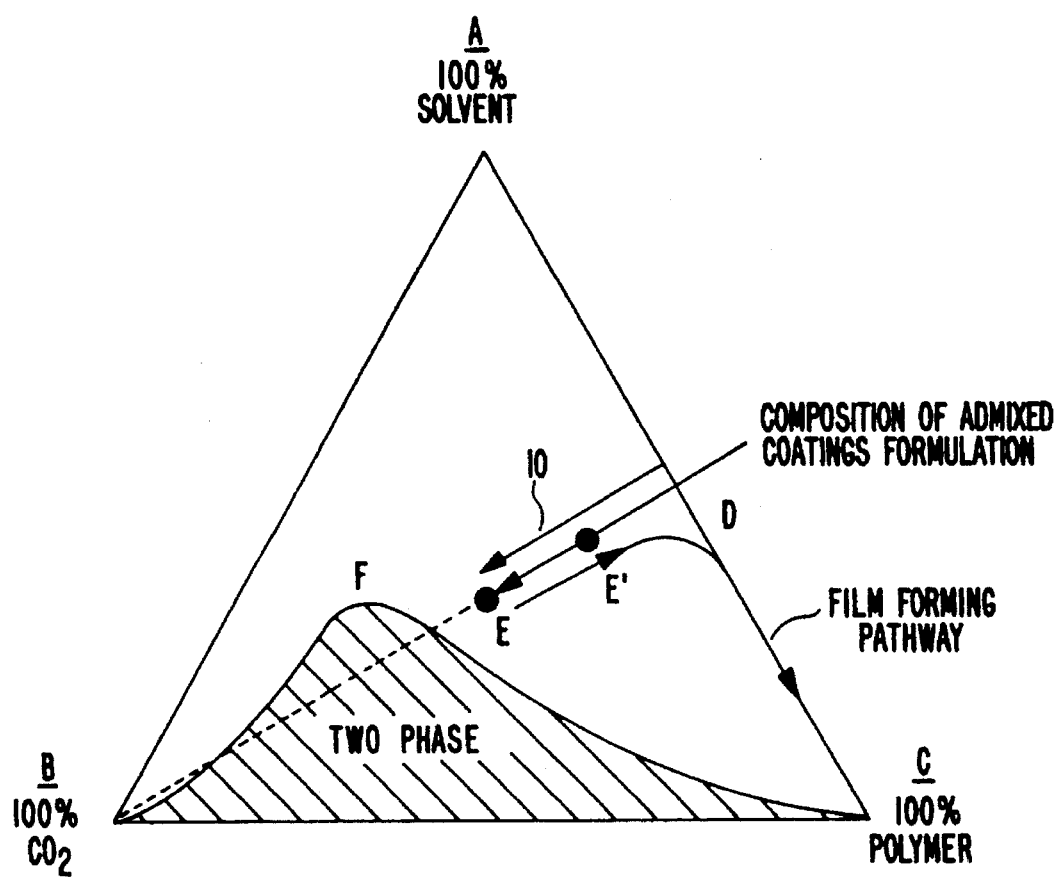
FIG. 1 is a phase diagram of supercritical carbon dioxide fluid spray coating.

Because of its importance to the claimed invention, a brief discussion of relevant supercritical fluid phenomena is warranted.

The supercritical fluid phenomenon is well documented, see pages F-62–F-64 of the CRC Handbook of Chemistry and Physics, 67th Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" is the transition point at which the liquid and gaseous states of a substance merge with each other and represents the combination of the critical temperature and critical pressure for a given substance.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are given in Table 1.

TABLE 1

EXAMPLES OF SUPERCRITICAL SOLVENTS

| Compound | Boiling Point (°C.) | Critical Temperature (°C.) | Critical Pressure (atm) | Critical Density (g/cm$^3$) |
| --- | --- | --- | --- | --- |
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability, and low critical temperature of carbon dioxide, supercritical carbon dioxide fluid is preferably used with the precursor coating compositions of the present invention. For many of the same reasons, nitrous oxide ($N_2O$) is a desirable supercritical fluid for admixture with the precursor coating compositions of the present invention. However, any of the aforementioned supercritical fluids and mixtures thereof are to be considered as being applicable for use with the precursor coating compositions.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

The precursor coating compositions of the present invention comprise a solids fraction containing at least one polymeric compound capable of forming a coating on a substrate and a solvent fraction containing at least one solvent in which the polymeric compound is at least partially soluble.

While the polymeric compounds that are suitable for use in the present invention as coating materials generally include any of the polymers which are well known to those skilled in the coatings art, there are preferred polymers which are particularly desirable due to their possessing specific characteristics which make them generally more suitable for (1) admixture with a supercritical fluid followed by (2) spraying such admixture onto a substrate.

Generally, the polymers which may be used in the present invention must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, two package polyurethanes, oil-modified polyurethanes, moisture-curing polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; and enamels, varnishes, and lacquers. Also included are mixtures of the above coating materials commonly used and known to those skilled in the art that are formulated to achieve performance and cost balances required of commercial coatings.

One characteristic possessed by polymers which is particularly preferred in the present invention are those having relatively low molecular weight. Such polymers provide a precursor composition which desirably has a relatively lower viscosity. As a result of such lower viscosity, less supercritical fluid is needed to be added to the precursor composition in order to reduce the viscosity of the composition even further to the point where it becomes suitable for spray application.

The ability to provide a precursor composition such that less supercritical fluid is needed in order to produce an admixture suitable for spraying is quite advantageous. Thus, such a composition avoids the possibility of having to add an excessive amount of the supercritical fluid which may result in the formation of a two fluid phase system.

This perhaps is best illustrated by referring to the the phase diagram in FIG. 1 wherein the supercritical fluid is supercritical carbon dioxide fluid. In FIG. 1, the vertices of the triangular diagram represent the pure components of the admixed coating composition. Vertex A is the solvent from the solvents fraction, vertex B is carbon dioxide, and vertex C represents the polymeric material. The curved line BFC represents the phase boundary between one phase and two phases. The point D represents a possible composition of the precursor coating composition in which supercritical carbon dioxide has not been added. The point E represents a possible composition of the admixed coating composition, after admixture with supercritical carbon dioxide. The addition of supercritical carbon dioxide has reduced the viscosity of the viscous precursor coatings composition to a range where it can be readily atomized through a liquid spray apparatus.

After atomization, a majority of the carbon dioxide vaporizes, leaving substantially the composition of the original viscous coatings composition. Upon contacting the substrate, the remaining liquid mixture of the polymer and solvent(s) component(s) will flow, i.e., coalesce, to produce a uniform, smooth film on the substrate. The film forming pathway is illustrated in FIG. 1 by the line segments EE'D (atomization and decompression) and DC (coalescence and film formation).

As can be seen from the phase diagram, however, particularly as shown by arrow 10, as more and more supercritical carbon dioxide is added, the composition of the admixed liquid coating mixture approaches the two-phase boundary represented by line BFC. If enough supercritical carbon dioxide is added, the two-phase region is reached and the composition correspondingly breaks down into two phases. Sometimes, it may be desirable to admix an amount of supercritical fluid (in this case, supercritical carbon dioxide) which is even beyond the two-phase boundary. Generally, however, it is not preferable to go much beyond this two-phase boundary for optimum spraying performance and/or coating formation.

Accordingly, by providing polymer compounds having relatively low molecular weight, the possibility of needing such an excessive amount of supercritical fluid to effectively reduce the viscosity of the composition is substantially reduced.

Preferably, the polymeric compounds of the solids fraction of the precursor composition of the present invention have a weight average molecular weight (Mw) which is less than about 100,000. More preferably, the weight average molecular weight of the polymeric compounds is less than about 50,000, and, most preferably, is less than about 25,000.

Generally, the molecular weight of most polymers are capable of being controlled by various conventional means which are well known to those skilled in the polymer art. Typically, the molecular weight, the molecular weight distribution and the degree of branching of a polymer are controlled by the actions of: (1) chain transfer agents, (2) catalyst type and concentration, (3) polymerization temperature, (4) polymerization solvent, and combinations of the above.

In addition to providing a precursor coating composition having a lower viscosity to facilitate handling, the utilization of a low molecular weight polymer component also provides the still further advantage of being easier to atomize when passed through a spray orifice.

Still another characteristic which is possessed by particularly preferred low molecular weight polymers are those having a low elastic component of viscosity. A discussion of the components of viscosity can be found in, for example, "Rheological Measurement for Quality Control" by S. B. Driscoll, *Rubber World* (December, 1980), pages 31–34, the contents of which are incorporated by reference. Thus, where a number of polymers may provide a precursor coating composition having essentially the same viscosity, the most preferred polymer would be the one having the least elastic component of viscosity. Such polymers having a low elastic component of viscosity are generally those having a structural and molecular weight distribution which, in solution, minimize chain entanglement. Particularly, the high molecular weight fraction of the molecular weight distribution of the polymeric compound should be minimized. A useful and conventional measure for determining the high molecular weight fraction of the molecular weight distribution is the ratio of the weight average (Mw) molecular weight of the polymeric compound to the number average (Mn) molecular weight of that polymeric compound, i.e., Mw/Mn. Reference is made to, for example, "Introduction to Polymers and Resins", Federation Series On Coatings Technology (1986), pages 26–31, which discusses molecular weight determination of polymers, the contents of which are incorporated herein by reference. Generally, for a given number average molecular weight, Mn, the higher the ratio of Mw/Mn, the greater the high molecular weight fraction that is present in the polymer, and the greater the elastic component of viscosity possessed by such polymer.

Preferably, the predominant polymeric compound used in the precursor composition of the present invention has a Mw/Mn ratio of less than about 4, and preferably less than about 3, and most preferably less than about 2.

The higher the elastic component of viscosity possessed by the polymer, the more difficult it is to atomize an admixed precursor coating composition containing supercritical fluid made from such a polymer. Generally, as an admixed coating composition is released through the spray orifice, shearing forces act upon the material causing it to tear itself apart into fine atomized droplets. When, however, the polymer has a high elastic component of viscosity, such tearing apart is hindered and the composition does not atomize as well.

Particularly desirable polymers having a relatively low elastic component of viscosity include those set forth in Table 2 below.

TABLE 2

| Polymer | $M_n$ | $M_w$ | $M_w/M_n$ |
| --- | --- | --- | --- |
| Alkyd resins | 25,000–50,000 | 50,000–200,000 | 2–4 |
| Epoxy resins | 350–4,000 | 350–7,000 | 1.0–2.5 |
| Acrylic, thermoplastic, solution polymer | 25,000–350,000 | 40,000–600,000 | 1.5–3 |
| Acrylic, thermoplastic, emulsion polymer | 500,000–2,000,000 | 650,000–2,500,000 | 1.1–1.8 |
| Acrylic thermosetting, oligomer | 1,000–2,000 | 1,200–2,200 | 1.1–1.5 |
| Polybutadiene, anionic polymerized | 2,000–5,000 | 2,100–5,200 | 1.05–1.1 |

In addition to the polymeric compound that is contained in the solids fraction, additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the precursor composition of the present invention.

In connection with the use of the various additives noted above, it is particularly desirable for pigments to be present in the precursor composition inasmuch as it has been found to aid in the diffusion of the supercritical fluid from the sprayed composition resulting in improved atomization.

The solvent fraction of the precursor composition of the present invention includes at least one solvent in which the at least one polymer compound is at least partially soluble. While the solvents that are suitable for use in the present invention include any solvent or mixtures of solvent which is capable of dissolving, dispersing or suspending the solids fraction when admixed with the supercritical fluid, as with the solids fraction discussed above, there are preferred solvents and solvent mixtures which are particularly desirable. Such preferred solvents possess certain desirable characteristics which make them generally more suitable for admixture with a supercritical fluid followed by spraying such admixture onto a substrate material.

Generally, it is quite apparent that the selection of a particular solvent or solvent mixture will be dependent upon the particular polymeric compounds being used.

Suitable solvents which may be utilized in the precursor coating compositions of the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.* 58, 1099, 1954.

In general, solvents suitable for the present invention should have the desired solvency characteristics as aforementioned and also the proper balance of evaporation rates so as to ensure good coating formation. In other words, the solvent fraction should have a proper blend of fast and slow solvents.

More specifically, solvents having fast evaporation rates are needed to help solubilize the solids fraction, as well as help reduce viscosity, and to substantially leave the admixed coating composition once it has been sprayed and before the atomized droplets contact the substrate. Correspondingly, solvents having slow evaporation rates are also needed to help solubilize the solids fraction, but these solvents are primarily needed to be present on the substrate after the atomized droplets have been applied so as to provide a suitably low viscosity to produce enough flow-out to obtain a uniform and continuous coating.

However, too much of the fast solvent will produce a dry coating not having enough flow-out. Conversely, too much of the slow solvent will produce a coating having sagging and running defects and will not readily be dried thereby hindering the early handling of such a coated substrate.

Based on a relative evaporation rate (RER) to a butyl acetate standard equal to 100 using ASTM Method D3599 at 25° C. and one atmosphere pressure, the solvent fraction desirably has the following composition of fast and slow solvents as represented by corresponding RER values:

| Wt. % of Total Solvent Fraction | RER |
| --- | --- |
| 30–100% | <50 |
| 0–70% | 50–100 |
| 0–40% | 101–250 |
| <10% | >250 |

More preferably, the solvent fraction has the following composition:

| Wt. % of Total Solvent Fraction | RER |
| --- | --- |
| 40–100% | <50 |
| 0–60% | 50–100 |
| 0–30% | 101–250 |
| <5% | >250 |

Another characteristic of the solvent fraction which desirably is optimized so as to make it particularly suitable for admixture with a supercritical fluid with subsequent spraying thereof is the surface tension of the solvent fraction. Specifically, the less surface tension that a solvent has, the more desirable it is.

Accordingly, solvents having low surface tension provide good atomization of the admixed precursor coating composition providing a fine aerosol. Such a fine aerosol desirably facilitates the escape of the supercritical fluid from the sprayed admixed coating composition prior to its contacting the substrate.

Moreover, solvents having low surface tension also facilitate the formation of good coatings on the substrate by aiding in the diffusion of any residual supercritical fluid that may still be entrapped within the applied coating. So too, low surface tension solvents also help to suppress the formation of any bubbles caused by such residual supercritical fluid as it escapes. Still further, solvents having low surface tension desirably provide fast wetting and spreading characteristics which also aid in the formation of a defect-free, uniform coating on the substrate.

Preferably, the solvent fraction has a surface tension at 25° C. which is desirably less than 35 dynes/centimeter. More preferably, the surface tension is less than 30 dynes/centimeter, for example, 23–28 dynes/centimeter.

It is understood that it is not necessary that the solvent or solvent mixture possess such surface tension characteristics per se. While such solvents do certainly exist, as exemplified by such solvents as toluene, VM&P naphtha, butyl acetate pentyl propionate, glycol ethers, methyl PROPASOL® acetate (manufactured by Union Carbide Corp., Danbury, Conn.), UCAR® Ester EEP (manufactured by Union Carbide Corp., Danbury, Conn.), and the like, there are conventional additives which may be added to the precursor composition which contains the solvent and solids fractions so as to suppress the surface tension of the composition as a whole. Such additives include surface active materials, commonly known as surfactants, which are well known to those skilled in the art and which are applicable to be used in both the solvent fraction of the present invention as well as in the precursor coating composition as a whole.

Still further in connection with the solvent fraction, as the admixed coating composition containing the mixture of polymer, solvent and supercritical fluid is sprayed, the evaporation of the fast solvent contributes to the overall cooling of the sprayed composition. Inasmuch as the solubility of most supercritical fluids, particularly carbon dioxide, is higher at cooler temperatures, such cooling manifestly hinders the diffusion of the supercritical fluid from the sprayed composition. It is desirable to have essentially all of the supercritical fluid escape from the admixed coating composition, once it has been sprayed, such that essentially none of the supercritical fluid is left once the atomized liquid droplets contact the substrate.

In this connection, it should be noted that the term "liquid droplets" is meant to define a droplet containing a portion of the solids fraction as well as a portion of the solvent fraction, in addition to any entrained supercritical fluid that may still be present in such droplet.

In order to help minimize the cooling effect caused by evaporation of the fast solvent, it is desirable that the solvent fraction have an overall low heat of vaporization. Preferably, the solvent fraction has an overall heat of vaporization of less than 110 calories per gram of solvent fraction and more preferably, less than about 100 calories per gram of solvent fraction. Desirably, the overall heat of vaporization of the solvent fraction is in the range of from about 65 to about 95 calories/gram.

Keeping in mind the underlying primary objective of the present invention, namely, to minimize the unnecessary release of solvent vapors into the atmosphere during the spray application of the admixed coating compositions, it is clear that the amount of solvent used in the precursor coating compositions should be less than that required to produce a mixture of polymeric compounds and solvent having a viscosity which would permit its application by liquid spray techniques. In other words, the inclusion of the solvent fraction should be minimized such that the diluent effect due to the presence of the supercritical fluid diluent is fully utilized.

However, reducing the amount of solvent in the coating composition is beneficial not only for the purpose of minimizing environmental pollution, but as recognized by the present invention, such reduction in the amount of solvent is also desirable to help facilitate the spraying of the coating composition once it has been admixed with supercritical fluid as well as improving the appearance of the coating that is ultimately formed on the substrate.

More specifically, as the amount of solvent fraction present in the precursor coating composition is increased and after such composition has been admixed with supercritical fluid and sprayed, the rate of diffusivity of such supercritical fluid through the sprayed composition generally decreases. This typically results in an increase of residual supercritical fluid retained in the coating after it has been applied to the substrate which may result in the formation of coating defects. In order to compensate for such decreased diffusivity, the temperature of the sprayed composition is generally raised so as to lower the solubility of the supercritical fluid. However, such an increase in spray temperature may have an affect on the particle size and the atomization quality of the sprayed composition.

Still further, as the solvent fraction in the precursor coating composition is increased, there is a corresponding loss in the distinctness of image gloss (DOI) in the resulting coating. This is believed to be caused by a concomitant increase in the amount of residual supercritical fluid that is retained in the applied coating which gradually fizzles out of the coating.

Furthermore, an excessive solvent fraction in the precursor coating composition diminishes the effectiveness of the supercritical fluid, because atomization is intensified such that deposition of the liquid spray onto the substrate becomes poorer than when the solvent fraction is not excessive. That is, the transfer of liquid coating to the substrate becomes less efficient. Therefore, more spraying must be done to build up coating thickness, with the result that more solvent is released to the environment and more precursor coating composition is used, which increases cost. In addition, because more spray passes must be used to build the desired coating thickness, a higher proportion of slow solvent is lost from the coating during the application process, so that less slow solvent is available to aid reflow of the coating to give a smooth surface once the desired coating thickness has been achieved. Without wishing to be bound by theory, it is believed that viscosity reduction caused by the excessive solvent fraction combines with viscosity reduction caused by the supercritical fluid to give droplets that have insufficient mass to be deposited efficiently onto the substrate from the spray. Instead, the droplets follow the gas flow into the environment. Using less solvent allows full utilization of the viscosity reduction of the supercritical fluid and gives droplet sizes that deposit efficiently onto the substrate.

Moreover, an excessive solvent fraction produces a greater wet coating thickness for a desired dry coating thickness and a lower coating viscosity on the substrate, which increases the tendency for the coating to sag or run during application, drying, and curing. In addition, as the excessive solvent evaporates from the coating, the coating shrinks to a greater degree during the drying process and flow currents can be induced inside the coating which disrupt the leveling to give a smooth surface. Drying time is also increased.

Consequently, in accordance with the present invention, the amount of solvent fraction that is present in the liquid mixture comprised of a solids fraction and a solvent fraction is no greater than about 650 grams of solvent per liter of liquid mixture. More preferably, the amount of solvent fraction contained in the liquid mixture is less than about 450 grams of solvent per liter of liquid mixture. Most preferably, the amount of solvent fraction is in the range of from about 200 to about 400 grams of solvent per liter of mixture.

The liquid precursor coating composition of the present invention comprising the solids fraction and the solvent fraction should have a viscosity of less than about 6,000 centipoise, and preferably less than about 3,000 centipoise, and most preferably in the range of from about 500 to about 2,000 centipoise. Obviously, a major factor contributing to the viscosity of the liquid mixture is the amount of solvent fraction contained therein, which variable was discussed above. Hence, it is apparent that the amount of solvent fraction present in the precursor coating composition should be considered hand-in-hand with the desired viscosity that is to be obtained.

The viscosity of the precursor coating composition should be low enough such that there is enough solvent present to provide proper coalescence upon the substrate once the composition is sprayed while still being high enough to allow for a reduction in solvent usage so as to maximize the utilization of the supercritical fluid diluent and to concomitantly facilitate good atomization and coating formation.

The viscosity of the precursor coating composition should also be such that when supercritical fluid is added, it is possible to add enough of the supercritical fluid, without entering the two fluid phase region, such that the viscosity is lowered to less than about 300 centipoise, above the critical temperature and pressure of the supercritical fluid, so as to render the mixture suitable for spray application. More preferably, the admixed liquid coating composition has a viscosity which is less than about 150 centipoise and preferably has a viscosity in the range of from about 5 to 150 centipoise. Most preferably, the viscosity of the admixture of solids fraction, solvent fraction and supercritical fluid is in the range of from about 10 to about 50 centipoise.

Yet another factor which the precursor coating composition must address is the solubility of the supercritical fluid at both at supercritical conditions and at the conditions of the substrate, i.e., after the composition has been sprayed.

The solubility requirements for these two sets of conditions are totally antithetical to one another. Thus, when admixing the supercritical fluid with the liquid precursor composition, it is desirable to have a composition which has a high solubility for the supercritical fluid at the supercritical conditions. In contrast, once the composition has been sprayed through the orifice, it is desirable that the solubility for the supercritical fluid at the conditions present in the environment of the substrate be as low as possible.

More particularly, in accordance with the present invention, the liquid precursor coating composition should have a solubility for the supercritical fluid, above the critical temperature and pressure of the supercritical fluid, of at least 5% by weight of the supercritical fluid in the liquid mixture. Preferably, the solubility should be at least 15% by weight of the supercritical fluid in the mixture, and more preferably, about 20 to 50% or greater by weight of supercritical fluid per liter of mixture. Most preferably, it is in the range of from about 25% to about 35% by weight.

If the precursor coating composition has a solubility which is less than that noted above, there simply would not be enough of a diluent effect provided by the supercritical fluid. This would result in an insufficient viscosity reduction such that the composition could not properly be sprayed.

Once the composition is admixed with supercritical fluid and sprayed, it is desirable to have the supercritical fluid diffuse through the sprayed composition as quickly as possible such that there is very little residual supercritical fluid left in the coating once it has come into contact with the substrate. Accordingly, the fluid, which of course is no longer supercritical, should have a solubility in the liquid precursor coating composition of less than about 0.8% by weight of the fluid in the non-supercritical state in the precursor coating composition. Preferably, the solubility of the fluid is less than about 0.6% by weight in the composition. Most preferably, the supercritical fluid should be soluble in the precursor coating composition in an amount of less than about 0.4%. As used herein, it is to be understood that the solubility of the fluid in the non-supercritical state is measured at 25° C. and in one atmosphere absolute pressure of the fluid.

A still further characteristic which the precursor coating composition should desirably possess is a high diffusivity for passing the supercritical fluid out of the composition once it has been sprayed with such supercritical fluid into the environment of the substrate. Such high diffusivities are desirable to help the supercritical fluid quickly escape from the sprayed liquid mixture. This helps prevent the presence of any residual supercritical fluid in the liquid coating applied to the substrate and thereby helps ensure the formation of a uniform, defect-free coating.

Accordingly, the precursor coating composition should desirably possess an apparent gas diffusion rate (based on a sprayed particle average velocity of about 2 to about 8 m/sec and a spraying distance of about 30 cm at 25° C. and one atmosphere pressure) from the time it has been sprayed with supercritical fluid to the time it impacts on the substrate of at least about 7 to about 26 grams of supercritical fluid per gram of presursor coating composition per second.

The precursor coating composition, after having been admixed with supercritical fluid, is sprayed onto a substrate to form a liquid coating thereon containing solids fraction, a portion of the solvent fraction, and any residual supercritical fluid that may be left, by passing the admixed liquid mixture under pressure through an orifice into the environment of the substrate to form a liquid spray.

An orifice is a hole or an opening in a wall or housing, such as in a spray tip of a spray nozzle on an electrostatic spray gun, through which the admixed liquid coating composition flows in going from a region of higher pressure, such as inside the spray gun, into a region of lower pressure, such as the air environment, outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic airless and air-assisted airless spraying of coating formulations such as paints, lacquers, enamels, and varnishes, are suitable for spraying the precursor coating compositions of the present invention when admixed with supercritical fluids. Spray guns, nozzles, and tips are preferred that do not have excessive flow volume between the orifice and the valve that turns the spray on and off. The spray guns, nozzles, and tips must be built to contain the spray pressure used.

There are a broad variety of spray devices that one may use in spraying the precursor coating composition of the present invention after it has been admixed with supercritical fluid. Essentially, any spray gun may be used, from conventional airless and air-assisted airless spray devices to electrostatic spray devices. The choice of spray device is dependent upon the kind of application that is contemplated.

The material of construction of the orifice through which the admixed coating composition is sprayed must possess the necessary mechanical strength for the high spray pressure used, have sufficient abrasion resistance to resist wear from fluid flow, and be inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for spraying the admixed liquid mixture should generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore, small orifice sizes from about 0.004-inch to about 0.025-inch diameter are preferred. Orifice sizes from about 0.007-inch to about 0.015-inch diameter are most preferred.

The designs of the spray tip that contains the spray orifice and of the spray nozzle that contains the spray tip are not critical. The spray tips and spray nozzles should have no protuberances near the orifice that would interfere with the spray.

The shape of the spray is also not critical to being able to spray the admixed coating composition. The spray may be in the shape of a cone that is circular or elliptical in cross section or the spray may be in the shape of a flat fan, but the spray is not limited to these shapes. Sprays that are flat fans or cones that are elliptical in cross section are preferred.

The distance from the orifice to the substrate is generally at a distance of from about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used. Such techniques include but are not limited to the use of pre-orifices, diffusers, turbulence plates, restrictors, flow splitters/combiners, flow impingers, screens, baffles, vanes, and other inserts, devices, and flow networks that are used in electrostatic airless spray and air-assisted airless spray.

Filtering the liquid mixture prior to flow through the orifice is desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces may be used to increase the proportion of precursor coating composition that is deposited onto a substrate from the spray. This is commonly referred to as increasing the transfer efficiency. This is done by using a high electrical voltage relative to the substrate to impart an electrical charge to the spray. This creates an electrical force of attraction between the spray droplets and the substrate, which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably the spray is charged negative relative to electrical ground.

The method of charging the spray is not critical to the practice of the invention provided the charging method is effective. The precursor coating composition can be electrically charged by applying high electrical voltage relative to the substrate and electrical current (1) within the spray gun, by direct contact with electrified walls or internal electrodes before leaving the orifice; (2) after the spray emerges from the orifice, by electrical discharge from external electrodes located near the orifice and close to the spray; or (3) away from the orifice, by passing the spray through or between electrified grids or arrays of external electrodes before the spray is deposited onto the substrate. Methods (1) and (2), individually or in combination, are preferred. Method (2) is most preferred.

In charging method (1) above, the spray gun must be electrically insulating. The high voltage and electrical current is supplied to the admixed liquid mixture inside the gun by direct contact with an internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the admixed liquid mixture as it flows through the gun. This internal charging method has the advantage of having no external electrode that could interfere with the spray. A disadvantage is that if the admixed liquid mixture is not sufficiently electrically insulating, electrical current leakage can occur through the admixed liquid mixture to a grounded feed supply tank or feed delivery system. This reduces the amount of charge going to the spray. If current leakage is too high, then the feed supply tank and feed delivery system must be insulated from electrical ground, that is, be charged to high voltage. Current leakage can be measured by measuring the current flow from the high voltage electrical power supply without fluid flow. The current charging the spray is then the difference between the current with fluid flow and the current without fluid flow. The leakage current should be small compared to the charging current.

In charging method (2) above, the spray is electrically charged after it emerges from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation in between such that the electrical current issuing from the sharp point is favorably directed to the spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the admixed liquid mixture than charging method (1). Admixed liquid mixtures that are sufficiently conductive must have the feed supply and feed line insulated from electrical ground. In charging method (3) above, the spray is electrically charged farther away from the orifice and is more fully dispersed than in method (2). Therefore a larger system or network of external electrodes is usually required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The spray is passed through or between electrified grids or arrays of external electrodes before the spray is deposited onto the substrate. The spray droplets are charged by ion bombardment from the electrical current discharged into air from the electrodes. The electrified grid may be one or several wire electrodes that extend across the spray area. Current can discharge from along the length of the electrodes. The electrified array may be one or several wire or pointed electrodes positioned around the spray area and which extend close to or into the spray such that current discharges from the ends of the electrodes.

The present invention can be used with high electrical voltage in the range of about 30 to about 150 kilovolts. Higher electrical voltages are favored to impart higher electrical charge to the spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of electrostatic spraying.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. Conventional high voltage electrical power supplies can be used. The power supply should have standard safety features that prevent current or voltage surges. The electrical power supply may be built into the spray gun. Other charging methods may also be used.

The spray pressure used is a function of the precursor coating composition, the supercritical fluid being used, and the viscosity of the liquid mixture. The minimum spray pressure is at or slightly below the critical pressure of the supercritical fluid. Generally, the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used is a function of the precursor coating composition, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment into which the admixed coating composition is sprayed is not critical. However, the pressure therein must be less than that required to maintain the supercritical fluid component of the liquid spray mixture in the supercritical state. Preferably, the admixed liquid coating composition is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate. Small spray droplets also give higher quality finishes.

The coating composition may be used to apply coatings by the application of liquid spray to a variety of substrates. Examples of suitable substrates include but are not limited to metal, wood, glass, plastic, paper, cloth, ceramic, masonry, stone, cement, asphalt, rubber, and composite materials.

Films may be applied to substrates such that the cured films have thicknesses of from about 0.2 to about 6.0 mils. Preferably, the films have thicknesses of from about 0.5 to about 2.0 mils, while most preferably, their thicknesses range from about 0.7 to about 1.5 mils.

If curing of the coating composition present upon the coated substrate is required, it may be performed at this point by conventional means, such as allowing for evaporation of the active solvent, application of heat or ultraviolet light, etc.

Compressed gas may be utilized to assist formation of the liquid spray and/or Co modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the electrostatic spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist gas are lower than those used in air spray. The assist gas may be heated to counteract the rapid cooling effect of the supercritical fluid diluent in the spray. The preferred temperature of heated assist gas ranges from about 35° to about 90° centigrade. The most preferred temperature ranges from about 45° to about 75° centigrade.

Figure 2:
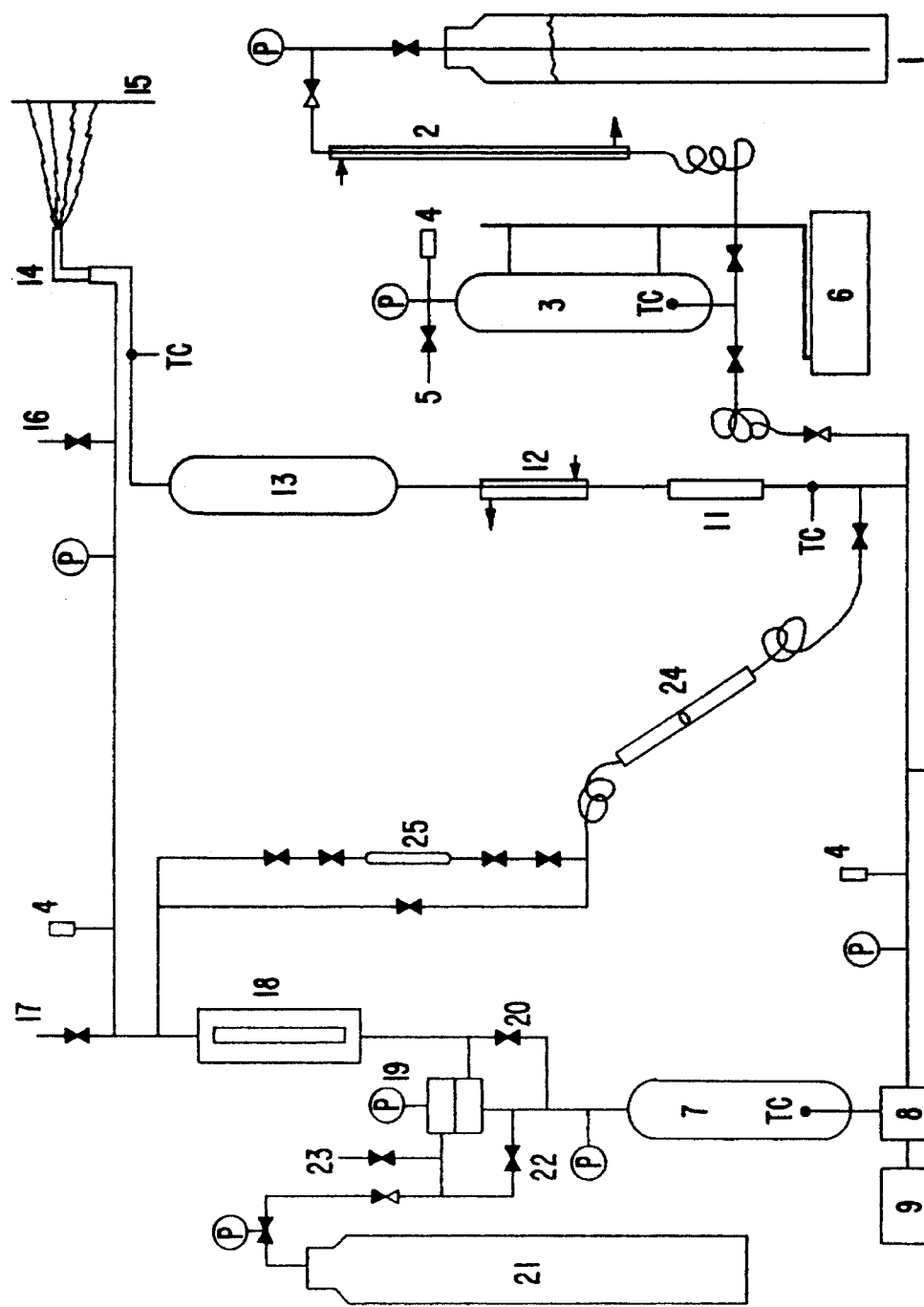
FIG. 2 is a schematic diagram of a spray apparatus that can be used with the precursor coating composition of the present invention.

The precursor coating composition of the present invention may be admixed with a supercritical fluid and then sprayed onto a substrate by a spray apparatus such as that shown in either FIGS. 2 or 3.

The following illustrates apparatus that may be used to obtain the admixed coating composition of precursor coating composition and supercritical fluid and spray it in a batch mode in the practice of the present invention. The supercritical fluid illustrated is supercritical carbon dioxide fluid.

Table 3 contains a listing of the equipment used in conducting the procedure described for the batch mode.

TABLE 3

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating, mounted on scale; carbon dioxide feed tank. |
| 4. | Circle Seal ™ pressure relief valve P168-344-2000 set at 1800 psig. |
| 5. | Vent valve. |
| 6. | Sartorius 16-kilogram scale with 0.1-gram sensitivity. |
| 7. | Hoke cylinder #8HD2250, 2.25-liter volume, made of 304 stainless steel, having double end connectors, 1800-psig pressure rating; pump supply tank. |
| 8. | Zenith single-stream gear pump, model #HLB–5592–30CC, modified by adding a thin Grafoil ™ gasket to improve metal-to-metal seal. |
| 9. | Zenith gear pump drive model #4204157, with 15:1 gear ratio, and pump speed controller #QM–371726F–15–XP, with speed range of 6 to 120 revolutions per minute. |
| 10. | Drain from circulation loop. |
| 11. | Kenics static mixer. |
| 12. | Cooling water heat exchanger. |
| 13. | Hoke cylinder #8HD2250, 2.25-liter volume, made of 304 stainless steel, having double end connectors, 1800-psig pressure rating; spray supply tank. |
| 14. | Airless spray gun. |
| 15. | Bonderite ™ 37 polished 24-gauge steel panel, 6-inch by 12-inch size. |
| 16. | Vent valve. |
| 17. | Liquid feed valve. |
| 18. | Jerguson high-pressure sight glass series T-30 with window size #6 rated for 2260 psig pressure at 200 F. temperature. |
| 19. | Grove back-pressure regulator #5-90-W, rated for 2000 psig at 200 F. temperature; dome is charged with pressurized nitrogen to desired spray pressure. |
| 20. | Bypass valve. |
| 21. | Pressurized nitrogen to set Grove back-pressure regulator and to purge unit. |
| 22. | Nitrogen purge valve. |
| 23. | Nitrogen vent valve. |
| 24. | Ruska rolling-ball high-pressure viscometer #1602-811-00 with temperature controller and electronic timer. |
| 25. | Pyncnometer, double-valved one-quarter-inch high-pressure tubing. |

The apparatus listed in Table 3 above is assembled as shown in the schematic representation contained in FIG. 3. Rigid connections are made with ⅛-inch diameter high-pressure tubing for gas flows and with ¼-inch diameter high-pressure tubing for liquid flows, using Swagelok™ fittings. The spray gun is connected to the tubing by using two Graco flexible ¼-inch static-free nylon high-pressure hoses model #061-214 with 5000-psi pressure rating. Check valves are used to prevent back flow to the carbon dioxide feed tank (3) and bulk supply tank (1) and to the nitrogen cylinder (21). The circulation loop and carbon dioxide feed tank are protected from overpressurization by pressure relief valves (4).

The apparatus consists of a circulation loop, a carbon dioxide feed system, and a side loop to measure viscosity and density. The circulation loop contains a pump supply tank (7), a gear pump (8) to provide circulation and maintain constant spray pressure, a static mixer (11), a cooler (12) to remove excess heat, a spray supply tank (13), an airless spray gun (14), a sight glass (18), and a pressure regulator (19) to maintain constant spray pressure. The pressure regulator (19) is set by using compressed nitrogen (21) regulated to the desired flow pressure. The carbon dioxide feed system contains a carbon dioxide bulk supply cylinder (1), a refrigeration heat exchanger (2), and a carbon dioxide feed tank (3) mounted on an electronic scale (6). The feed and exit lines to the feed tank (3) are coiled so that the force of the tank moving on the scale does not affect the scale reading. The side loop contains a viscometer (24) and pyncnometer (25) for measuring the viscosity and density of the admixed coating composition, if desired.

All flow lines and tanks are lined with electrical heat tape and covered with insulation to heat the solution to spray temperature. The heat tape is divided into several circuits that are controlled independently:

| | |
|---|---|
| Circuit #1 | Pressure regulator (19), bypass line (20), sight glass (18), and connecting lines. |
| Circuit #2 | Pump supply tank (7), gear pump (8), and line in circulation loop to carbon dioxide feed point. |
| Circuit #3 | Line in circulation loop from carbon dioxide feed point to cooler (12). |
| Circuit #4 | Spray supply tank (13). |
| Circuit #5 | Line from spray supply tank (13) to flexible hose connected to spray gun (14). |
| Circuit #6 | Carbon dioxide feed tank (3). |

Thermocouples located within the tanks and lines measure temperature. Admixed coating composition temperature is kept uniform around the loop by rapid circulation and by adjusting the heat tapes.

The batch spray unit is filled by the following procedure. The unit is evacuated through the circulation loop vent (16) and a weighed amount of precursor coating composition is added through the feed valve (17) with the gear pump (8) circulating the material at a slow rate through the pressure regulator bypass valve (20). The carbon dioxide feed tank (3) is evacuated through the vent valve (5) and filled with liquid carbon dioxide from the carbon dioxide supply cylinder (1). To make filling the feed tank (3) easier, the carbon dioxide is passed through a refrigeration heat exchanger (2), so that the vapor pressure in the feed tank (3) is lower than the vapor pressure in the supply tank (1). The desired mass of carbon dioxide is pressurized into the circulation loop by heating the carbon dioxide feed tank (3) and valving in the desired amount as read on the balance (6).

The spray pressure is generated by filling the unit with precursor coating composition and carbon dioxide to the required overall density and then heating it to the spray temperature. Prior to spraying, the pressure regulator (19) is bypassed (20) and the loop is at a uniform pressure. To prepare for spraying, the bypass (20) is closed so that the flow goes through the pressure regulator (19), which is adjusted to the flow pressure. During spraying, the spray pressure is kept constant by the gear pump (8) and the pressure regulator (19). The gear pump (8) pumps solution into the spray supply tank (13) from the pump supply tank (7) at a high circulation rate. The pressure regulator (19) discharges excess solution back into the pump supply tank (7). The pump supply tank (7) loses inventory and pressure, but the spray supply tank (13) is kept full and at spray pressure.

The following illustrates apparatus that may be used to obtain the admixed coating composition of precursor coating composition and supercritical fluid and spray it in a continuous mode in the practice of the present invention. The supercritical fluid illustrated is supercritical carbon dioxide fluid.

Table 4 contains a listing of the equipment used in conducting the procedure described for the continuous mode.

TABLE 4

| Item # | Description |
| --- | --- |
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating. |
| 4. | Circle Seal ™ pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon ™ packings mounted in #5 Hydra-Cat Cylinder Slave Kit #947-943; pump and feed line are refrigeration traced; carbon dioxide pump. |
| 8. | Graco standard double-acting primary piston pump model #207-865 with Teflon ™ packings; coating concentrate pump. |
| 9. | Graco Variable Ratio Hydra-Cat ™ Proportioning Pump unit model #226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |
| 22. | Graco check valve model #214-037 with Teflon ™ seal. |
| 23. | Graco check valve model #214-037 with Teflon ™ seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure sight glass series T-30 with window size #6 rated for 2260 psig pressure at 200 F temperature. |
| 30. | Airless spray gun. |
| 31. | Bonderite ™ 37 polished 24-gauge steel panel, 6-inch by 12-inch size. |
| 32. | Zenith single-stream gear pump, model #HLB-5592-30C, modified by adding a thin Grafoil ™ gasket to improve metal-to-metal seal, with pump drive model #4204157, with 15:1 gear ratio, and pump speed controller model #QM-371726F-15-XP, with speed range of 6 to 120 revolutions per minute. |
| 33. | Circle Seal ™ pressure relief valve P168-344-2000 set at 2000 psig. |
| 34. | Drain from circulation loop. |

The apparatus listed in Table 4 above is assembled as shown in the schematic representation contained in FIG. 4. Rigid connections were made with Dekuron ¼-inch diameter, 0.036-inch thick, seamless, welded, type 304 stainless steel hydraulic tubing ASTM A-269 with 5000-psi pressure rating, using Swagelok™ fittings. The pressure tank (17) is connected to the pump (8) using a Graco ⅜-inch static-free nylon high-pressure hose model #061-221 with 3000-psi pressure rating. All other flexible connections are made using Graco ¼-inch static-free nylon high-pressure hoses model #061-214 with 5000-psi pressure rating.

The precursor coating composition and carbon dioxide are pumped and proportioned by using a Graco Variable Ratio Hydra-Cat™ Proportioning Pump unit (9). It proportions two fluids together at a given volume ratio by using two piston pumps (7 and 8) that are slaved together. The piston rods for each pump are attached to opposite ends of a shaft that pivots up and down on a center fulcrum. The volume ratio is varied by sliding pump (7) along the shaft, which changes the stroke length. The pumps are driven on demand by an air motor (10). Pumping pressure is controlled by the air pressure that drives the air motor. The pumps are double-acting; they pump on upstroke and downstroke. The primary pump (8) is used to pump the precursor coating composition. It is of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The precursor coating composition is supplied to the primary pump (8) from a two-gallon pressure tank (17). After being pressurized in the pump to spray pressure, the precursor coating composition is then heated in an electric heater (20) to reduce its viscosity (to aid mixing with carbon dioxide), filtered in a fluid filter (21) to remove particulates, and fed through a check valve (22) into the mix point with carbon dioxide. The secondary pump (7) on the proportioning pump unit (9) is used to pump the liquid carbon dioxide. A double-acting piston pump (7) with a four-check-valve design is used because of the high vapor pressure of carbon dioxide. The pump has an inlet and an outlet on each side of the piston; no flow occurs through the piston. The proportion of carbon dioxide pumped into the admixed coating composition is varied by moving the secondary pump (7) along the moving shaft. Bone-dry-grade liquid carbon dioxide is pumped from cylinder (1) through refrigeration heat exchanger (2) to secondary pump (7). For measuring the carbon dioxide uptake rate, the carbon dioxide is pumped from Hoke cylinder (3) through heat exchanger (2) to pump (7). The liquid carbon dioxide is refrigerated in heat exchanger (2) in order to lower the vapor pressure, to prevent cavitation in pump (7). The Hoke cylinder (3) is filled from cylinder (1). Air or gaseous carbon dioxide in the cylinder (3) is vented (5) during filling. The Hoke cylinder (3) is mounted on a 16-kilogram Sartorius electronic scale with 0.1-gram sensitivity so that the amount of carbon dioxide in it can be weighed. After being pressurized to spray pressure in pump (7), the liquid carbon dioxide is fed unheated through check valve (23) to the mix point with the precursor coating composition. After the precursor coating composition and carbon dioxide are proportioned together at the mix point, the admixed coating composition is mixed in static mixer (24) and pumped on demand into a circulation loop, which circulates the admixed coating composition at spray pressure and temperature to or through the spray gun (30). The admixed coating composition is heated in an electric heater (25) to obtain the desired spray temperature and filtered in a fluid filter (26) to remove particulates. Fluid pressure regulator (28) is installed to lower the spray pressure below the pump pressure, if desired, or to help maintain a constant spray pressure. A Jerguson sight glass (29) is used to examine the phase condition of the admixed coating composition. Circulation flow in the circulation loop is obtained through the use of gear pump (32).

The pressure tank (17) is filled with the precursor coating concentrate and pressurized with air to 50 psig. The primary pump (8) is primed by opening a drain valve on the bottom of filter (21) until air is purged from the line.

The carbon dioxide secondary pump (7) is positioned along the pivoting shaft to give the desired percentage of maximum piston displacement. The refrigeration flow is adjusted to a temperature of $-10°$ C. and circulated through the refrigeration heat exchanger (2) and the refrigeration tracing on pump (7). The carbon dioxide feed line and circulation loop are filled with carbon dioxide and vented through valve (34) several times to purge air from the system. Then the valves to the mixing point are closed and the carbon dioxide feed line is filled to prime pump (7).

The air pressure regulator (13) is adjusted to supply the air motor (10) with air at the desired pressure to pressurize the feed lines. The valves to the mix point are opened and the circulation loop filled with material. With the circulation loop return valve closed, to give plug flow around the circulation loop with no backmixing, material is drained from valve (34) until a uniform composition is obtained. Heater (20) is adjusted to give a feed temperature of 37° C. The circulation heater (25) is adjusted to give the spray temperature. The circulation loop return valve is opened and the spray mixture is circulated at a high rate by adjusting the gear pump (32). The carbon dioxide content of the admixed coating composition is measured by measuring the carbon dioxide uptake rate from Hoke cylinder (3) and the precursor coating composition uptake rate from pressure tank (17) while spraying through the spray gun. Then the carbon dioxide feed is switched back to supply cylinder (1).

An alternative method of proportioning the precursor coating composition and supercritical fluid in a continuous mode uses a mass proportionation apparatus instead of the volumetric proportionation apparatus illustrated above. The variable ratio proportioning pump unit (9) with pumps (7) and (8) shown in FIG. 4 is replaced with an apparatus having the following elements. For pumping the carbon dioxide, the double-acting four-ball piston pump (7) is driven individually on demand by attaching air motor (10) directly to it instead of being driven by the moving beam. Alternatively, the carbon dioxide can be pumped by using an air-driven cryogenic pump such as Haskel model DSF-35, which is a single-acting pump that utilizes a three-way cycling spool that is designed for pumping liquefied gases under pressure without requiring refrigeration to avoid cavitation.

The pressurized carbon dioxide is then passed through a pressure regulator, which is used to control the desired spray pressure, and then through a mass-flow meter, such as Micro Motion model D6, which measures the flow rate of carbon dioxide as it is pumped on demand. For pumping the precursor coating composition, the standard double-acting primary piston pump (8) is replaced with a variable speed gear pump, such as the Zenith gear pump (32) that is used in the circulation loop. The gear pump pumping rate is controlled by a signal processor that receives the instantaneous carbon dioxide flow rate from the mass flow meter and then controls the gear pump revolution rate to pump the precursor coating composition at the proper flow rate to give the desired proportion of precursor coating composition and carbon dioxide in the admixed coating composition. An accumulator, such as Tobul model 4.7A30-4, may be installed in the circulation loop to increase the loop capacity and to minimize pressure pulsations in the loop when the spray gun is activated.

EXAMPLE 1

A precursor coating composition that gives a clear acrylic coating was prepared from Rohm & Haas Acryloid® AT-400 resin, which contains 75% nonvolatile acrylic polymer dissolved in 25% methyl amyl ketone solvent, and American Cyanamid Cymel® 323 resin, which is a cross-linking agent that contains 80% nonvolatile melamine polymer dissolved in 20% isobutanol solvent, by mixing the resins with the solvents n-butanol and methyl amyl ketone in the following proportions:

| | |
|---|---|
| Acryloid ® AT-400 | 8,694.0 g |
| Cymel ® 323 | 2,718.0 g |
| n-butanol | 626.0 g |
| methyl amyl ketone | 1,336.0 g |
| Total | 13,374.0 g |

The precursor coating composition contained 65.01% solids fraction and 34.99% solvent fraction, with the following component composition:

| | | |
|---|---|---|
| AT-400 polymer | 6,520.5 g | 48.75% |
| Cymel ® 323 polymer | 2,174.4 g | 16.26% |
| isobutanol | 543.6 g | 4.07% |
| n-butanol | 626.0 g | 4.68% |
| methyl amyl ketone | 3,509.5 g | 26.24% |
| Total | 13,374.0 g | 100.00% |

The solids fraction had the following composition:

| | | |
|---|---|---|
| AT-400 polymer | 6,520.5 g | 74.99% |
| Cymel ® 323 polymer | 2,174.4 g | 25.01% |
| Total | 8,694.9 g | 100.00% |

The solvent fraction had the following composition and relative evaporation rates (butyl acetate=100):

| Solvent | Grams | Wt. % | RER |
|---|---|---|---|
| isobutanol | 543.6 g | 11.62% | 74 |
| n-butanol | 626.0 g | 13.38% | 44 |
| methyl amyl ketone | 3,509.5 g | 75.00% | 40 |
| Total | 4,679.1 g | 100.00% | |
| Overall Heat of Vap. | 96.6 cal/gm | | |

The precursor coating composition had the following properties:

| Solvent content | 350 grams/liter |
|---|---|
| Relative evap. rate | 43 (butyl acetate = 100) |
| Viscosity | 940 centipoise |
| Weight solids | 65.01 percent |
| Liquid density | 999 grams/liter |
| Acryloid* AT-400 | |
| Molecular weight | 9,280 weight average (Mw) |
| Molecular weight | 3,270 number average (Mn) |
| Mw/Mn | 2.84 |
| Cymel*323 | |
| Molecular weight | 490 weight average (Mw) |
| Molecular weight | 410 weight average (Mn) |
| Mw/Mn | 1.20 |

The solvent fraction had the following distribution of solvent by relative evaporation rate:

| <50 | 88% |
|---|---|
| 50 to 100 | 12% |
| 101 to 250 | 0% |
| >250 | 0% |

Spray experiments were done using Bonderite® 37 polished 24-gauge steel test panels, 6-inch by 12-inch size. The test panels were sprayed, flashed, and baked in a vertical orientation. Coating thickness was measured by using a magnetic coating thickness meter (Paul N. Gardner Company, Fort Lauderdale, Fla.). Coating gloss was measured by using a Glossgard® II 20-Degree Glossmeter (Gardner/Neotec Instrument Division, Pacific Scientific Company, Silver Spring, Md.). Coating distinctness of image (DOI) was measured using a Distinctness of Image Meter, Model 300 (Mechanical Design and Engineering Company, Burton, Mich.).

The admixed liquid mixture was sprayed using a Nordson A4B circulating airless hand spray gun model #152-200 with Nordson spray tip #0004/08, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 27.3% was sprayed at pressure of 1550 psig and temperature of 59° C., which gave a clear single-phase solution. The viscosity of the admixed liquid mixture was about 30 centipoise. Test panels were sprayed, flashed, and baked at a temperature of 120 C. for twenty minutes. The polymeric coatings were thin, clear, bubble free, and had high gloss and high distinctness of image. They had the following average properties:

| Coating Thickness | 20-Degree Gloss | Distinctness of Image |
|---|---|---|
| 0.77 mil | 82% | 75% |
| 0.97 mil | 88% | 65% |
| 1.11 mil | 90% | 80% |
| 1.12 mil | 90% | 85% |
| 1.16 mil | 91% | 90% |
| 1.17 mil | 90% | 90% |
| 1.18 mil | 91% | 90% |
| 1.19 mil | 89% | 85% |
| 1.28 mil | 92% | 90% |
| 1.66 mil | 94% | 90% |

An admixed liquid mixture with a carbon dioxide content of 29.5% was sprayed at pressure of psig and temperature of 59 C., which gave a solution near the solubility limit. The polymeric coatings were likewise thin and clear, bubble free, and had high gloss and high distinctness of image. They had the following average properties:

| Coating Thickness | 20-Degree Gloss | Distinctness of Image |
|---|---|---|
| 0.69 mil | 89% | 65% |
| 0.88 mil | 88% | 75% |
| 1.12 mil | 91% | 75% |
| 1.22 mil | 92% | 90% |
| 1.31 mil | 93% | 90% |
| 1.39 mil | 92% | 90% |
| 1.67 mil | 96% | 95% |

EXAMPLE 2

A precursor coating composition that gives clear acrylic coating was prepared from Acryloid® AT-400 resin and Cymel® 323 resin by mixing the resins with the solvents n-butanol, methyl amyl ketone, ethyl 3-ethoxypropionate (EEP), and butyl CELLOSOLVE® acetate (BCA) in the following proportions:

| Acryloid ® AT-400 | 8,694.0 g |
|---|---|
| Cymel ® 323 | 2,718.0 g |
| n-butanol | 626.0 g |
| methyl amyl ketone | 1,336.0 g |
| EEP | 352.0 g |
| BCA | 116.0 g |
| Total | 13,842.0 g |

The precursor coating composition contained 62.82% solids fraction and 37.18% solvent fraction, with the following component composition:

| AT-400 polymer | 6,520.5 g | 47.11% |
|---|---|---|
| Cymel ® 323 polymer | 2,174.4 g | 15.71% |
| isobutanol | 543.6 g | 3.93% |
| n-butanol | 626.0 g | 4.52% |
| methyl amyl ketone | 3,509.5 g | 25.35% |
| EEP | 352.0 g | 2.54% |
| BCA | 116.0 g | 0.84% |
| Total | 13,842.0 g | 100.00% |

The solids fraction had the following composition:

| AT-400 polymer | 6,520.5 g | 74.99% |
|---|---|---|
| Cymel ® 323 polymer | 2,174.4 g | 25.01% |
| Total | 8,694.9 g | 100.00% |

The solvent fraction had the following composition and relative evaporation rates (butyl acetate=100):

| Solvent | Grams | Wt. % | RER |
| --- | --- | --- | --- |
| isobutanol | 543.6 g | 10.56% | 74 |
| n-butanol | 626.0 g | 12.16% | 44 |
| methyl amyl ketone | 3,509.5 g | 68.19% | 40 |
| EEP | 352.0 g | 6.84% | 11 |
| BCA | 116.0 g | 2.25% | 3 |
| Total | 5,147.1 g | 100.0% | |
| Overall Heat of Vap. | 94.0 cal/gm | | |

The precursor coating composition had the following properties:

| | | |
| --- | --- | --- |
| Solvent content | 370 | grams/liter |
| Relative evap. rate | 29 | (butyl acetate = 100) |
| Viscosity | — | centipoise |
| Weight solids | 62.82 | percent |
| Liquid density | 997 | grams/liter |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
| --- | --- |
| <50 | 89% |
| 50 to 100 | 11% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 65 C. and various pressures, which gave a clear single-phase solution. The viscosity was less than 30 centipoise. Panels were sprayed using a Spraymarion automatic sprayer, flashed, and baked at 120 C. for twenty minutes. The polymeric coatings were thin, clear, glossy, coherent, smooth, and bubble free. They had the following average properties:

| Spray Pressure | Coating Thickness | 20-Degree Gloss | DOI |
| --- | --- | --- | --- |
| 1500 psi | 1.10 mil | 85% | 75% |
| 1500 psi | 1.26 mil | 89% | 88% |
| 1500 psi | 1.53 mil | 91% | 89% |
| 1500 psi | 1.60 mil | 91% | 89% |
| 1650 psi | 1.08 mil | 83% | 76% |
| 1650 psi | 1.28 mil | 88% | 83% |
| 1650 psi | 1.58 mil | 92% | 90% |
| 1650 psi | 1.78 mil | 91% | 90% |
| 1750 psi | 1.39 mil | 91% | 85% |
| 1750 psi | 1.77 mil | 93% | 90% |

EXAMPLE 3

A precursor coating composition that gives clear acrylic coating was prepared from Acryloid® AT-400 resin and Cymel® 323 resin by mixing the resins with the solvents n-butanol, methyl amyl ketone and ethyl 3-ethoxypropionate (EEP) in the following proportions:

| | |
| --- | --- |
| Acryloid ® AT-400 | 8,694.0 g |
| Cymel ® 323 | 2,718.0 g |
| n-butanol | 626.0 g |
| methyl amyl ketone | 820.0 g |
| EEP | 928.0 g |
| Total | 13,786.0 g |

The precursor coating composition contained 63.07% solids fraction and 36.93% solvent fraction, with the following component composition:

| | | |
| --- | --- | --- |
| AT-400 polymer | 6,520.5 g | 47.30% |
| Cymel ® 323 polymer | 2,174.4 g | 15.77% |
| isobutanol | 543.6 g | 3.94% |
| n-butanol | 626.0 g | 4.54% |
| methyl amyl ketone | 2,993.5 g | 21.72% |
| EEP | 928.0 g | 6.73% |
| Total | 13,786.0 g | 100.00%. |

The solids fraction had the following composition:

| | | |
| --- | --- | --- |
| AT-400 polymer | 6,520.5 g | 74.99% |
| Cymel ® 323 polymer | 2,174.4 g | 25.01% |
| Total | 8,694.9 g | 100.00% |

The solvent fraction had the following composition and relative evaporation rates (butyl acetate=100):

| Solvent | Grams | Wt. % | RER |
| --- | --- | --- | --- |
| isobutanol | 543.6 g | 10.68% | 74 |
| n-butanol | 626.0 g | 12.29% | 44 |
| methyl amyl ketone | 2,993.5 g | 58.80% | 40 |
| EEP | 928.0 g | 18.23% | 11 |
| Total | 5,091.1 g | 100.00% | |

The precursor coating composition had the following properties:

| | | |
| --- | --- | --- |
| Solvent content | 370 | grams/liter |
| Relative evap. rate | 28 | (butyl acetate = 100) |
| Weight solids | 63.07 | percent |
| Liquid density | 1004 | grams/liter |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
| --- | --- |
| <50 | 89% |
| 50 to 100 | 11% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 29% was sprayed at a temperature of 60 C. and a pressure of 1600 psig, which gave a clear single-phase solution. The viscosity was less than 30 centipoise. Panels were sprayed using a Spraymation automatic sprayer, flashed, and baked. The polymeric coatings were thin, clear, glossy, coherent, smooth, and bubble free. The thicker coatings did not sag or run or have solvent popping. They had the following average properties:

| Coating Thickness | 20-Degree Gloss | DOI |
|---|---|---|
| 1.10 mil | 88% | 85% |
| 1.19 mil | 90% | 85% |
| 1.28 mil | 90% | 90% |
| 1.46 mil | 91% | 90% |
| 1.59 mil | 91% | 90% |
| 1.65 mil | 92% | 92% |
| 1.94 mil | 92% | 92% |
| 2.05 mil | 90% | 90% |

EXAMPLE 4

A precursor coating composition that gives a clear acrylic coating was prepared from Acryloid® AT-400 resin and Cymel® 323 resin by mixing the resins with the solvents n-butanol, ethyl 3-ethoxypropionate (EEP), xylene, butyl CELLOSOLVE® acetate (BCA), and aromatic 100 in the following proportions:

| | |
|---|---|
| Acryloid ® AT-400 | 8,694.0 g |
| Cymel ® 323 | 2,718.0 g |
| n-butanol | 265.0 g |
| EEP | 450.0 g |
| xylene | 312.0 g |
| aromatic 100 | 30.0 g |
| BCA | 20.0 g |
| 1% 15310 in xylene | 10.0 g |
| Total | 12,499.0 g |

The precursor coating composition contained 69.56% solids fraction and 30.44% solvent fraction, with the following component composition:

| | |
|---|---|
| AT-400 polymer | 6,520.5 g |
| Cymel ® 323 polymer | 2,174.4 g |
| isobutanol | 543.6 g |
| n-butanol | 265.0 g |
| methyl amyl ketone | 2,173.5 g |
| EEP | 450.0 g |
| xylene | 321.9 g |
| aromatic 100 | 30.0 g |
| BCA | 20.0 g |
| L5310 | 0.1 g |
| Total | 12,499.0 g |

The solids fraction had the following composition:

| | | |
|---|---|---|
| AT-400 polymer | 6,520.5 g | 74.99% |
| Cymel ® 323 polymer | 2,174.4 g | 25.01% |
| Total | 8,694.9 g | 100.00% |

The solvent fraction had the following composition and relative evaporation rate s (butyl acetate=100):

| Solvent | Grams | Wt. % | RER |
|---|---|---|---|
| isobutanol | 543.6 g | 14.29% | 74 |
| xylene | 321.9 g | 8.46% | 70 |
| n-butanol | 265.0 g | 6.97% | 44 |
| methyl amyl ketone | 2,173.5 g | 57.13% | 40 |
| aromatic 100 | 30.0 g | 0.79% | 20 |
| EEP | 450.0 g | 11.83% | 11 |
| BCA | 20.0 g | 0.53% | 3 |
| Total | 3,804.0 g | 100.00% | |

The precursor coating composition had the following properties:

| | |
|---|---|
| Solvent content | 312 grams/liter |
| Relative evap. rate | 31 (butyl acetate = 100) |
| Viscosity | 3500 centipoise (60 rpm) |
| | 2400 centipoise (6 rpm) |
| Weight solids | 69.56 percent |
| Liquid density | 1025 grams/liter |
| Acryloid* AT-400 | |
| Molecular weight | 9,280 weight average (Mw) |
| Molecular weight | 3,270 number average (Mn) |
| Mw/Mn | 2.84 |

The solvent fraction had the following distribution of solvent by relative evaporation rate:

| | |
|---|---|
| <50 | 77% |
| 50 to 100 | 23% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 67 C. and a pressure of 1900 psig, which gave a clear single-phase solution but was near the solubility limit. Panels were sprayed using a Spraymation automatic sprayer, flashed, and baked. The polymeric coatings were thin, clear, glossy, coherent, smooth, and bubble free. The thicker coatings did not sag or run or have solvent popping, although some orange peel was present. They had the following average properties:

| Coating Thickness | 20-Degree Gloss |
|---|---|
| 2.8 mil | 91% |
| 2.7 mil | 91% |
| 2.6 mil | 92% |
| 2.5 mil | 91% |
| 2.2 mil | 93% |
| 2.1 mil | 91% |
| 2.0 mil | 90% |
| 1.9 mil | 90% |
| 1.7 mil | 88% |
| 1.5 mil | 86% |

EXAMPLE 5

A precursor coating composition that gives a white pigmented acrylic coating was prepared from Acryloid®

AT-400 resin and Cymel® 323 resin by mixing the resins with Du Pont white titanium dioxide pigment R902; the solvents n-butanol and methyl amyl ketone; and 10% Union Carbide silicone surfactant L5310 dissolved in xylene, in the following proportions:

| pigment R902 | 1,182.3 g |
|---|---|
| Acryloid® AT-400 | 1,445.3 g |
| Cymel® 323 | 451.6 g |
| n-butanol | 343.2 g |
| methyl amyl ketone | 290.9 g |
| 10% L5310 in xylene | 1.7 g |
| Total | 3,715.0 g |

The precursor coating composition contained 70.73% solids fraction and 29.27% solvent fraction, with the following component composition:

| pigment R902 | 1,182.3 g | 31.83% |
|---|---|---|
| AT-400 polymer | 1,084.0 g | 29.18% |
| Cymel® 323 polymer | 361.3 g | 9.72% |
| isobutanol | 90.3 g | 2.43% |
| xylene | 1.5 g | 0.04% |
| n-butanol | 343.2 g | 9.24% |
| methyl amyl ketone | 652.2 g | 17.56% |
| L5310 | 0.2 g | 0.00% |
| Total | 3,715.0 g | 100.00% |

The polymer fraction had the following composition:

| AT-400 polymer | 1,084.0g | 75.00% |
|---|---|---|
| Cymel® 323 polymer | 361.3g | 25.00% |
| Total | 1,445.3g | 100.00% |

The solvent fraction had the following composition and relative evaporation rates (butyl acetate=100):

| Solvent | Grams | Wt. % | RER |
|---|---|---|---|
| isobutanol | 90.3 g | 8.31% | 74 |
| xylene | 1.5 g | 0.14% | 70 |
| n-butanol | 343.2 g | 31.56% | 44 |
| methyl amyl ketone | 652.2 g | 59.99% | 40 |
| Total | 1,087.2 g | 100.00% | |
| Overall Heat of Vap. | 105.3 cal/gm | | |

The precursor coating composition had the following properties:

| Solvent content | 376 grams/liter |
|---|---|
| Relative evap. rate | 43 (butyl acetate = 100) |
| viscosity | 1180 centipoise (60 rpm) |
| | 925 centipoise (6 rpm) |
| Weight solids | 70.73 percent |
| Liquid density | 1286 grams/liter |
| Acryloid* AT-400 | |
| Molecular weight | 9,280 weight average (Mw) |
| Molecular weight | 3,270 number average (Mn) |
| Mw/Mn | 2.84 |

The solvent fraction had the following distribution of solvent by relative evaporation rate:

| <50 | 92% |
|---|---|
| 50 to 100 | 8% |
| 101 to 250 | 0% |
| >250 | 0% |

The admixed liquid mixture was sprayed using a Nordson A4B circulating airless hand spray gun model #152-200 with Nordson spray tip #0004/08, which has a 9-mil orifice size and an 8-inch fan width rating.

The precursor coating composition and carbon dioxide were pressurized, mixed, heated, and sprayed in the batch mode. The admixed liquid mixture had a carbon dioxide content of 28.0%, which gave a single-phase solution. Test panels were sprayed at different temperatures and pressures and to various thicknesses. The panels were baked at a temperature of 120 C. for twenty minutes. The panels were covered by thin white glossy coherent polymeric coatings having the following average properties:

| Temp | Pressure | Coating Thickness | 20-Degree Gloss | 60-Degree Gloss | DOI |
|---|---|---|---|---|---|
| 50 C. | 1400 psi | 1.2 mil | 46% | 83% | 70% |
| 50 C. | 1600 psi | 1.1 mil | 49% | 84% | 65% |
| 50 C. | 1600 psi | 1.2 mil | 51% | 84% | 75% |
| 50 C. | 1600 psi | 1.3 mil | 53% | 85% | 75% |
| 50 C. | 1600 psi | 1.4 mil | 52% | 85% | 75% |
| 55 C. | 1600 psi | 1.0 mil | 46% | 83% | 75% |
| 60 C. | 1400 psi | 1.3 mil | 56% | 86% | 80% |
| 60 C. | 1600 psi | 1.1 mil | 57% | 86% | 80% |
| 60 C. | 1600 psi | 1.2 mil | 59% | 88% | 80% |
| 60 C. | 1600 psi | 1.3 mil | — | — | 85% |
| 60 C. | 1600 psi | 1.4 mil | — | — | 90% |
| 60 C. | 1600 psi | 1.6 mil | 60% | 88% | 85% |
| 60 C. | 1600 psi | 1.7 mil | 58% | 86% | 90% |
| 60 C. | 1600 psi | 1.9 mil | 60% | 87% | 90% |

EXAMPLE 6

A precursor coating composition that gives clear acrylic coating was prepared from Acryloid® AT-400 resin, Rohm & Haas Acryloid® AT-954 resin, which contains 80% non-volatile acrylic polymer dissolved in 20% methyl amyl ketone solvent, and Cymel® 323 resin, by mixing the resins with the solvents n-butanol, ethyl 3-ethoxypropionate (EEP), methyl amyl ketone, and xylene in the following proportions:

| Acryloid® AT-400 | 6,520.5 g |
|---|---|
| Acryloid® AT-954 | 1,917.8 g |
| Cymel® 323 | 2,718.0 g |
| n-butanol | 626.0 g |
| EEP | 889.0 g |
| methyl amyl ketone | 320.0 g |
| xylene | 39.0 g |
| Total | 13,030.3 g |

The precursor coating composition contained 66.73% solids fraction and 32.97% solvent fraction, with the following component composition:

| AT-400 polymer | 4,890.4 g | 37.53% |
|---|---|---|
| AT-954 polymer | 1,630.1 g | 12.51% |
| Cymel® 323 polymer | 2,174.4 g | 16.69% |
| isobutanol | 543.6 g | 4.17% |
| xylene | 39.0 g | 0.30% |
| n-butanol | 626.0 g | 4.80% |
| methyl amyl ketone | 2,237.8 g | 17.18% |

| | | |
|---|---|---|
| EEP | 889.0 g | 6.82% |
| Total | 13,030.0 g | 100.00% |

The solids fraction had the following composition:

| | | |
|---|---|---|
| AT-400 polymer | 4,890.4 g | 56.24% |
| AT-954 polymer | 1,630.1 g | 18.75% |
| Cymel® 323 polymer | 2,174.4 g | 25.01% |
| Total | 8,694.9 g | 100.00% |

The solvent fraction had the following composition and relative evaporation rates (butyl acetate=100):

| Solvent | Grams | Wt. % | RER |
|---|---|---|---|
| isobutanol | 543.6 g | 12.54% | 74 |
| xylene | 39.0 g | 0.90% | 70 |
| n-butanol | 626.0 g | 14.44% | 44 |
| methyl amyl ketone | 2,237.8 g | 51.61% | 40 |
| EEP | 889.0 g | 20.51% | 11 |
| Total | 4,335.4 g | 100.00% | |

The precursor coating composition had the following properties:

| | |
|---|---|
| Solvent content | 336 grams/liter |
| Relative evap. rate | 27 (butyl acetate = 100) |
| viscosity | 670 centipoise |
| Weight solids | 66.73 percent |
| Liquid density | 1013 grams/liter |
| $CO_2$ solubility | 0.359 percent (1 atmosphere) |
| Acryloid* AT-400 | |
| Molecular weight | 9,280 weight average (Mw) |
| Molecular weight | 3,270 number average (Mn) |
| Mw/Mn | 2.84 |
| Acryloid* AT-954 | |
| Molecular weight | 6,070 weight average (Mw) |
| Molecular weight | 1,670 number average (Mn) |
| Mw/Mn | 3.63 (bimodal) |

The solvent fraction had the following distribution of solvent by relative evaporation rate:

| | |
|---|---|
| <50 | 87% |
| 50 to 100 | 13% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a various temperatures and pressures, all of which gave a clear single-phase solution. The viscosity was about 7–10 centipoise. Panels were sprayed using a Spraymation automatic sprayer, flashed, and baked. The polymeric coatings were thin, clear, glossy, coherent, smooth, and bubble free. The thicker coatings did not sag or run or have solvent popping. They had the following average properties:

| Pressure | Coating Thickness | 20-Degree Gloss | DOI |
|---|---|---|---|
| Temperature 60 C. | | | |
| 1600 psi | 1.10 mil | 90% | 90% |
| 1600 psi | 1.20 mil | 91% | 90% |
| 1600 psi | 1.30 mil | 92% | 93% |
| 1600 psi | 1.35 mil | 91% | 92% |
| 1600 psi | 1.50 mil | 93% | 93% |
| 1600 psi | 1.55 mil | 93% | 94% |
| 1600 psi | 1.60 mil | 92% | 93% |
| 1600 psi | 1.70 mil | 94% | 95% |
| 1600 psi | 1.77 mil | 93% | 95% |
| 1600 psi | 2.00 mil | 94% | 95% |
| Temperature 55 C. | | | |
| 1350 psi | 1.20 mil | 90% | 85% |
| 1350 psi | 1.42 mil | 90% | 88% |
| 1350 psi | 1.70 mil | 93% | 92% |
| 1350 psi | 2.10 mil | 94% | 93% |
| 1575 psi | 1.46 mil | 92% | 93% |
| 1575 psi | 1.70 mil | 93% | 94% |
| 1575 psi | 1.90 mil | 94% | 95% |
| 1950 psi | 1.50 mil | 92% | 94% |
| 1950 psi | 1.80 mil | 93% | 94% |
| 1950 psi | 2.10 mil | 94% | 95% |

To the precursor coating composition was added 0.6% of a 50% solution of Union Carbide L 5310 surfactant in xylene. Coatings were sprayed at a temperature of 60 C. and a pressure of 1600 psi, using various Nordson spray tips:

| | | |
|---|---|---|
| #016-024 | 11 mil orifice | 8-inch fan rating |
| #016-015 | 9 mil orifice | 10-inch fan rating |
| #016-011 | 9 mil orifice | 2-inch fan rating |

The coatings had the following properties:

| Spray Tip | Coating Thickness | 20-Degree Gloss | DOI |
|---|---|---|---|
| 016-024 | 1.7 mil | 92% | 92% |
| 016-024 | 2.4 mil | 93% | 95% |
| 016-024 | 2.6 mil | 94% | 95% |
| 016-024 | 2.8 mil | 94% | 95% |
| 016-024 | 3.0 mil | 91% | 90% |
| 016-015 | 1.9 mil | 90% | 88% |
| 016-011 | 1.7 mil | 89% | 85% |
| 016-011 | 2.0 mil | 92% | 92% |
| 016-011 | 3.0 mil | 93% | 95% |

EXAMPLE 7

A precursor coating composition that gives clear acrylic coating was prepared from Acryloid® AT-400 resin, Acryloid® AT-954 resin, and Cymel® 323 resin, by mixing the resins with the solvents n-butanol, ethyl 3-ethoxypropionate (EEP), methyl amyl ketone, and xylene in the following proportions:

| | |
|---|---|
| Acryloid ® AT-954 | 1,383.3 g |
| Acryloid ® AT-400 | 4,703.2 g |
| Cymel ® 323 | 1,960.5 g |
| n-butanol | 451.5 g |
| EEP | 641.2 g |
| methyl amyl ketone | 1,832.1 g |
| 50% L5310 in xylene | 28.1 g |
| Total | 10,999.9 g |

The precursor coating composition contained 57.02% solids fraction and 42.98% solvent fraction, with the following component composition:

| AT-954 polymer | 1,175.8 g | 10.69% |
|---|---|---|
| AT-400 polymer | 3,527.4 g | 32.07% |
| Cymel ® 323 polymer | 1,568.4 g | 14.26% |
| isobutanol | 392.1 g | 3.56% |
| xylene | 14.0 g | 0.13% |
| n-butanol | 451.5 g | 4.10% |
| methyl amyl ketone | 3,215.4 g | 29.23% |
| EEP | 641.2 g | 5.83% |
| L5310 | 14.1 g | 0.13% |
| Total | 10,999.9 g | 100.00% |

The solids fraction had the following composition:

| AT-954 polymer | 1,175.8 g | 18.75% |
|---|---|---|
| AT-400 polymer | 3,527.4 g | 56.24% |
| Cymel ® 323 polymer | 1,568.4 g | 25.01% |

The solvent fraction had the following composition and relative evaporation rates (butyl acetate=100):

| Solvent | Grams | Wt. % | RER |
|---|---|---|---|
| isobutanol | 392.1 g | 8.31% | 74 |
| xylene | 14.0 g | 0.30% | 70 |
| n-butanol | 451.5 g | 9.58% | 44 |
| methyl amyl ketone | 3,215.4 g | 68.21% | 40 |
| EEP | 641.2 g | 13.60% | 11 |
| Overall Heat of Vap. | 90.7 cal/gm | | |

The precursor coating composition had the following properties:

| Solvent content | 419 grams/liter |
|---|---|
| Relative evap. rate | 30 (butyl acetate = 100) |
| viscosity | 146 centipoise |
| Weight solids | 57.02 percent |
| Liquid density | 978 grams/liter |
| Acryloid* AT-400 | |
| Molecular weight | 9,280 weight average (Mw) |
| Molecular weight | 3,270 number average (Mn) |
| Mw/Mn | 2.84 |

The solvent fraction had the following distribution of solvent by relative evaporation rate:

| <50 | 91% |
|---|---|
| 50 to 100 | 9% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and a pressures of 1200 and 1600 psig, all of which gave a clear single-phase solution. The viscosity was less than 7 centipoise. Panels were sprayed using a Spraymation automatic sprayer, flashed, and baked. The polymeric coatings were thin, clear, and coherent, but the finish was duller and orange peel more pronounced than in Example 6, even though the present formulation contains a higher proportion of solvent than in Example 6. Some coatings had bubbles. The coatings had the following properties:

| Pressure | Coating Thickness | 20-Degree Gloss |
|---|---|---|
| 1200 psi | 0.8 mil | 60% |
| 1200 psi | 1.0 mil | 68% |
| 1200 psi | 1.4 mil | 82% |
| 1200 psi | 1.7 mil | 88% |
| 1600 psi | 0.7 mil | 50% |
| 1600 psi | 0.8 mil | 60% |
| 1600 psi | 1.0 mil | 66% |
| 1600 psi | 1.2 mil | 80% |
| 1600 psi | 1.3 mil | 79% |
| 1600 psi | 1.5 mil | 84% |
| 1600 psi | 1.8 mil | 87% |

A higher spray temperature of 70 C. was tried, which improved the coatings; they had the following properties:

| Pressure | Coating Thickness | 20-Degree Gloss |
|---|---|---|
| 1600 psi | 1.0 mil | 71% |
| 1600 psi | 1.2 mil | 82% |
| 1600 psi | 1.7 mil | 90% |
| 1600 psi | 2.1 mil | 92% |

An admixed liquid mixture with a higher carbon dioxide content of 33% was sprayed at a temperature of 60 C. and a pressure 1600 psig, which gave a single-phase solution. This also improved the coatings; they had the following properties:

| Pressure | Coating Thickness | 20-Degree Gloss |
|---|---|---|
| 1600 psi | 0.8 mil | 61% |
| 1600 psi | 1.1 mil | 80% |
| 1600 psi | 1.5 mil | 88% |
| 1600 psi | 1.9 mil | 91% |

In order to obtain the same coating thickness, it was found necessary to spray more material than in Example 6, which contained less solvent.

EXAMPLE 8

A precursor coating composition that gives clear acrylic coating was prepared from Acryloid® AT-400 resin, Acryloid® AT-954 resin, and Cymel® resin, by mixing the resins with the solvents n-butanol, ethyl 3-ethoxypropionate (EEP), methyl amyl ketone, and xylene in the following proportions:

| Acryloid ® AT-400 | 4,096.2 g |
|---|---|
| Acryloid ® AT-954 | 1,204.8 g |
| Cymel ® 323 | 1,707.5 g |
| n-butanol | 393.3 g |
| EEP | 558.5 g |
| methyl amyl ketone | 3,015.3 g |
| xylene | 24.5 g |
| 50% L5310 in xylene | 32.9 g |
| Total | 11,033.0 g |

The precursor coating composition contained 49.51% solids fraction and 50.49% solvent fraction, with the following component composition:

| | | |
|---|---|---|
| AT-400 polymer | 3,072.2 g | 27.85% |
| AT-954 polymer | 1,024.1 g | 9.28% |
| Cymel ® 323 polymer | 1,366.0 g | 12.38% |
| isobutanol | 341.5 g | 3.10% |
| xylene | 41.0 g | 0.37% |
| n-butanol | 393.3 g | 3.57% |
| methyl amyl ketone | 4,220.1 g | 38.25% |
| EEP | 558.5 g | 5.06% |
| L5310 | 16.4 g | 0.14% |
| Total | 11,033.1 g | 100.00% |

The solids fraction had the following composition:

| | | |
|---|---|---|
| AT-400 polymer | 3,072.2 g | 56.24% |
| AT-954 polymer | 1,024.1 g | 18.75% |
| Cymel ® 323 polymer | 1,366.0 g | 25.01% |

The solvent fraction had the following composition and relative evaporation rates (butyl acetate=100):

| Solvent | Grams | Wt. % | RER |
|---|---|---|---|
| isobutanol | 341.5 g | 6.15% | 74 |
| xylene | 41.0 g | 0.74% | 70 |
| n-butanol | 393.3 g | 7.08% | 44 |
| methyl amyl ketone | 4,220.1 g | 75.97% | 40 |
| EEP | 558.5 g | 10.06% | 11 |
| Total | 5,554.4 g | 100.00% | |

The precursor coating composition had the following properties:

| | |
|---|---|
| Solvent content | 482 grams/liter |
| Relative evap. rate | 33 (butyl acetate = 100) |
| viscosity | 62 centipoise |
| Weight solids | 49.51 percent |
| Liquid density | 955 grams/liter |
| CO2 solubility | 0.417 percent (1 atmosphere) |
| Acryloid* AT-400 | |
| Molecular weight | 9,280 weight average (Mw) |
| Molecular weight | 3,270 number average (Mn) |
| Mw/Mn | 2.84 |

The solvent fraction had the following distribution of solvent by relative evaporation rate:

| | |
|---|---|
| <50 | 93% |
| 50 to 100 | 7% |
| 101 to 250 | 0% |
| >250 | 0% |

The admixed liquid mixture was sprayed using a Nordson A7A circulating airless automatic spray gun with spray tip 016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and a pressures of 1200 and 1600 psig, all of which gave a clear single-phase solution. The viscosity was about 5 centipoise. Panels were sprayed using a Spraymation automatic sprayer, flashed, and baked. The polymeric coatings were thin, clear, and coherent, but the finish was duller and orange peel more pronounced than in Examples 6 and 7, even though the present formulation contains a higher proportion of solvent than in Examples 6 and 7. Some coatings had bubbles and the surfaces were pitted. The coatings had the following properties:

| Pressure | Coating Thickness | 20-Degree Gloss |
|---|---|---|
| 1200 psi | 0.8 mil | 46% |
| 1200 psi | 1.0 mil | 55% |
| 1200 psi | 1.1 mil | 66% |
| 1200 psi | 1.2 mil | 81% |
| 1200 psi | 1.4 mil | 85% |
| 1200 psi | 1.5 mil | 81% |
| 1200 psi | 2.4 mil | 60% |
| 1600 psi | 0.6 mil | 54% |
| 1600 psi | 0.7 mil | 64% |
| 1600 psi | 1.0 mil | 62% |
| 1600 psi | 1.4 mil | 79% |
| 1600 psi | 1.8 mil | 85% |
| 1600 psi | 2.2 mil | 82% |
| 1600 psi | 2.9 mil | 50% |

In order to obtain the same coating thickness, it was necessary to spray much more material than in Examples 6 and 7, which contained less solvent.

EXAMPLE 9

A precursor coating composition that gives a clear acrylic coating was prepared from Acryloid® AT-400 resin, Acryloid® AT-954 resin, and Cymel® resin, by mixing the resins with the solvents n-butanol, ethyl 3-ethoxypropionate (EEP), and butyl acetate, in the following proportions:

| | |
|---|---|
| Acryloid ® AT-40 | 6,520.5 g |
| Acryloid ® AT-954 | 1,917.8 g |
| Cymel ® 323 | 2,718.0 g |
| n-butanol | 626.0 g |
| EEP | 760.0 g |
| butyl acetate | 432.0 g |
| 50% L5310 in xylene | 78.0 g |
| Total | 13,052.3 g |

The precursor coating composition contained 66.62% solids fraction and 33.38% solvent fraction, with the following component composition:

| | | |
|---|---|---|
| AT-400 polymer | 4,890.4 g | 37.47% |
| AT-954 polymer | 1,630.1 g | 12.49% |
| Cymel ® 323 polymer | 2,174.4 g | 16.66% |
| isobutanol | 543.6 g | 4.16% |
| xylene | 39.0 g | 0.30% |
| n-butanol | 626.0 g | 4.80% |
| methyl amyl ketone | 1,917.8 g | 14.69% |
| butyl acetate | 432.0 g | 3.31% |
| EEP | 760.0 g | 5.82% |
| L5310 | 39.0 g | 0.30% |
| Total | 13,052.3 g | |

The solids fraction had the following composition:

| | | |
|---|---|---|
| AT-400 polymer | 4,890.4 g | 56.24% |
| AT-954 polymer | 1,630.1 g | 18.75% |
| Cymel ® 323 polymer | 2,174.4 g | 25.01% |
| Total | 8,694.9 g | 100.00% |

The solvent fraction had the following composition and relative evaporation rates (butyl acetate=100):

| Solvent | Grams | Wt. % | RER |
|---|---|---|---|
| butyl acetate | 432.0 g | 10.00% | 100 |
| isobutanol | 543.6 g | 12.59% | 74 |
| xylene | 39.0 g | 0.90% | 70 |
| n-butanol | 626.0 g | 14.50% | 44 |
| methyl amyl ketone | 1,917.8 g | 44.41% | 40 |
| EEP | 760.0 g | 17.60% | 11 |
| Total | 4,318.4 g | 100.00% | |

The precursor coating composition had the following properties:

| | | |
|---|---|---|
| Solvent content | 336 | grams/liter |
| Relative evap. rate | 30 | (butyl acetate = 100) |
| viscosity | 640 | centipoise |
| Weight solids | 66.62 | percent |
| Liquid density | 1007 | grams/liter |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 77% |
| 50 to 100 | 23% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and a pressure of 1600 psig, which gave a clear single-phase solution. Panels were sprayed using a Spraymarion automatic sprayer, flashed, and baked. The polymeric coatings were thin, clear, glossy, coherent, smooth, and bubble free. The thicker coatings did not sag or run or have solvent popping. They had the following average properties:

| Coating Thickness | 20-Degree Gloss |
|---|---|
| 0.7 mil | 71% |
| 0.9 mil | 79% |
| 1.0 mil | 85% |
| 1.3 mil | 90% |
| 1.5 mil | 93% |
| 2.0 mil | 95% |

EXAMPLE 10

A precursor coating composition that gives a clear acrylic coating was prepared from Acryloid® AT-400 resin, Acryloid® AT-954 resin, and Cymel® resin, by mixing the resins with the solvents n-butanol, ethyl 3-ethoxypropionate (EEP), and butyl acetate, in the following proportions:

| | |
|---|---|
| Acryloid ® AT-400 | 4,995.7 g |
| Acryloid ® AT-954 | 1,469.3 g |
| Cymel ® 323 | 2,082.4 g |
| n-butanol | 479.6 g |
| EEP | 251.3 g |
| butyl acetate | 662.0 g |
| 50% L5310 in xylene | 59.8 g |
| Total | 10,000.1 g |

The precursor coating composition contained 66.62% solids fraction and 33.38% solvent fraction, with the following component composition:

| | | |
|---|---|---|
| AT-400 polymer | 3,746.8 g | 37.47% |
| AT-954 polymer | 1,248.9 g | 12.49% |
| Cymel ® 323 polymer | 1,665.9 g | 16.66% |
| isobutanol | 416.5 g | 4.16% |
| xylene | 29.9 g | 0.30% |
| n-butanol | 479.6 g | 4.80% |
| methyl amyl ketone | 1,469.3 g | 14.69% |
| butyl acetate | 662.0 g | 6.62% |
| EEP | 251.3 g | 2.51% |
| L5310 | 29.9 g | 0.30% |
| Total | 10,000.1 g | 100.00% |

The solids fraction had the following composition:

| | | |
|---|---|---|
| AT-400 polymer | 3,746.8 g | 56.24% |
| AT-954 polymer | 1,248.9 g | 18.75% |
| Cymel ® 323 polymer | 1,665.9 g | 25.01% |
| Total | 6,661.6 g | 100.00% |

The solvent fraction had the following composition and relative evaporation rates (butyl acetate=100):

| Solvent | Grams | Wt. % | RER |
|---|---|---|---|
| butyl acetate | 662.0 g | 20.01% | 100 |
| isobutanol | 416.5 g | 12.59% | 74 |
| xylene | 29.9 g | 0.90% | 70 |
| n-butanol | 479.6 g | 14.50% | 44 |
| methyl amyl ketone | 1,469.3 g | 44.41% | 40 |
| EEP | 251.3 g | 7.59% | 11 |
| Total | 3,308.6 g | 100.00% | |
| Overall Heat of Vap. | 95.3 cal/gm | | |

The precursor coating composition had the following properties:

| | | |
|---|---|---|
| Solvent content | 337 | grams/liter |
| Relative evap. rate | 40 | (butyl acetate = 100) |
| viscosity | 693 | centipoise |
| Weight solids | 66.62 | percent |
| Liquid density | 1011 | grams/liter |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 67% |
| 50 to 100 | 33% |
| 101 to 250 | 0% |

| | |
|---|---|
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating-composition and carbon dioxide were pressurized, mixed, heated, and sprayed in the continuous mode. An admixed liquid mixture with a carbon dioxide content of 30% was sprayed at a temperature of 60 C. and a pressure of 1600 psig, which gave a clear single-phase solution. Panels were sprayed using a Spraymation automatic sprayer, flashed, and baked. The polymeric coatings were thin, clear, glossy, coherent, smooth, and bubble free. The thicker coatings did not sag or run or have solvent popping. They had the following average properties:

| Coating Thickness | 20-Degree Gloss |
|---|---|
| 0.8 mil | 85% |
| 1.0 mil | 88% |
| 1.1 mil | 90% |
| 1.2 mil | 91% |
| 1.4 mil | 92% |
| 1.7 mil | 93% |

EXAMPLE 11

A precursor coating composition that gives clear acrylic coating was prepared from Acryloid® AT-400 resin, Acryloid® AT-954 resin, and Cymel® 323 resin, by mixing the resins with the solvents n-butanol, ethyl 3-ethoxypropionate (EEP), methyl amyl ketone, butyl acetate, and xylene in the following proportions:

| | |
|---|---|
| Acryloid ® AT-954 | 1,398.0 g |
| Acryloid ® AT-400 | 4,753.1 g |
| Cymel ® 323 | 1,981.3 g |
| n-butanol | 456.3 g |
| EEP | 648.0 g |
| methyl amyl ketone | 233.3 g |
| butyl acetate | 1,501.6 g |
| 50% L5310 in xylene | 28.4 g |
| Total | 11,000.0 g |

The precursor coating composition contained 57.62% solids fraction and 42.38% solvent fraction, with the following component composition:

| | | |
|---|---|---|
| AT-954 polymer | 1,188.3 g | 10.80% |
| AT-400 polymer | 3,564.8 g | 32.41% |
| Cymel ® 323 polymer | 1,585.0 g | 14.41% |
| butyl acetate | 1,501.6 g | 13.65% |
| isobutanol | 396.3 g | 3.60% |
| xylene | 14.2 g | 0.13% |
| n-butanol | 456.3 g | 4.15% |
| methyl amyl ketone | 1,631.3 g | 14.83% |
| EEP | 648.0 g | 5.89% |
| L5310 | 14.2 g | 0.13% |
| Total | 11,000.0 g | 100.00% |

The solids fraction had the following composition:

| | | |
|---|---|---|
| AT-954 polymer | 1,188.3 g | 18.75% |
| AT-400 polymer | 3,564.8 g | 56.24% |
| Cymel ® 323 polymer | 1,585.0 g | 25.01% |

The solvent fraction had the following composition and relative evaporation rates (butyl acetate=100):

| Solvent | Grams | Wt. % | RER |
|---|---|---|---|
| butyl acetate | 1,501.6 g | 32.31% | 100 |
| isobutanol | 396.3 g | 8.53% | 74 |
| xylene | 14.2 g | 0.30% | 70 |
| n-butanol | 456.3 g | 9.82% | 44 |
| methyl amyl ketone | 1,631.3 g | 35.10% | 40 |
| EEP | 648.0 g | 13.94% | 11 |
| Overall Heat of Vap. | | 88.7 cal/gm | |

The precursor coating composition had the following properties:

| | | |
|---|---|---|
| Solvent content | 429 | grams/liter |
| Relative evap. rate | 36 | (butyl acetate = 100) |
| Viscosity | 190 | centipoise |
| Weight solids | 57.62 | percent |
| Liquid density | 996 | grams/liter |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 59% |
| 50 to 100 | 41% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, all of which gave a clear single-phase solution. The viscosity was less than 7 centipoise. Panels were sprayed using a Spraymation automatic sprayer, flashed, and baked. The polymeric coatings were thin, clear, and coherent, but the finish was duller and orange peel more pronounced than in Example 9 and 10, which contain a lower proportion of solvent. Some coatings had bubbles and coatings above 2.0-mil thickness had a foamed surface. The coatings had the following properties:

| Pressure | Coating Thickness | 20-Degree Gloss |
|---|---|---|
| 1200 psi | 1.2 mil | 83% |
| 1200 psi | 1.6 mil | 75% |
| 1200 psi | 1.9 mil | 62% |
| 1200 psi | >2.0 mil | foam |
| 1600 psi | 1.6 mil | 74% |
| 1600 psi | 1.9 mil | 75% |
| 1600 psi | >2.0 mil | foam |

In order to obtain the same coating thickness, it was necessary to spray much more material than in Examples 9, 10, and 11, which contained less solvent.

EXAMPLE 12

A precursor coating composition that gives clear acrylic coating was prepared from Acryloid® AT-400 resin, Acryloid® AT-954 resin, and Cymel® resin, by mixing the resins with the solvents n-butanol, ethyl 3-ethoxypropionate (EEP), methyl amyl ketone, butyl acetate, and xylene in the following proportions:

| | |
|---|---|
| Acryloid ® AT-954 | 1,234.0 g |
| Acryloid ® AT-400 | 4,195.6 g |
| Cymel ® 323 | 1,748.9 g |
| n-butanol | 402.8 g |
| EEP | 572.0 g |
| methyl amyl ketone | 205.9 g |
| butyl acetate | 2,615.6 g |
| xylene | 25.1 g |
| 50% L5310 in xylene | 32.9 g |
| Total | 11,032.8 g |

The precursor coating composition contained 50.71% solids fraction and 49.29% solvent fraction, with the following component composition:

| | | |
|---|---|---|
| AT-954 polymer | 1,048.9 g | 9.51% |
| AT-400 polymer | 3,146.7 g | 28.52% |
| Cymel ® 323 polymer | 1,399.1 g | 12.68% |
| butyl acetate | 2,615.6 g | 23.71% |
| isobutanol | 349.7 g | 3.17% |
| xylene | 41.6 g | 0.38% |
| n-butanol | 402.8 g | 3.65% |
| methyl amyl ketone | 1,439.9 g | 13.05% |
| EEP | 572.0 g | 5.18% |
| L5310 | 16.4 g | 0.15% |
| Total | 11,032.7 g | 100.00% |

The solids fraction had the following composition:

| | | |
|---|---|---|
| AT-954 polymer | 1,048.9 g | 18.75% |
| AT-400 polymer | 3,146.7 g | 56.24% |
| Cymel ® 323 polymer | 1,399.1 g | 25.01% |

The solvent fraction had the following composition and relative evaporation rates (butyl acetate=100):

| Solvent | Grams | Wt. % | RER |
|---|---|---|---|
| butyl acetate | 2,615.6 g | 48.25% | 100 |
| isobutanol | 349.7 g | 6.45% | 74 |
| xylene | 41.6 g | 0.76% | 70 |
| n-butanol | 402.8 g | 7.43% | 44 |
| methyl amyl ketone | 1,439.9 g | 26.56% | 40 |
| EEP | 572.0 g | 10.55% | 11 |
| Overall Heat of Vap. | | 85.6 cal/gm | |

The precursor coating composition had the following properties:

| | |
|---|---|
| Solvent content | 482 grams/liter |
| Relative evap. rate | 42 (butyl acetate = 100) |
| Viscosity | 66 centipoise |
| Weight solids | 50.71 percent |
| Liquid density | 979 grams/liter |
| CO2 solubility | — percent (1 atmosphere) |

-continued

| Acryloid* AT-400 | | |
|---|---|---|
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 45% |
| 50 to 100 | 55% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, all of which gave a clear single-phase solution. The viscosity was less than 7 centipoise. Panels were sprayed using a Spraymation automatic sprayer, flashed, and baked. The polymeric coatings were thin, clear, and coherent, but the finish was duller and orange peel more pronounced than in Example 9 and 10, which contain a lower proportion of solvent. Some coatings had bubbles and coatings above 2.0-mil thickness had a foamed surface. The coatings had the following properties:

| Pressure | Coating Thickness | 20-Degree Gloss |
|---|---|---|
| 1200 psi | 1.2 mil | 83% |
| 1200 psi | 1.6 mil | 75% |
| 1200 psi | 1.9 mil | 62% |
| 1200 psi | >2.0 mil | foam |
| 1600 psi | 1.6 mil | 74% |
| 1600 psi | 1.9 mil | 75% |
| 1600 psi | >2.0 mil | foam |

In order to obtain the same coating thickness, it was necessary to spray much more material than in Examples 9, 10, and 11, which contained less solvent.

EXAMPLE 13

A precursor coating composition that gives a clear acrylic coating was prepared from Acryloid® AT-400 resin, Acryloid® AT-954 resin, and Cymel® 323 resin, by mixing the resins with the solvents n-butanol, ethyl 3-ethoxypropionate (EEP), and methyl isobutyl ketone (MIBK), in the following proportions:

| | |
|---|---|
| Acryloid ® AT-400 | 4,995.7 g |
| Acryloid ® AT-954 | 1,469.3 g |
| Cymel ® 323 | 2,082.4 g |
| n-butanol | 479.6 g |
| EEP | 582.3 g |
| MIBK | 331.0 g |
| 50% L5310 in xylene | 59.8 g |
| Total | 10,000.1 g |

The precursor coating composition contained solids fraction and 33.38% solvent fraction, with the following component composition:

| | | |
|---|---|---|
| AT-400 polymer | 3,746.8 g | 37.47% |
| AT-954 polymer | 1,248.9 g | 12.49% |
| Cymel ® 323 polymer | 1,665.9 g | 16.66% |
| isobutanol | 416.5 g | 4.16% |
| xylene | 29.9 g | 0.30% |
| n-butanol | 479.6 g | 4.80% |
| methyl amyl ketone | 1,469.3 g | 14.69% |
| MIBK | 331.0 g | 3.31% |
| EEP | 582.3 g | 5.82% |
| L5310 | 29.9 g | 0.30% |
| Total | 10,000.1 g | 100.00% |

The solids fraction had the following composition:

| | | |
|---|---|---|
| AT-400 polymer | 3,746.8 g | 56.24% |
| AT-954 polymer | 1,248.9 g | 18.75% |
| Cymel ® 323 polymer | 1,665.9 g | 25.01% |
| Total | 6,661.6 g | 100.00% |

The solvent fraction had the following composition and relative evaporation rates (butyl acetate=100):

| Solvent | Grams | Wt. % | RER |
|---|---|---|---|
| MIBK | 331.0 g | 10.00% | 162 |
| isobutanol | 416.5 g | 12.59% | 74 |
| xylene | 29.9 g | 0.90% | 70 |
| n-butanol | 479.6 g | 14.50% | 44 |
| methyl amyl ketone | 1,469.3 g | 44.41% | 40 |
| EEP | 582.3 g | 17.60% | 11 |
| Total | 3,308.6 g | 100.00% | |
| Overall Heat of Vap. | | 95.5 cal/gm | |

The precursor coating composition had the following properties:

| | | |
|---|---|---|
| Solvent content | 337 | grams/liter |
| Relative evap. rate | 30 | (butyl acetate = 100) |
| Viscosity | 720 | centipoise |
| Weight solids | 66.62 | percent |
| Liquid density | 1010 | grams/liter |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 77% |
| 50 to 100 | 13% |
| 101 to 250 | 10% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and a pressure of 1600 psig, which gave a clear single-phase solution. Panels were sprayed using a Spraymation automatic sprayer, flashed, and baked. The polymeric coatings were thin, clear, glossy, coherent, smooth, and bubble free. The thicker coatings did not sag or run or have solvent popping. They had the following average properties:

| Coating Thickness | 20-Degree Gloss |
|---|---|
| 0.8 mil | 79% |
| 0.9 mil | 82% |
| 1.1 mil | 86% |
| 1.2 mil | 89% |
| 1.4 mil | 91% |
| 1.7 mil | 94% |
| 2.0 mil | 94% |

EXAMPLE 14

A precursor coating composition that gives clear acrylic coating was prepared from Acryloid® AT-400 resin, Acryloid® AT-954 resin, and Cymel® resin, by mixing the resins with the solvents n-butanol, ethyl 3-ethoxypropionate (EEP), methyl amyl ketone, methyl isobutyl ketone (MIBK), and xylene in the following proportions:

| | |
|---|---|
| Acryloid ® AT-954 | 1,378.8 g |
| Acryloid ® AT-400 | 4,687.8 g |
| Cymel ® 323 | 1,954.1 g |
| n-butanol | 450.1 g |
| EEP | 639.1 g |
| methyl amyl ketone | 230.1 g |
| MIBK | 1,632.0 g |
| 50% L5310 in xylene | 28.0 g |
| Total | 11,000.0 g |

The precursor coating composition contained 65.01% solids fraction and 34.99% solvent fraction, with the following component composition:

| | | |
|---|---|---|
| AT-954 polymer | 1,172.0 g | 10.66% |
| AT-400 polymer | 3,515.8 g | 31.96% |
| Cymel ® 323 polymer | 1,563.3 g | 14.21% |
| MIBK | 1,632.0 g | 14.84% |
| isobutanol | 390.8 g | 3.55% |
| xylene | 14.0 g | 0.13% |
| n-butanol | 450.1 g | 4.09% |
| methyl amyl ketone | 1,608.9 g | 14.62% |
| EEP | 639.1 g | 5.81% |
| L5310 | 14.0 g | 0.13% |
| Total | 11,000.0 g | 100.00% |

The solids fraction had the following composition:

| | | |
|---|---|---|
| AT-954 polymer | 1,172.0 g | 18.75% |
| AT-400 polymer | 3,515.8 g | 56.24% |
| Cymel ® 323 polymer | 1,563.3 g | 25.01% |

The solvent fraction had the following composition and relative evaporation rates (butyl acetate=100):

| Solvent | Grams | Wt. % | RER |
|---|---|---|---|
| MIBK | 1,632.0 g | 34.47% | 162 |
| isobutanol | 390.8 g | 8.25% | 74 |
| xylene | 14.0 g | 0.29% | 70 |
| n-butanol | 450.1 g | 9.51% | 44 |
| methyl amyl ketone | 1,608.9 g | 33.98% | 40 |
| EEP | 639.1 g | 13.50% | 11 |
| Overall Heat of Vap. | | 91.8 cal/gm | |

The precursor coating composition had the following properties:

| | | |
|---|---|---|
| Solvent content | 419 | grams/liter |
| Relative evap. rate | 38 | (butyl acetate = 100) |
| Viscosity | 127 | centipoise |
| Weight solids | 56.83 | percent |
| Liquid density | 976 | grams/liter |
| $CO_2$ solubility | — | percent (1 atmosphere) |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 57% |
| 50 to 100 | 9% |
| 101 to 250 | 34% |
| >250 | 0% |

The admixed liquid mixture was sprayed using a Nordson A7A circulating airless automatic spray gun with spray tip 016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, all of which gave a clear single-phase solution. The viscosity was about 3 centipoise. Panels were sprayed using a Spraymation automatic sprayer, flashed, and baked. The polymeric coatings were thin, clear, and coherent, but the finish was duller and orange peel more pronounced than in Example 13, which contains a lower proportion of solvent. Some coatings had bubbles and coatings above 2.0 mil had a foamed surface. The coatings had the following properties:

| Pressure | Coating Thickness | 20-Degree Gloss |
|---|---|---|
| 1200 psi | 0.6 mil | 60% |
| 1200 psi | 0.9 mil | 75% |
| 1200 psi | 1.1 mil | 78% |
| 1200 psi | 1.3 mil | 82% |
| 1200 psi | 1.8 mil | 74% |
| 1600 psi | 0.8 mil | 74% |
| 1600 psi | 1.0 mil | 78% |
| 1600 psi | 1.3 mil | 83% |
| 1600 psi | 1.8 mil | 76% |
| 1600 psi | >2.0 mil | foam |

EXAMPLE 15

(COMPARISON EXAMPLE)

This example is not in accordance with the present invention inasmuch as too much fast solvent is utilized.

A precursor coating composition that gives a clear acrylic coating was prepared from Acryloid® AT-400 resin, Acryloid® AT-954 resin, and Cymel® resin, by mixing the resins with the solvents n-butanol, ethyl 3-ethoxypropionate (EEP), methyl amyl ketone, methyl isobutyl ketone (MIBK), and xylene in the following proportions:

| | |
|---|---|
| Acryloid ® AT-954 | 1,195.2 g |
| Acryloid ® AT-400 | 4,063.7 g |
| Cymel ® 323 | 1,693.9 g |
| n-butanol | 390.1 g |
| EEP | 554.0 g |
| methyl amyl ketone | 199.4 g |
| MIBK | 2,879.3 g |
| xylene | 24.3 g |
| 50% L5310 in xylene | 32.9 g |
| Total | 11,032.8 g |

The precursor coating composition contained 49.12% solids fraction and 50.88% solvent fraction, with the following component composition:

| | | |
|---|---|---|
| AT-954 polymer | 1,015.9 g | 9.21% |
| AT-400 polymer | 3,047.8 g | 27.63% |
| Cymel ® 323 polymer | 1,355.1 g | 12.28% |
| MIBK | 2,879.3 g | 26.09% |
| isobutanol | 338.8 g | 3.07% |
| xylene | 40.8 g | 0.37% |
| n-butanol | 390.1 g | 3.54% |
| methyl amyl ketone | 1,394.6 g | 12.64% |
| EEP | 554.0 g | 5.02% |
| L5310 | 16.4 g | 0.15% |
| Total | 11,032.8 g | 100.00% |

The solids fraction had the following composition:
AT-954 polymer 1,015.9 g 18.75%
AT-400 polymer 3,047.8 g 56.24%
Cymel® 323 polymer 1,355.1 g 25.01%

The solvent fraction had the following composition and relative evaporation rates (butyl acetate=100):

| Solvent | Grams | Wt. % | RER |
|---|---|---|---|
| MIBK | 2,879.3 g | 51.44% | 162 |
| isobutanol | 338.8 g | 6.05% | 74 |
| xylene | 40.8 g | 0.73% | 70 |
| n-butanol | 390.1 g | 6.97% | 44 |
| methyl amyl ketone | 1,394.6 g | 24.91% | 40 |
| EEP | 554.0 g | 9.90% | 11 |
| Overall Heat of Vap. | | 90.3 cal/gm | |

The precursor coating composition had the following properties:

| | | |
|---|---|---|
| Solvent content | 482 | grams/liter |
| Relative evap. rate | 48 | (butyl acetate = 100) |
| Viscosity | 54 | centipoise |
| Weight solids | 49.12 | percent |
| Liquid density | 950 | grams/liter |
| $CO_2$ solubility | — | percent (1 atmosphere) |
| Acryloid* AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 42% |
| 50 to 100 | 7% |
| 101 to 250 | 51% |
| >250 | 0% |

The admixed liquid mixture was sprayed using a Nordson A7A circulating airless automatic spray gun with tip #016-

014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, all of which gave a clear single-phase solution. Panels were sprayed using a Spraymation automatic sprayer, flashed, and baked. The polymeric coatings were thin, clear, and coherent, but the finish was duller and orange peel-more pronounced than in Example 13, which contains a lower proportion of solvent. The coatings had a hazy appearance when wet, which was caused by fine bubbles in the coating. Some of the dry coatings, although glossy, were also hazy. Much more spraying was required to build up film thickness than in Examples 13 and 14, which contained less solvent, such that thick coatings could not be produced within the operating limits of the Spraymation automatic sprayer for applying a single coat. The coatings had the following properties:

| Pressure | Coating Thickness | 20-Degree Gloss |
|---|---|---|
| 1200 psi | 0.6 mil | 31% |
| 1200 psi | 0.8 mil | 61% |
| 1200 psi | 1.0 mil | 68% |
| 1200 psi | 1.1 mil | 72% |
| 1200 psi | 1.4 mil | 84% |
| 1600 psi | 0.5 mil | 30% |
| 1600 psi | 0.6 mil | 45% |
| 1600 psi | 0.7 mil | 48% |
| 1600 psi | 0.9 mil | 66% |
| 1600 psi | 1.1 mil | 77% |

EXAMPLE 16

(COMPARISON EXAMPLE)

This example is not in accordance with the present invention inasmuch as too much fast solvent is utilized.

A precursor coating composition that gives clear acrylic coating was prepared from Acryloid® AT-400 resin, Acryloid® AT-954 resin, and Cymel® 323 resin, by mixing the resins with the solvents n-butanol, ethyl 3-ethoxypropionate (EEP), methyl amyl ketone, methyl ethyl ketone, and xylene in the following proportions:

| Acryloid ® AT-954 | 1,380.1 g |
| Acryloid ® AT-400 | 4,692.4 g |
| Cymel ® 323 | 1,956.0 g |
| n-butanol | 450.5 g |
| EEP | 639.8 g |
| methyl amyl ketone | 230.3 g |
| methyl ethyl ketone | 1,622.8 g |
| 50% L5310 in xylene | 28.1 g |
| Total | 11,000.0 g |

The precursor coating composition contained 65.01% solids fraction and 34.99% solvent fraction, with the following component composition:

| AT-954 polymer | 1,173.1 g | 10.67% |
| AT-400 polymer | 3,519.3 g | 31.99% |
| Cymel ® 323 polymer | 1,564.8 g | 14.22% |
| methyl ethyl ketone | 1,622.8 g | 14.75% |
| isobutanol | 391.2 g | 3.56% |
| xylene | 14.1 g | 0.13% |
| n-butanol | 450.5 g | 4.09% |
| methyl amyl ketone | 1,610.4 g | 14.64% |
| EEP | 639.8 g | 5.82% |
| L5310 | 14.0 g | 0.13% |
| Total | 11,000.0 g | 100.00% |

The solids fraction had the following composition:

| AT-954 polymer | 1,173.1 g | 18.75% |
| AT-400 polymer | 3,519.3 g | 56.24% |
| Cymel ® 323 polymer | 1,564.8 g | 25.01% |

The solvent fraction had the following composition and relative evaporation rates (butyl acetate=100):

| Solvent | Grams | Wt. % | RER |
|---|---|---|---|
| methyl ethyl ketone | 1,622.8 g | 34.31% | 631 |
| isobutanol | 391.2 g | 8.28% | 74 |
| xylene | 14.1 g | 0.30% | 70 |
| n-butanol | 450.5 g | 9.53% | 44 |
| methyl amyl ketone | 1,610.4 g | 34.05% | 40 |
| EEP | 639.8 g | 13.53% | 11 |
| Overall Heat of Vap. | | 97.5 cal/gm | |

The precursor coating composition had the following properties:

| Solvent content | 419 grams/liter |
| Relative evap. rate | 41 (butyl acetate = 100) |
| Viscosity | 89 centipoise |
| Weight solids | 56.88 percent |
| Liquid density | 978 grams/liter |
| CO2 solubility | — percent (1 atmosphere) |
| Molecular weight | — weight average (Mw) |
| Molecular weight | — number average (Mn) |
| Mw/Mn | — |

The solvent fraction had the following distribution of solvent by relative evaporation rate:

| <50 | 57% |
| 50 to 100 | 9% |
| 101 to 250 | 0% |
| >250 | 34% |

The admixed liquid mixture was sprayed using a Nordson A7A circulating airless automatic spray gun with spray tip 016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, all of which gave a clear single-phase solution. The viscosity was about 3 centipoise. Panels were sprayed using a Spraymation automatic sprayer, flashed, and baked. The polymeric coatings were thin, clear, and coherent, but the finish was dull and had pronounced orange peel. Some coatings had bubbles and coatings above 2.0 mil had a foamed surface. The coatings had the following properties:

| Pressure | Coating Thickness | 20-Degree Gloss |
|---|---|---|
| 1200 psi | 0.6 mil | 58% |
| 1200 psi | 0.8 mil | 70% |
| 1200 psi | 1.0 mil | 62% |
| 1200 psi | 1.2 mil | 76% |
| 1200 psi | >1.5 mil | foam |
| 1600 psi | 0.8 mil | 52% |
| 1600 psi | 1.1 mil | 60% |
| 1600 psi | 1.4 mil | 63% |
| 1600 psi | 1.8 mil | 70% |
| 1600 psi | >2.0 mil | foam |

EXAMPLE 17

(COMPARISON EXAMPLE)

This example is not in accordance with the present invention inasmuch as too much fast solvent is utilized.

A precursor coating composition that gives a clear acrylic coating was prepared from Acryloid® AT-400 resin, Acryloid® AT-954 resin, and Cymel® 323 resin, by mixing the resins with the solvents n-butanol, ethyl 3-ethoxypropionate (EEP), methyl amyl ketone, methyl ethyl ketone, and xylene in the following proportions:

| | |
|---|---|
| Acryloid ® AT-954 | 1,197.9 g |
| Acryloid ® AT-400 | 4,072.9 g |
| Cymel ® 323 | 1,697.8 g |
| n-butanol | 391.0 g |
| EEP | 555.3 g |
| methyl amyl ketone | 199.9 g |
| methyl ethyl ketone | 2,860.8 g |
| xylene | 24.4 g |
| 50% L5310 in xylene | 32.9 g |
| Total | 11,032.9 g |

The precursor coating composition contained 49.23% solids fraction and 50.77% solvent fraction, with the following component composition:

| | | |
|---|---|---|
| AT-954 polymer | 1,018.2 g | 9.23% |
| AT-400 polymer | 3,054.7 g | 27.69% |
| Cymel ® 323 polymer | 1,358.2 g | 12.31% |
| methyl ethyl ketone | 2,860.8 g | 25.93% |
| isobutanol | 339.6 g | 3.08% |
| xylene | 40.9 g | 0.37% |
| n-butanol | 391.0 g | 3.54% |
| methyl amyl ketone | 1,397.8 g | 12.67% |
| EEP | 555.3 g | 5.03% |
| L5310 | 16.4 g | 0.15% |
| Total | 11,032.9 g | 100.00% |

The solids fraction had the following composition:

| | | |
|---|---|---|
| AT-954 polymer | 1,018.2 g | 18.75% |
| AT-400 polymer | 3,054.7 g | 56.24% |
| Cymel ® 323 polymer | 1,358.2 g | 25.01% |

The solvent fraction had the following composition and relative evaporation rates (butyl acetate=100):

| Solvent | Grams | Wt. % | RER |
|---|---|---|---|
| methyl ethyl ketone | 2,860.8 g | 51.22% | 631 |
| isobutanol | 339.6 g | 6.08% | 74 |
| xylene | 40.9 g | 0.74% | 70 |
| n-butanol | 391.0 g | 7.00% | 44 |
| methyl amyl ketone | 1,397.8 g | 25.02% | 40 |
| EEP | 555.3 g | 9.94% | 11 |
| Overall Heat of Vap. | | 98.8 cal/gm | |

The precursor coating composition had the following properties:

| | |
|---|---|
| Solvent content | 482 grams/liter |
| Relative evap. rate | 54 (butyl acetate = 100) |
| Viscosity | 32 centipoise |
| Weight solids | 49.23 percent |
| Liquid density | 953 grams/liter |
| CO2 solubility | — percent (1 atmosphere) |
| Acryloid* AT-400 | |
| Molecular weight | 9,280 weight average (Mw) |
| Molecular weight | 3,270 number average (Mn) |
| Mw/Mn | 2.84 |

The solvent fraction had the following distribution of solvent by relative evaporation rate:

| | |
|---|---|
| <50 | 42% |
| 50 to 100 | 7% |
| 101 to 250 | 0% |
| >250 | 51% |

The admixed liquid mixture was sprayed using a Nordson A7A circulating airless automatic spray gun with tip #016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, which gave a clear single-phase solution. The viscosity was less than 3 centipoise. Panels were sprayed using a Spraymarion automatic sprayer, flashed, and baked. The polymeric coatings were thin, clear, and coherent, but the finish was dull and orange peel more pronounced. The coatings had a hazy appearance when wet, which was caused by fine bubbles in the coating. Some of the dry coatings were also hazy and contained bubbles. Much more spraying was required to build up film thickness than in Example 16, which contained less solvent, such that thick coatings could not be produced within the operating limits of the Spraymarion automatic sprayer for applying a single coat. The coatings had the following properties:

| Pressure | Coating Thickness | 20-Degree Gloss |
|---|---|---|
| 1200 psi | 0.7 mil | 45% |
| 1200 psi | 0.8 mil | 54% |
| 1200 psi | 1.0 mil | 72% |
| 1200 psi | 1.3 mil | 82% |
| 1600 psi | 0.9 mil | 61% |
| 1600 psi | 1.1 mil | 75% |
| 1600 psi | 1.6 mil | 35% |
| 1600 psi | >1.6 mil | foam |

EXAMPLE 18

A precursor coating composition that gives clear polyester coating was prepared from Spencer Kellog Aroplaz™ 16025-A6-80 resin, which contains 80% nonvolatile polyester polymer dissolved in 20% methyl PROPOSOL™ acetate (MPA) solvent, and Cymel® 323 resin, by mixing the resins with the solvents n-butanol and butyl CELLOSOLVE™ acetate (BCA) in the following proportions:

| | |
|---|---|
| Aroplaz ™ 6025-A6-80 | 11,000.0 g |
| Cymel ® 323 | 3,666.7 g |
| n-butanol | 450.0 g |
| BCA | 2,250.0 g |
| 50% L5310 in xylene | 75.0 g |
| Total | 17,441.7 g |

The precursor coating composition contained 67.27% solids fraction and 32.73% solvent fraction, with the following component composition:

| | | |
|---|---|---|
| Aroplaz ™ polymer | 8,800.0 g | 50.45% |
| Cymel ® 323 polymer | 2,933.4 g | 16.82% |
| isobutanol | 733.3 g | 4.20% |
| xylene | 37.5 g | 0.22% |
| n-butanol | 450.0 g | 2.58% |
| MPA | 2,200.0 g | 12.61% |
| BCA | 2,250.0 g | 12.90% |
| L5310 | 37.5 g | 0.22% |
| Total | 17,441.7 g | 100.00% |

The solids fraction had the following composition:

| | | |
|---|---|---|
| Aroplaz ™ polymer | 8,800.0 g | 75.00% |
| Cymel ® 323 polymer | 2,933.4 g | 25.00% |

The solvent fraction had the following composition and relative evaporation rates (butyl acetate=100):

| Solvent | Grams | Wt. % | RER |
|---|---|---|---|
| isobutanol | 733.3 g | 12.94% | 74 |
| xylene | 37.5 g | 0.66% | 70 |
| n-butanol | 450.0 g | 7.93% | 44 |
| MPA | 2,200.0 g | 38.80% | 34 |
| BCA | 2,250.0 g | 39.67% | 3 |
| Overall Heat of Vap. | | 84.2 cal/gm | |

The precursor coating composition had the following properties:

| | |
|---|---|
| Solvent content | 360 grams/liter |
| Relative evap. rate | 7 (butyl acetate = 100) |
| Viscosity | 990 centipoise |
| Weight solids | 67.27 percent |
| Liquid density | 1111 grams/liter |
| CO2 solubility | 0.339 percent (1 atmosphere) |
| Polyester | |
| Molecular weight | 3,270 weight average (Mw) |
| Molecular weight | 2,000 number average (Mn) |
| Mw/Mn | 1.64 |

The solvent fraction had the following distribution of solvent by relative evaporation rate:

| | |
|---|---|
| <50 | 86% |
| 50 to 100 | 14% |
| 101 to 250 | 0% |
| >250 | 0% |

The admixed liquid mixture was sprayed using a Nordson A7A circulating airless automatic spray gun with a Spraying Systems tip #500011 with a minimum cavity insert and also with Nordson tips #016-011 and #016-012, all of which have a 9-mil orifice size and width ratings of 8, 2, and 4 inches, respectively The precursor coating composition and carbon dioxide were pressurized, mixed, heated, and sprayed in the continuous mode. An admixed liquid mixture with a carbon dioxide content of 25.5% was sprayed at a temperature of 70 C. and pressure of 1600 psi, which gave a clear single-phase solution. Panels were sprayed using a Spraymation automatic sprayer, flashed, and baked. The polymeric coatings were thin, clear, glossy, coherent, smooth, and bubble free. No cratering occurred. The thicker coatings did not sag or run, although coatings with a thickness above 2.0 mil, when applied as one coat, experienced solvent popping. Thicker coatings could be applied without solvent popping by applying more than one coat. Some of the coatings had a slight haze right after being sprayed, but this disappeared quickly during the three-minute flash period. They had the following properties:

| Spray Tip | Coating Thickness | 20-Degree Gloss | DOI |
|---|---|---|---|
| 500011 | 1.0 mil | 90% | 85% |
| 500011 | 1.2 mil | 93% | 92% |
| 500011 | 1.3 mil | 94% | 95% |
| 500011 | 1.6 mil | 95% | 95% |
| 500011 | 1.7 mil | 96% | 95% |
| 500011 | 1.8 mil | 96% | 95% |
| 500011 | 2.3 mil | 97% | 95% |
| 016-011 | 1.0 mil | 77% | |
| 016-011 | 1.2 mil | 82% | |
| 016-011 | 1.5 mil | 88% | |
| 016-011 | 1.9 mil | 92% | |
| 016-012 | 1.0 mil | 78% | |
| 016-012 | 1.2 mil | 81% | |
| 016-012 | 1.5 mil | 90% | |
| 016-012 | 2.0 mil | 93% | |

EXAMPLE 19

A precursor coating composition that gives a clear polyester coating was prepared from Aroplaz™ 6025-A6-80 resin and Cymel® 323 resin, by mixing the resins with the solvents n-butanol and ethyl 3-ethoxypropionate (EEP) in the following proportions:

| | |
|---|---|
| Aroplaz ™ 6025-A6-80 | 6,303.9 g |
| Cymel ® 323 | 2,101.3 g |
| n-butanol | 257.9 g |
| EEP | 1,279.6 g |
| 50% L5310 in xylene | 57.3 g |
| Total | 10,000.0 g |

The precursor coating composition contained 67.24% solids fraction and 32.76% solvent fraction, with the following component composition:

| | | |
|---|---|---|
| Aroplaz ™ polymer | 5,043.1 g | 50.43% |

|  |  |  |
|---|---|---|
| Cymel® 323 polymer | 1,681.0 g | 16.81% |
| isobutanol | 420.3 g | 4.20% |
| xylene | 28.7 g | 0.29% |
| n-butanol | 257.9 g | 2.58% |
| MPA | 1,260.8 g | 12.61% |
| EEP | 1,279.6 g | 12.80% |
| L5310 | 28.6 g | 0.29% |
| Total | 10,000.0 g | 100.00% |

The solids fraction had the following composition:

|  |  |  |
|---|---|---|
| Aroplaz™ polymer | 5,043.1 g | 75.00% |
| Cymel® 323 polymer | 1,681.0 g | 25.00% |

The solvent fraction had the following composition and relative evaporation rates (butyl acetate=100):

| Solvent | Grams | Wt. % | RER |
|---|---|---|---|
| isobutanol | 420.3 g | 12.94% | 74 |
| xylene | 28.7 g | 0.89% | 70 |
| n-butanol | 257.9 g | 7.94% | 44 |
| MPA | 1,260.8 g | 38.83% | 34 |
| EEP | 1,279.6 g | 39.40% | 11 |
| Overall Heat of Vap. |  | 85.6 cal/gm |  |

The precursor coating composition had the following properties:

|  |  |  |
|---|---|---|
| Solvent content | 360 | grams/liter |
| Relative evap. rate | 20 | (butyl acetate = 100) |
| Viscosity | 717 | centipoise |
| Weight solids | 67.24 | percent |
| Liquid density | 1111 | grams/liter |
| Polyester |  |  |
| Molecular weight | 3,270 | weight average (Mw) |
| Molecular weight | 2,000 | number average (Mn) |
| Mw/Mn | 1.64 |  |

The solvent fraction had the following distribution of solvent by relative evaporation rate:

|  |  |
|---|---|
| <50 | 86% |
| 50 to 100 | 14% |
| 101 to 250 | 0% |
| >250 | 0% |

The admixed liquid mixture was sprayed using a Nordson A7A circulating airless automatic spray gun with a Spraying Systems tip #500011 with a minimum cavity insert and also with Nordson tip #016-014, both of which have a 9-mil orifice size and an 8-inch fan width rating.

The precursor coating composition and carbon dioxide were pressurized, mixed, heated, and sprayed in the continuous mode. An admixed liquid mixture with a carbon dioxide content of 25.5% was sprayed at a temperature of 66 C. and pressure of 1600 psi, which gave a clear single-phase solution. The spray viscosity was about 7 centipoise. Panels were sprayed using a Spraymation automatic sprayer, flashed, and baked. The polymeric coatings were thin, clear, glossy, coherent, smooth, and bubble free. The coatings had some cratering, which was absent in Example 18, which had slower solvent. The coatings also were not as glossy as in Example 18. The thicker coatings did not sag or run, although coatings with a thickness above about 1.6 to 1.8 mil, when applied as one coat, experienced solvent popping. The coatings had the following properties:

| Spray Tip | Coating Thickness | 20-Degree Gloss |
|---|---|---|
| 500011 | 1.2 mil | 88% |
| 500011 | 1.3 mil | 88% |
| 500011 | 1.6 mil | 82% |
| 016-014 | 1.3 mil | 85% |
| 016-014 | 1.5 mil | 89% |
| 016-014 | 1.8 mil | 91% |

EXAMPLE 20

A precursor coating composition that gives clear polyester coating was prepared from Aroplaz™ 6025-A6-80 resin and Cymel® 323 resin, by mixing the resins with the solvents n-butanol, ethyl 3-ethoxypropionate (EEP), and methyl amyl ketone in the following proportions:

|  |  |
|---|---|
| Aroplaz™ 6025-A6-80 | 6,234.2 g |
| Cymel® 323 | 2,078.1 g |
| n-butanol | 255.0 g |
| EEP | 255.0 g |
| methyl amyl ketone | 1,121.0 g |
| 50% L5310 in xylene | 56.7 g |
| Total | 10,000.0 g |

The precursor coating composition contained 66.50% solids fraction and 33.50% solvent fraction, with the following component composition:

|  |  |  |
|---|---|---|
| Aroplaz™ polymer | 4,987.4 g | 49.87% |
| Cymel® 323 polymer | 1,662.5 g | 16.63% |
| isobutanol | 415.6 g | 4.16% |
| xylene | 28.4 g | 0.28% |
| n-butanol | 255.0 g | 2.55% |
| methyl amyl ketone | 1,121.0 g | 11.21% |
| MPA | 1,246.8 g | 12.47% |
| EEP | 255.0 g | 2.55% |
| L5310 | 28.3 g | 0.28% |
| Total | 10,000.0 g | 100.00% |

The solids fraction had the following composition:

|  |  |  |
|---|---|---|
| Aroplaz™ polymer | 4,987.4 g | 75.00% |
| Cymel® 323 polymer | 1,662.5 g | 25.00% |

The solvent fraction had the following composition and relative evaporation rates (butyl acetate=100):

| Solvent | Grams | Wt. % | RER |
|---|---|---|---|
| isobutanol | 415.6 g | 12.52% | 74 |
| xylene | 28.4 g | 0.86% | 70 |
| n-butanol | 255.0 g | 7.67% | 44 |
| methyl amyl ketone | 1,121.0 g | 33.74% | 40 |
| MPA | 1,246.8 g | 37.54% | 34 |
| EEP | 255.0 g | 7.67% | 11 |

The precursor coating composition had the following properties:

|  |  |  |
|---|---|---|
| Solvent content | 360 | grams/liter |
| Relative evap. rate | 33 | (butyl acetate = 100) |
| Viscosity | 479 | centipoise |
| Weight solids | 66.50 | percent |
| Liquid density | 1078 | grams/liter |

-continued

| Polyester | | |
|---|---|---|
| Molecular weight | 3,270 | weight average (Mw) |
| Molecular weight | 2,000 | number average (Mn) |
| Mw/Mn | 1.64 | |

The solvent fraction had the following distribution of solvent by relative evaporation rate:

| | |
|---|---|
| <50 | 87% |
| 50 to 100 | 13% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 25.6% was sprayed at a temperature of 62 C. and pressure of 1600 psi, which gave a clear single-phase solution. The spray viscosity was about 6 centipoise. Panels were sprayed using a Spraymation automatic sprayer, flashed, and baked. The polymeric coatings were thin, clear, glossy, coherent, smooth, and bubble free. However, the coatings were not as glossy as in Examples 18 and 19, which had more slower solvent. Also, solvent popping occurred at thinner coatings than in Examples 18 and 19, being noticeable at coating thicknesses of 1.4 mil and above. The coatings had the following properties:

| Coating Thickness | 20-Degree Gloss | Solvent Popping |
|---|---|---|
| 1.0 mil | 74% | no |
| 1.1 mil | 78% | no |
| 1.2 mil | 82% | no |
| 1.4 mil | 86% | yes |
| 1.6 mil | 90% | yes |
| 1.9 mil | 89% | yes |

EXAMPLE 21

A precursor coating composition that gives a clear polyester/acrylic coating was prepared from Aroplaz™ 6025-A6-80 resin, Acryloid® AT-400 resin, and Cymel® 323 resin, by mixing the resins with the solvents n-butanol, ethyl 3-ethoxypropionate (EEP), and butyl CELLOSOLVE™ acetate (BCA) in the following proportions:

| | |
|---|---|
| Aroplaz™ 6025-A6-80 | 4,510.8 g |
| Acryloid® AT-400 | 2,405.6 g |
| Cymel® 323 | 2,255.3 g |
| n-butanol | 276.8 g |
| EEP | 880.0 g |
| BCA | 500.0 g |
| 50% L5310 in xylene | 200.0 g |
| Total | 11,028.5 g |

The precursor coating composition contained 65.44% solids fraction and 34.56% solvent fraction, with the following component composition:

| | | |
|---|---|---|
| Aroplaz™ polymer | 3,608.6 g | 32.72% |
| AT-400 polymer | 1,804.2 g | 16.36% |
| Cymel® 323 polymer | 1,804.2 g | 16.36% |
| isobutanol | 451.1 g | 4.09% |
| xylene | 100.0 g | 0.91% |
| n-butanol | 276.8 g | 2.51% |
| methyl amyl ketone | 601.4 g | 5.45% |
| MPA | 902.2 g | 8.18% |
| EEP | 880.0 g | 7.98% |
| BCA | 500.0 g | 4.53% |
| L5310 | 100.0 g | 0.91% |
| Total | 11,028.5 g | 100.00% |

The solids fraction had the following composition:

| | | |
|---|---|---|
| Aroplaz™ polymer | 3,608.6 g | 50.00% |
| AT-400 polymer | 1,804.2 g | 25.00% |
| Cymel® 323 polymer | 1,804.2 g | 25.00% |

The solvent fraction had the following composition and relative evaporation rates (butyl acetate=100):

| Solvent | Grams | Wt. % | RER |
|---|---|---|---|
| isobutanol | 451.1 g | 12.16% | 74 |
| xylene | 100.0 g | 2.69% | 70 |
| n-butanol | 276.8 g | 7.46% | 44 |
| methyl amyl ketone | 601.4 g | 16.20% | 40 |
| MPA | 902.2 g | 24.31% | 34 |
| EEP | 880.0 g | 23.71% | 11 |
| BCA | 500.0 g | 13.47% | 3 |
| Overall Heat of Vap. | | 85.9 cal/gm | |

The precursor coating composition had the following properties:

| | | |
|---|---|---|
| Solvent content | 360 | grams/liter |
| Relative evap. rate | 12 | (butyl acetate = 100) |
| Viscosity | 599 | centipoise |
| Weight solids | 65.44 | percent |
| Liquid density | 1040 | grams/liter |
| Polyester | | |
| Molecular weight | 3,270 | weight average (Mw) |
| Molecular weight | 2,000 | number average (Mn) |
| Mw/Mn | 1.64 | |
| Acryloid® AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 85% |
| 50 to 100 | 15% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 25.8% was sprayed at a temperature of 69 C. and pressure of 1600 psi, which gave a clear single-phase solution. Panels were sprayed using a Spraymation automatic sprayer, flashed, and baked. The polymeric coatings were thin, clear, glossy, coherent, smooth, and bubble free. No cratering occurred. The thicker coatings did not sag or run, although coatings with a thickness above 2.0 mil, when applied as one coat, experienced solvent popping. Some of the coatings had a slight haze right after being sprayed, but this disappeared quickly during the three-minute flash period. The coatings had the following properties:

| Coating Thickness | 20-Degree Gloss |
|---|---|
| 1.0 mil | 83% |
| 1.2 mil | 89% |
| 1.3 mil | 91% |
| 1.4 mil | 91% |
| 1.8 mil | 94% |
| 2.0 mil | 94% |

EXAMPLE 22

A precursor coating composition that gives a clear polyester/acrylic coating was prepared from Aroplaz™ 6025-A6-80 resin, Acryloid® AT-400 resin, and Cymel® 323 resin, by mixing the resins with the solvents n-butanol, ethyl 3-ethoxypropionate (EEP), butyl CELLOSOLVE™ acetate (BCA), and L5310 surfactant in xylene, in the following proportions:

| Aroplaz ™ 6025-A6-80 | 4,510.8 g |
|---|---|
| Acryloid ® AT-400 | 2,405.6 g |
| Cymel ® 323 | 2,255.3 g |
| n-butanol | 276.8 g |
| EEP | 500.0 g |
| BCA | 500.0 g |
| 50% L5310 in xylene | 161.5 g |
| Total | 10,610.0 g |

The precursor coating composition contained 68.79% solids fraction and 31.21% solvent fraction, with the following component composition:

| Aroplaz ™ polymer | 3,608.6 g | 34.01% |
|---|---|---|
| AT-400 polymer | 1,804.2 g | 17.01% |
| Cymel ® 323 polymer | 1,804.2 g | 17.01% |
| isobutanol | 451.1 g | 4.25% |
| xylene | 80.8 g | 0.76% |
| n-butanol | 276.8 g | 2.61% |
| methyl amyl ketone | 601.4 g | 5.67% |
| MPA | 902.2 g | 8.50% |
| EEP | 500.0 g | 4.71% |
| BCA | 500.0 g | 4.71% |
| L5310 | 80.7 g | 0.76% |
| Total | 10,610.0 g | 100.00% |

The polymer fraction had the following composition:

| Aroplaz ™ polymer | 3,608.6 g | 50.00% |
|---|---|---|
| AT-400 polymer | 1,804.2 g | 25.00% |
| Cymel ® 323 polymer | 1,804.2 g | 25.00% |

The solvent fraction had the following composition and relative evaporation rates (butyl acetate=100):

| Solvent | Grams | Wt. % | RER |
|---|---|---|---|
| isobutanol | 451.1 g | 13.62% | 74 |
| xylene | 80.8 g | 2.44% | 70 |
| n-butanol | 276.8 g | 8.36% | 44 |
| methyl amyl ketone | 601.4 g | 18.16% | 40 |
| MPA | 902.2 g | 27.24% | 34 |
| EEP | 500.0 g | 15.09% | 11 |
| BCA | 500.0 g | 15.09% | 3 |

The precursor coating composition had the following properties:

| Solvent content | 331 | grams/liter |
|---|---|---|
| Relative evap. rate | 12 | (butyl acetate = 100) |
| Viscosity | >599 | centipoise |
| Weight solids | 68.79 | percent |
| Liquid density | 1062 | grams/liter |
| Polyester | | |
| Molecular weight | 3,270 | weight average (Mw) |
| Molecular weight | 2,000 | number average (Mn) |
| Mw/Mn | 1.64 | |
| Acryloid ® AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| <50 | 84% |
|---|---|
| 50 to 100 | 16% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 25.5% was sprayed at a temperature of 69 C. and pressure of 1600 psi, which gave a clear single-phase solution. Panels were sprayed using a Spraymation automatic sprayer, flashed, and baked. The polymeric coatings were thin, clear, glossy, coherent, smooth, and bubble free. No cratering occurred. The thicker coatings did not sag or run, although coatings with a thickness above 2.0 mil show solvent popping. Some of the coatings had a slight haze right after being sprayed, but this disappeared during the three-minute flash period. The coatings had the following properties:

| Coating Thickness | 20-Degree Gloss |
|---|---|
| 1.1 mil | 76% |
| 1.2 mil | 85% |
| 1.5 mil | 89% |
| 1.7 mil | 91% |
| 2.0 mil | 90% |

EXAMPLE 23

A precursor coating composition that gives a clear acrylic coating that requires no cross-linking or baking was prepared from Rohm & Haas Acryloid B-66 resin by dissolving the resin in methyl amyl ketone solvent. The precursor coating composition contained 35.00% solids fraction and 65.00% solvent fraction, with the following component composition:

| Acryloid B-66 | 5,600.0 g | 35.00% |
|---|---|---|
| methyl amyl ketone | 10,400.0 g | 65.00% |
| Total | 16,000.0 g | 100.00% |

The precursor coating composition had the following properties:

| Solvent content | 584 | grams/liter |
|---|---|---|
| Relative evap. rate | 40 | (butyl acetate = 100) |
| Viscosity | 316 | centipoise |
| Weight solids | 35.00 | percent |
| Liquid density | 898 | grams/liter |
| Molecular weight | 45,290 | weight average (Mw) |
| Molecular weight | 24,750 | number average (Mn) |
| Mw/Mn | 1.83 | |

The solvent fraction had the following distribution of solvent by relative evaporation rate:

| <50 | 100% |
|---|---|
| 50 to 100 | 0% |
| 101 to 250 | 0% |
| >250 | 0% |

The admixed liquid mixture was sprayed using a Nordson A7A circulating airless automatic spray gun with a Spraying Systems tip #500011 with a minimum cavity insert and also with Nordson tips #016-011, #016-012, #016-013, amd #016-014, all of which have a 9-mil orifice size and the following fan width ratings.

| Spray Tip | Fan Width |
|---|---|
| 500011 | 8 inch |
| 016-011 | 2 inch |
| 016-012 | 4 inch |
| 016-013 | 6 inch |
| 016-014 | 8 inch |

The precursor coating composition and carbon dioxide were pressurized, mixed, heated, and sprayed in the continuous mode. An admixed liquid mixture with a carbon dioxide content of 42% was sprayed at a pressure of 1600 psig and temperatures of 60° C. and 70° C., which gave a clear single-phase solution. The spray viscosity was about 20 centipoise (60 C.). Panels were sprayed using a Spraymation automatic sprayer, flashed, and air dried. The polymeric coatings were thin, clear, glossy, coherent, smooth, and bubble free. Coatings applied in one application did not sag until the thickness was above about 2.0 mil. Thicker coatings could be multiple applications with a one-minute flash time between applications. The coatings had the following properties:

| Temperature | Spray Tip | Coating Thickness | 20-Degree Gloss |
|---|---|---|---|
| 60° C. | 500011 | 0.8 mil | 57% |
| 60° C. | 500011 | 1.2 mil | 58% |
| 60° C. | 500011 | 1.5 mil | 68% |
| 60° C. | 500011 | 2.1 mil | 76% |
| 60° C. | 500011 | 3.1 mil | 80% |
| 60° C. | 016-011 | 0.9 mil | 52% |
| 60° C. | 016-012 | 0.9 mil | 54% |
| 60° C. | 016-013 | 1.0 mil | 58% |
| 60° C. | 016-013 | 2.1 mil | 75% |
| 60° C. | 016-013 | 2.9 mil | 77% |
| 70° C. | 500011 | 0.8 mil | 72% |
| 70° C. | 500011 | 0.9 mil | 76% |
| 70° C. | 500011 | 1.1 mil | 78% |
| 70° C. | 500011 | 1.2 mil | 79% |
| 70° C. | 500011 | 1.5 mil | 80% |
| 70° C. | 500011 | 1.6 mil | 79% |
| 70° C. | 500011 | 1.8 mil | 79% |
| 70° C. | 500011 | 2.1 mil | 82% |
| 70° C. | 016-011 | 1.2 mil | 79% |
| 70° C. | 016-011 | 1.4 mil | 80% |
| 70° C. | 016-011 | 1.7 mil | 80% |
| 70° C. | 016-011 | 2.0 mil | 80% |
| 70° C. | 016-014 | 0.9 mil | 76% |
| 70° C. | 016-014 | 1.2 mil | 79% |
| 70° C. | 016-014 | 1.4 mil | 79% |
| 70° C. | 016-014 | 1.6 mil | 79% |
| 70° C. | 016-014 | 2.1 mil | 80% |
| 70° C. | 016-014 | 2.4 mil | 79% |

EXAMPLE 24

A precursor coating composition that gives a clear acrylic coating that requires no cross-linking or baking was prepared from Rohm & Haas Acryloid B-66 resin by dissolving the resin in methyl amyl ketone solvent. The precursor coating composition contained 44.00% solids fraction and 56.00% solvent fraction, with the following component composition:

| Acryloid B-66 | 7,040.0 g | 44.00% |
|---|---|---|
| methyl amyl ketone | 8,960.0 g | 56.00% |
| Total | 16,000.0 g | 100.00% |

The precursor coating composition had the following properties:

| Solvent content | 516 | grams/liter |
|---|---|---|
| Relative evap. rate | 40 | (butyl acetate = 100) |
| Viscosity | 1060 | centipoise |
| Weight solids | 44.00 | percent |
| Liquid density | 922 | grams/liter |
| $CO_2$ solubility | 0.581 | percent (1 atmosphere) |
| Molecular weight | 45,290 | weight average (Mw) |
| Molecular weight | 24,750 | number average (Mn) |
| Mw/Mn | 1.83 | |

The solvent fraction had the following distribution of solvent by relative evaporation rate:

| <50 | 100% |
|---|---|
| 50 to 100 | 0% |
| 101 to 250 | 0% |
| >250 | 0% |

The admixed liquid mixture was sprayed using a Nordson A4B circulating airless hand gun with spray tip #0004/08, which has a 9-mil orifice size and an 8-inch fan width rating.

The precursor coating composition and carbon dioxide were pressurized, mixed, heated, and sprayed in the batch mode. An admixed liquid mixture with a carbon dioxide content of 44% was sprayed at a pressure of 1600 psig and a temperature of 50° C., 70° C., which gave a clear single-phase solution. Panels were sprayed by hand, flashed, and air dried. The polymeric coatings were thin, clear, glossy, coherent, smooth, and bubble free. They had the following properties:

| Coating Thickness | 20-Degree Gloss |
|---|---|
| 0.60 mil | 55% |
| 0.77 mil | 64% |
| 0.80 mil | 64% |
| 1.19 mil | 72% |

The admixed liquid mixture was also sprayed using a Nordson A7A circulating airless automatic spray gun with a Spraying Systems tip #500011 with a minimum cavity insert and also with Nordson tips #016-011, #016-012, #016-013, amd #016-014, all of which have a 9-mil orifice size and the following fan width ratings:

| Spray Tip | Fan Width |
|---|---|
| 500011 | 8 inch |
| 016-011 | 2 inch |
| 016-012 | 4 inch |
| 016-014 | 8 inch |

The precursor coating composition and carbon dioxide were pressurized, mixed, heated, and sprayed in the continuous mode. An admixed liquid mixture with a carbon dioxide content of 42% was sprayed at a pressure of 1600 psig and temperatures of 60° C. and 70° C., which gave a clear single-phase solution but was near the solubility limit. Panels were sprayed using a Spraymarion automatic sprayer, flashed, and air dried. The polymeric coatings were thin, clear, glossy, coherent, smooth, and bubble free. Orange peel was more prevalent than in the previous example. Thin coatings sometimes had pin holes. The coatings had the following properties:

| Spray Tip | Coating Thickness | 20-Degree Gloss |
|---|---|---|
| 500011 | 1.2 mil | 66% |
| 500011 | 1.6 mil | 74% |
| 500011 | 1.8 mil | 68% |
| 016-011 | 1.0 mil | 52% |
| 016-012 | 1.3 mil | 63% |
| 016-012 | 1.4 mil | 67% |
| 016-014 | 1.2 mil | 60% |
| 016-014 | 1.4 mil | 72% |
| 016-014 | 1.9 mil | 68% |

EXAMPLE 25

(COMPARISON EXAMPLE)

This example is not in accordance with the present invention inasmuch as too much fast solvent and an excessive overall amount of solvent in the composition are utilized.

A precursor coating composition that gives a clear cellulose acetate butyrate (CAB) coating that requires no cross-linking or baking was prepared by dissolving Eastman Chemical Cellulose Ester CAB-381-0.1 in methyl amyl ketone solvent. The precursor coating composition contained 21.1% solids fraction and 78.9% solvent fraction, with the following component composition:

| CAB | 717.0 g | 21.1% |
|---|---|---|
| methyl amyl ketone | 2,685.0 g | 78.9% |

The solvent fraction had a relative evaporation rate of 40 (butyl acetate=100). The precursor coating composition had the following properties:

| Solvent content | 715 grams/liter |
|---|---|
| Relative evap. rate | 40 (butyl acetate = 100) |
| Viscosity | 960 centipoise |
| Weight solids | 21.10 percent |
| Liquid density | 907 grams/liter |
| Molecular weight | 45,260 weight average (Mw) |
| Molecular weight | 19,630 number average (Mn) |
| Mw/Mn | 2.31 |

The solvent fraction had the following distribution of solvent by relative evaporation rate:

| <50 | 100% |
|---|---|
| 50 to 100 | 0% |
| 101 to 250 | 0% |
| >250 | 0% |

The admixed liquid mixture was sprayed using a Nordson A4B circulating airless hand gun with spray tip #0004/10, which has a 9-mil orifice size and a 10-inch fan width rating.

The precursor coating composition and carbon d ioxide were pressurized, mixed, heated, and sprayed in the batch mode. An admixed liquid mixture with a carbon dioxide content of 28% was sprayed at a pressure of 1600 psig and a temperature of 50 C., which gave a clear single-phase solution. Panels were sprayed by hand, flashed, and air dried. The polymeric coatings were very thin, clear, smooth, bubble free, and semi-glossy. Coatings were sprayed with film thicknesses of 0.3 to 0.4 mil. Because of the low solids content, film build was difficult to achieve. Because the admixed liquid mixture was so readily sprayable, this shows that the preferred precursor coating composition would have a lower proportion of solvent and a higher proportion of solids.

EXAMPLE 26

A precursor coating composition that gives a clear cellulose acetate butyrate (CAB) coating that requires no cross-linking or baking was prepared by dissolving Eastman Chemical Cellulose Ester CAB-381-0.1 in methyl amyl ketone solvent. The precursor coating composition contained 25.8% solids fraction and 74.2% solvent fraction, with the following component composition:

| CAB | 923.0 g | 25.8% |
|---|---|---|
| methyl amyl ketone | 2,655.0 g | 74.2% |

The solvent fraction had a relative evaporation rate of 40 (butyl acetate=100). The precursor coating composition had the following properties:

| Solvent content | 672 grams/liter |
|---|---|
| Relative evap. rate | 40 (butyl acetate = 100) |
| Weight solids | 25.8 percent |
| Viscosity | >1000 centipoise (23 C.) |

|                   |                              |
| ----------------- | ---------------------------- |
|                   | 330 centipoise (50 C.)       |
| Liquid density    | 905 grams/liter              |
| Molecular weight  | 45,260 weight average (Mw)   |
| Molecular weight  | 19,630 number average (Mn)   |
| Mw/Mn             | 2.31                         |

The solvent fraction had the following distribution of solvent by relative evaporation rate:

|         |      |
| ------- | ---- |
| <50     | 100% |
| 50 to 100 | 0% |
| 101 to 250 | 0% |
| >250    | 0%   |

The admixed liquid mixture was sprayed using a Nordson A4B circulating airless hand gun with spray tip #0004/10, which has a 9-mil orifice size and a 10-inch fan width rating.

The precursor coating composition and carbon dioxide were pressurized, mixed, heated, and sprayed in the batch mode. An admixed liquid mixture with a carbon dioxide content of 28% was sprayed at a pressure of 1600 psig and a temperature of 50 C., which gave a clear single-phase solution. Panels were sprayed by hand, flashed, and air dried. The polymeric coatings were very thin, clear, smooth, bubble free, and semi-glossy. Coatings were sprayed with film thicknesses of 0.7 to 0.8 mil. Because of the high solids content than in Example 25, film build was easier to achieve. Because the admixed liquid mixture was so readily sprayable at a carbon dioxide content that is well below the solubility limit, this shows that the preferred precursor coating composition would have a lower proportion of solvent and a higher proportion of solids and that the admixed liquid mixture should contain a higher concentration of carbon dioxide to better utilize the supercritical fluid.

EXAMPLE 27

(COMPARISON EXAMPLE)

This example is not in accordance with the present invention inasmuch as too much fast solvent and an excessive overall amount of solvent in the composition are utilized.

A precursor coating composition that gives a clear cellulose acetate butyrate (CAB) coating that requires no crosslinking or baking was prepared by dissolving Eastman Chemical Cellulose Ester CAB-381-0.1 in solvents methyl amyl ketone, methyl ethyl ketone, and butyl CELLO-SOLVE™ acetate (BCA). The precursor coating composition contained 25.00% solids fraction and 75.00% solvent fraction, with the following component composition:

| CAB                | 4,800.0 g  | 25.00%   |
| ------------------ | ---------- | -------- |
| methyl ethyl ketone | 4,480.0 g | 23.33%   |
| methyl amyl ketone | 6,720.0 g  | 35.00%   |
| BCA                | 3,200.0 g  | 16.67%   |
| Total              | 19,200.0 g | 100.00%  |

The solvent fraction had the following composition and relative evaporation rates (butyl acetate=100):

| Solvent             | Grams     | Wt. %  | RER |
| ------------------- | --------- | ------ | --- |
| methyl ethyl ketone | 4,480.0 g | 31.11% | 631 |
| methyl amyl ketone  | 6,720.0 g | 46.67% | 40  |
| BCA                 | 3,200.0 g | 22.22% | 3   |
| Overall Heat of Vap. |          | 85.1 cal/gm | |

The precursor coating composition had the following properties:

|                   |                              |
| ----------------- | ---------------------------- |
| Solvent content   | 678 grams/liter              |
| Relative evap. rate | 12 (butyl acetate = 100)   |
| Viscosity         | 347 centipoise               |
| Weight solids     | 25.00 percent                |
| Liquid density    | 905 grams/liter              |
| Molecular weight  | 45,260 weight average (Mw)   |
| Molecular weight  | 19,630 number average (Mn)   |
| Mw/Mn             | 2.31                         |

The solvent fraction had the following distribution of solvent by relative evaporation rate:

|            |     |
| ---------- | --- |
| <50        | 69% |
| 50 to 100  | 0%  |
| 101 to 250 | 0%  |
| >250       | 31% |

The admixed liquid mixture was sprayed using a Nordson A7A circulating airless automatic spray gun with a Spraying Systems tip #500011 with a minimum cavity insert, which has a 9-mil orifice size. The precursor coating composition and carbon dioxide were pressurized, mixed, heated, and sprayed in the continuous mode. An admixed liquid mixture with a carbon dioxide content of about 36% was sprayed at a pressure of 1600 psig and a temperature of 60 C., which gave a clear single-phase solution. Panels were sprayed using a Spraymation automatic sprayer, flashed, and air dried. The polymeric coatings were thin, clear, glossy, coherent, smooth, and bubble free. Coatings were sprayed with thicknesses of 0.5 to 1.0 mil; thicker coatings were obtained by applying multiple coats. Coatings with thicknesses of 1.5 and 2.3 mils had 20-degree gloss measurements of 53% and 64%, respectively. Two wood panels were sprayed and given glossy coatings.

Because the admixed liquid mixture was so readily sprayable at a carbon dioxide content that is significantly below the solubility limit, this shows that the preferred precursor coating composition would eliminate the very fast solvent, namely methyl ethyl ketone, and have an overall lower proportion of solvent and a higher proportion of solids, and that the admixed liquid mixture should contain a higher concentration of carbon dioxide to better utilize the supercritical fluid.

EXAMPLE 28

(COMPARISON EXAMPLE)

This example is not in accordance with the present invention inasmuch as too much fast solvent is utilized.

A precursor coating composition that gives a clear cellulose acetate butyrate (CAB) coating that requires no crosslinking or baking was prepared by dissolving Eastman Chemical Cellulose Ester CAB-381-0.1 in solvents methyl amyl ketone and methyl ethyl ketone. The precursor coating composition contained 30.00% solids fraction and 70.00% solvent fraction, with the following component composition:

| | | |
|---|---|---|
| CAB | 4,800.0 g | 30.00% |
| methyl ethyl ketone | 4,480.0 g | 28.00% |
| methyl amyl ketone | 6,720.0 g | 42.00% |

The solvent fraction had the following composition and relative evaporation rates (butyl acetate=100):

| Solvent | Grams | Wt. % | RER |
|---|---|---|---|
| methyl ethyl ketone | 4,480.0 g | 40.00% | 631 |
| methyl amyl ketone | 6,720.0 g | 60.00% | 40 |

The precursor coating composition had the following properties:

| | |
|---|---|
| Solvent content | 629 grams/liter |
| Relative evap. rate | 64 (butyl acetate = 100) |
| Viscosity | 1292 centipoise |
| Weight solids | 30.00 percent |
| Liquid density | 899 grams/liter |
| CO2 solubility | 0.714 percent (1 atmosphere) |
| Molecular weight | 45,260 weight average (Mw) |
| Molecular weight | 19,630 number average (Mn) |
| Mw/Mn | 2.31 |

The solvent fraction had the following distribution of solvent by relative evaporation rate:

| | |
|---|---|
| <50 | 60% |
| 50 to 100 | 0% |
| 101 to 250 | 0% |
| >250 | 40% |

The admixed liquid mixture was sprayed using a Nordson A7A circulating airless automatic spray gun with a Spraying Systems tip #500011 with a minimum cavity insert, which has a 9-mil orifice size. The precursor coating composition and carbon dioxide were pressurized, mixed, heated, and sprayed in the continuous mode. An admixed liquid mixture with a carbon dioxide content of about 48% was sprayed at a pressure of 1600 psig and a temperature of 60 C., which gave a clear single-phase solution. Panels were sprayed using a Spraymation automatic sprayer, flashed, and air dried. Due to the large percentage of very fast solvent, no coherent coatings could be applied, because the polymer had much too little fluidity, due to solvent loss in the spray, when it reached the substrate for the polymer to flow together.

Because the admixed liquid mixture was so readily atomizable at a carbon dioxide content that is close to the solubility limit, the difficulty being rapid solvent loss in the spray, this shows that the preferred precursor coating composition would eliminate the very fast solvent, namely methyl ethyl ketone, and have an overall lower proportion of solvent and a higher proportion of solids, which would enable the coating to flow together while enhancing the ability to build coating thickness without causing the wet coating to run or sag. This better utilizes the supercritical fluid.

EXAMPLE 29

(COMPARISON EXAMPLE)

This example is not in accordance with the present invention inasmuch as too much fast solvent is utilized.

A precursor coating composition that gives a clear acrylic lacquer coating that requires no cross-linking or baking was prepared by using Du Pont Lacquer 380S without thinner. Normally this lacquer is thinned before spraying by adding two gallons of thinner per gallon of lacquer. The precursor coating composition contained 33.6% solids fraction and 66.4% solvent fraction, with the following component composition:

| | |
|---|---|
| 380S acrylic polymer | 33.6% |
| acetone | 14.4% |
| methyl ethyl ketone | 5.5% |
| isopropyl alcohol | 0.9% |
| toluene | 30.1% |
| butyl acetate | 0.2% |
| methyl propasol acetate | 10.3% |
| aromatic 100 | 5.0% |
| Total | 100.0% |

The solvent fraction had the following composition and relative evaporation rates (butyl acetate=100):

| Solvent | Wt. % | RER |
|---|---|---|
| acetone | 21.7% | 1440 |
| methyl ethyl ketone | 8.3% | 631 |
| isopropyl alcohol | 1.3% | 288 |
| toluene | 45.3% | 240 |
| butyl acetate | 0.3% | 100 |
| methyl propasol acetate | 15.5% | 34 |
| aromatic 100 | 7.6% | 20 |
| Overall Heat of Vap. | 94.5 cal/gm | |

The precursor coating composition had the following properties:

| | |
|---|---|
| Solvent content | 622 grams/liter |
| Relative evap. rate | 94 (butyl acetate = 100) |
| Viscosity | 285 centipoise |
| Weight solids | 33.6 percent |
| Liquid density | 936 grams/liter |

The solvent fraction had the following distribution of solvent by relative evaporation rate:

| | |
|---|---|
| <50 | 23% |
| 50 to 100 | 0% |
| 101 to 250 | 46% |
| >250 | 31% |

The admixed liquid mixture was sprayed using a Nordson A7A circulating airless automatic spray gun with spray tip #016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 38% was sprayed at a pressure of 1600 psig and temperature of 51 C., which gave a clear single-phase solution. Panels were sprayed and air dried. All coatings obtained were very poor, being frothy with bubbles and uneven in deposition. Because of the low fraction of slow solvent and the high fraction of fast solvent, the spray became very dry before it reached the substrate, so that the coating did not flow together. Furthermore, the spray lay down "cobwebs" onto the coating.

EXAMPLE 30

(COMPARISON EXAMPLE)

This example is not in accordance with the present invention inasmuch as too much fast solvent and an excessive overall amount of solvent in the composition are utilized.

A precursor coating composition that gives a clear acrylic lacquer coating that requires no cross-linking or baking was prepared by using Du Pont Lacquer 380S without the normal thinner but with ethyl 3-ethoxypropionate (EEP) and butyl CELLOSOLVE™ acetate (BCA) added to show the effect of slow solvent versus fast solvent. The precursor coating composition contained 27.4% solids fraction and 72.6% solvent fraction, with the following component composition:

| | |
|---|---|
| 380S acrylic polymer | 27.4% |
| acetone | 11.8% |
| methyl ethyl ketone | 4.5% |
| isopropyl alcohol | 0.7% |
| toluene | 24.5% |
| butyl acetate | 0.2% |
| methyl propasol acetate | 8.4% |
| aromatic 100 | 4.1% |
| ethyl 3-ethoxypropionate | 9.2% |
| butyl CELLOSOLVE™ acetate | 9.2% |
| Total | 100.0% |

The solvent fraction had the following composition and relative evaporation rates (butyl acetate=100):

| Solvent | Wt. % | RER |
|---|---|---|
| acetone | 16.2% | 1440 |
| methyl ethyl ketone | 6.2% | 631 |
| isopropyl alcohol | 1.0% | 288 |
| toluene | 33.8% | 240 |
| butyl acetate | 0.3% | 100 |
| methyl propasol acetate | 11.6% | 34 |
| aromatic 100 | 5.7% | 20 |
| ethyl 3-ethoxypropionate | 12.6% | 11 |
| butyl CELLOSOLVE™ acetate | 12.6% | 3 |
| Overall Heat of Vap. | 87.6 cal/gm | |

The precursor coating composition had the following properties:

| | |
|---|---|
| Solvent content | 683 grams/liter |
| Relative evap. rate | 16 (butyl acetate = 100) |
| Viscosity | <285 centipoise |
| Weight solids | 27.4 percent |
| Liquid density | 941 grams/liter |

The solvent fraction had the following distribution of solvent by relative evaporation rate:

| | |
|---|---|
| <50 | 43% |
| 50 to 100 | 0% |
| 101 to 250 | 34% |
| >250 | 23% |

The admixed liquid mixture was sprayed using a Nordson A7A circulating airless automatic spray gun with spray tip #016-014, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 38% was sprayed at a pressure of 1600 psig and temperature of 59 C., which gave a clear single-phase solution that was near the solubility limit. Panels were sprayed and air dried. Because of the higher fraction of slow solvent and the lower fraction of fast solvent than in Example 29, the spray did not become as dry before it reached the substrate, so that the coating flowed together more readily. The coatings were even in deposition and were not frothy with bubbles. The spray did not form "cobwebs".

EXAMPLE 31

(COMPARISON EXAMPLE)

This example is not in accordance with the present invention inasmuch as not enough slow solvent is used.

A precursor coating composition that gives a blue metallic acrylic enamel coating was prepared by using Du Pont Centari™ acrylic enamel B8292A medium blue metallic auto refinish paint without the reducer. This paint is normally reduced before usage with thinner (Du Pont 8034S acrylic enamel reducer) in the proportion of adding one gallon of thinner to two gallons of paint, but this reducer was not used. The precursor coating composition contained 39.4% solids fraction and 60.6% solvent fraction. The solvent fraction had the following composition and relative evaporation rates (butyl acetate=100):

| Solvent | Wt. % | RER |
|---|---|---|
| methyl ethyl ketone | 4.4% | 631 |
| toluene | 25.0% | 240 |
| VM&P naptha | 6.8% | 200 |
| butyl acetate | 3.0% | 100 |
| xylene | 49.3% | 70 |
| methyl propasol acetate | 11.5% | 34 |
| Total | 100.0% | |
| Overall Heat of Vap. | 82.0 cal/gm | |

The precursor coating composition had the following properties:

| | |
|---|---|
| Solvent content | 562 grams/liter |
| Relative evap. rate | 82 (butyl acetate = 100) |
| Viscosity | — centipoise |
| Weight solids | 39.4 percent |
| Liquid density | 928 grams/liter |

The solvent fraction had the following distribution of solvent by relative evaporation rate:

| | |
|---|---|
| <50 | 12% |
| 50 to 100 | 52% |
| 101 to 250 | 32% |
| >250 | 4% |

The admixed liquid mixture was sprayed using a Nordson A4B circulating airless hand spray gun model #152-200 with Nordson spray tip #0004/08, which has a 9-mil orifice size and an 8-inch fan width rating.

The precursor coating composition and carbon dioxide were pressurized, mixed, heated, and sprayed in the continuous mode. The admixed liquid mixture had a carbon dioxide content of 24.6%, which gave a single-phase solution. The spray temperature was 50 C. and the spray pressure was 1550 psi. Test panels were hand sprayed, flashed for a few minutes, and baked in an oven at temperature of 60 C.

for one hour. The coatings had the following average properties:

| Spray Pressure | Coating Thickness | 20-Degree Gloss | 60-Degree Gloss | DOI |
|---|---|---|---|---|
| 1550 psi | 1.37 mil | 10% | 41% | 5% |
| 1550 psi | 1.81 mil | 4% | 20% | 0% |
| 1550 psi | 2.09 mil | 4% | 18% | 0% |
| 1550 psi | 3.81 mil | 1% | 4% | 0% |

The coatings were very poor, having little or no gloss, because the paint was held mostly in a matrix of fine bubbles, which gave the coatings a sintered look. Where there were no bubbles, the coating was very mottled. The coatings were poorer at higher spray temperature. Because of the low fraction of slow solvent and the high fraction of fast solvent, insufficient solvent was present in the coating for it to flow together.

EXAMPLE 32

A precursor coating composition that gives a blue metallic acrylic enamel coating was prepared by 1) distilling 5638 grams of Du Pont Centari™ acrylic enamel B8292A medium blue metallic auto refinish paint to remove 1061 grams of fast solvent and 2) adding 1061 grams of slow solvent, namely, 836 grams of ethyl 3-ethoxypropionate (EEP) and 225 grams of butyl CELLOSOLVE™ acetate (BCA). This paint is normally reduced before usage with thinner (Du Pont 8034S acrylic enamel reducer) in the proportion of adding one gallon of thinner to two gallons of paint, but this reducer was not used. The precursor coating composition contained 39.4% solids fraction and 60.6% solvent fraction. The solvent fraction had the following composition and relative evaporation rates (butyl acetate=100):

| Solvent | Wt. % | RER |
|---|---|---|
| VM&P naptha | 5.3% | 200 |
| butyl acetate | 3.0% | 100 |
| xylene | 49.7% | 70 |
| methyl propasol acetate | 11.6% | 34 |
| EEP | 24.0% | 11 |
| butyl CELLOSOLVE ™ acetate | 6.4% | 3 |
| Overall Heat of Vap. | 76.1 cal/gm | |

The precursor coating composition had the following properties:

| Solvent content | 562 grams/liter |
|---|---|
| Relative evap. rate | 18 (butyl acetate = 100) |
| Viscosity | — centipoise |
| Weight solids | 39.4 percent |
| Liquid density | 928 grams/liter |

The solvent fraction had the following distribution of solvent by relative evaporation rate:

| <50 | 42% |
|---|---|
| 50 to 100 | 50% |
| 101 to 250 | 8% |
| >250 | 0% |

The admixed liquid mixture was sprayed using a Nordson A4B circulating airless hand spray gun with spray tip #0003/08, which has a 7-mil orifice size and an 8-inch fan width rating.

The precursor coating composition and carbon dioxide were pressurized, mixed, heated, and sprayed in the continuous mode. The admixed liquid mixture had a carbon dioxide content of 30.8%, which gave a single-phase solution. The spray temperature was 60° C. and the spray pressure was varied. Test panels were sprayed, flashed, and baked. The polymeric coatings were bubble free and uniform in gloss, color, and metallic appearance. The metallic particles were properly and uniformly laid down and oriented to reflect light. Because of the high fraction of slow solvent and the low fraction of fast solvent, enough solvent was present in the coating for it to flow together. The coatings had the following average properties:

| Spray Pressure | Coating Thickness | 20-Degree Gloss | 60-Degree Gloss | DOI |
|---|---|---|---|---|
| 1500 psi | 0.78 mil | 58% | 87% | 55% |
| 1500 psi | 0.79 mil | 50% | 85% | 55% |
| 1500 psi | 0.82 mil | 56% | 87% | 55% |
| 1500 psi | 0.89 mil | 58% | 87% | 60% |
| 1500 psi | 0.91 mil | 60% | 87% | 60% |
| 1700 psi | 0.78 mil | 56% | 86% | 55% |
| 1700 psi | 0.79 mil | 54% | 86% | 55% |
| 1700 psi | 0.84 mil | 57% | 87% | 55% |
| 2000 psi | 0.79 mil | 46% | 81% | 50% |
| 2000 psi | 0.79 mil | 51% | 85% | 55% |
| 2000 psi | 0.93 mil | 58% | 87% | 60% |
| 2000 psi | 0.94 mil | 58% | 87% | 55% |
| 2000 psi | 1.02 mil | 61% | 88% | 60% |
| 2000 psi | 1.43 mil | 59% | 87% | 60% |
| Air spray | 0.89 mil | 64% | 88% | 65% |
| Air spray | 1.19 mil | 68% | 88% | 60% |

For comparison, paint reduced with thinner was prepared by adding Du Pont 8034S Acrylic Enamel Reducer to the Du Pont Centari™ Metallic Paint in the proportion of one gallon of thinner to two gallons of paint. Test panels were sprayed by using a conventional air spray gun. The properties of the coatings are given above. The metallic appearance of the supercritical carbon dioxide sprayed coatings was more uniform than that of the air sprayed coatings.

EXAMPLE 33

A precursor coating composition that gives a clear air-dry alkyd coating was prepared by dissolving an alkyd resin with lesser amounts of acrylic and polyester resins in xylene, methyl isobutyl ketone (MIBK), mineral spirits, and other solvents. To the precursor coating composition was added 0.06% zirconium and 0.02% cobalt hardeners (based on resin weight) before s praying. The precursor coating composition contained 51.46% solids fraction and 48.54% solvent fraction, with the following component composition:

| alkyd resin | 3,711.9 g | 40.14% |
|---|---|---|
| acrylic resin | 713.8 g | 7.72% |
| polyester resin | 333.1 g | 3.60% |
| MIBK | 386.3 g | 4.18% |
| xylene | 2,032.5 g | 21.98% |
| n-butyl propionate | 138.0 g | 1.49% |
| methyl amyl ketone | 386.3 g | 4.18% |
| n-pentyl propionate | 138.0 g | 1.49% |
| mineral spirits | 1,407.1 g | 15.22% |
| Total | 9,247.0 g | 100.00% |

The solvent fraction had the following composition and relative evaporation rates (butyl acetate=100):

| Solvent | Grams | Wt. % | RER |
|---|---|---|---|
| MIBK | 386.3 g | 8.61% | 162 |
| xylene | 2,032.5 g | 45.29% | 70 |
| n-butyl propionate | 138.0 g | 3.07% | 45 |
| methyl amyl ketone | 386.3 g | 8.61% | 40 |
| n-pentyl propionate | 138.0 g | 3.07% | 18 |
| mineral spirits | 1,407.1 g | 31.35% | 12 |
| Overall Heat of Vap. | | 77.9 cal/gm | |

The precursor coating composition had the following properties:

| | | |
|---|---|---|
| Solvent content | 467 | grams/liter |
| Relative evap. rate | 26 | (butyl acetate = 100) |
| Viscosity | 240 | centipoise |
| Weight solids | 51.46 | percent |
| Liquid density | 964 | grams/liter |
| $CO_2$ solubility | 0.385 | percent (1 atmosphere) |
| Polymer Mixture | | |
| Molecular weight | 25,550 | weight average (Mw) |
| Molecular weight | 1,710 | number average (Mn) |
| Mw/Mn | 14.91 | |

The solvent fraction had the following distribution of solvent by relative evaporation rate:

| | |
|---|---|
| <50 | 46% |
| 50 to 100 | 45% |
| 101 to 250 | 9% |
| >250 | 0% |

The admixed liquid mixture was sprayed using a Nordson CA-1 circulating electrostatic airless automatic spray gun with a spray tip #017-024, which has an 11-mil orifice size and an 8-inch fan width rating.

The precursor coating composition and carbon dioxide were pressurized, mixed, heated, and sprayed in the continuous mode. An admixed liquid mixture with a carbon dioxide content of 30.5% was sprayed at a temperature of 69 C. and pressure of 1600 psi. This was below the carbon dioxide solubility limit, because no bubbles were present, but it was presumably above the solubility limit of part of the high molecular weight fraction of the polymer mixture in the precursor coating composition, because the admixed liquid mixture had a milky appearance but turned clear at lower carbon dioxide content. Gas bubbles were present at higher carbon dioxide content. Panels were sprayed using a Spraymation automatic sprayer, flashed, and air dried. The polymeric coatings were clear, glossy, coherent, smooth, and bubble free. Very thick coatings could be applied by either applying a single coat, by using a low spray gun traverse speed, or by applying two coats, by using a higher traverse speed, with little apparent difference in the coatings obtained. Thick coatings up to 5.0 mil dry film thickness (9 mil wet film thickness) could be applied without appreciable sag occuring, although orange peel was more noticeable in the thickest coatings. Thinner coatings could also be applied. The coatings had the following properties:

| Coating Thickness | 20-Degree Gloss |
|---|---|
| 3.5 mil | 86% |
| 3.7 mil | 88% |
| 4.3 mil | 85% |
| 5.0 mil | 84% |

EXAMPLE 34

(COMPARISON EXAMPLE)

This example is not in accordance with the present invention inasmuch as the viscosity of the composition is too high (12,000 cps) and there is not enough slow solvent utilized.

A precursor coating composition that gives a clear air-dry alkyd coating was prepared by dissolving an alkyd resin with lesser amounts of acrylic and polyester resins in xylene and mineral spirits. To the precursor coating composition was added 0.06% zirconium and 0.02% cobalt hardeners (based on resin weight) before spraying. The precursor coating composition contained 52.90% solids fraction and 47.10% solvent fraction, with the following component composition:

| | | |
|---|---|---|
| alkyd resin | 1,650.5 g | 41.26% |
| acrylic resin | 317.4 g | 7.94% |
| polyester resin | 148.1 g | 3.70% |
| xylene | 1,375.3 g | 34.38% |
| mineral spirits | 508.7 g | 12.72% |
| Total | 4,000.0 g | 100.00% |

The solvent fraction had the following composition and relative evaporation rates (butyl acetate=100):

| Solvent | Grams | Wt. % | RER |
|---|---|---|---|
| xylene | 1,375.3 g | 73.00% | 70 |
| mineral spirits | 508.7 g | 27.00% | 12 |

The precursor coating composition had the following properties:

| | | |
|---|---|---|
| Solvent content | 460 | grams/liter |
| Relative evap. rate | 30 | (butyl acetate = 100) |
| Viscosity | 12,000 | centipoise |
| Weight solids | 52.90 | percent |
| Liquid density | 977 | grams/liter |

The solvent fraction had the following distribution of solvent by relative evaporation rate:

| | |
|---|---|
| <50 | 27% |
| 50 to 100 | 73% |
| 101 to 250 | 0% |
| >250 | 0% |

The admixed liquid mixture was sprayed using a Binks model #560 automatic airless spray gun with a Spraying Systems spray tip #500011 with a minimum cavity insert, which has a 9-mil orifice size and an 8-inch fan width rating.

The precursor coating composition and carbon dioxide were pressurized, mixed, heated, and sprayed in the continuous mode. An admixed liquid mixture with a carbon dioxide content of 30% was sprayed at a temperature of 60 C. and at various pressures. This was below the carbon dioxide solubility limit, because no bubbles were present, but it was presumably above the solubility limit of part of the high molecular weight fraction of the polymer mixture in the precursor coating composition, because the admixed liquid mixture had a milky appearance but turned clear at lower carbon dioxide content. Gas bubbles were present at higher carbon dioxide content. Panels were sprayed using a Spraymation automatic sprayer, flashed, and air dried. The polymeric coatings were of poor quality because of the very high viscosity of the precursor coating composition. The coatings had low gloss, contained tiny bubbles, and the surface was marred by numerous pits that were left as bubbles broke through the surface during drying as the coating shrank in thickness. Thin coats (below 3 mil) could not be sprayed because the coating was too viscous to flow together except in a thick layer. The coatings had the following properties:

| Pressure | Coating Thickness | 20-Degree Gloss |
| --- | --- | --- |
| 1500 psi | 5.4 mil | 52% |
| 1600 psi | 6.4 mil | 64% |
| 1700 psi | 4.7 mil | 43% |
| 1700 psi | 5.0 mil | 47% |
| 1700 psi | 5.5 mil | 51% |
| 1700 psi | 5.8 mil | 52% |
| 1700 psi | 8.0 mil | 60% |

What is claimed is:

1. A precursor coating composition suitable for admixture with at least one supercritical fluid which admixture is then to be sprayed comprising a liquid mixture of:
   (a) a solids fraction containing at least one polymeric compound capable of forming a coating on a substrate; and
   (b) a solvent fraction containing at least one solvent in which said as least one polymeric compound is at least partially soluble, said solvent fraction having a composition containing a weight % solvent distribution and relative evaporation rates of:

| Wt % of Total Solvent Fraction | RER |
| --- | --- |
| 30–100% | <50 |
| 0–70% | 50–100 |
| 0–40% | 101–250 |
| <10% | >250; | said liquid mixture having:
   (i) a viscosity of less than about 6000 centipoise and having less than about 400 grams of solvent fraction per liter of mixture;
   (ii) a solubility with at least one supercritical fluid, above the critical temperature and pressure of the supercritical fluid, of greater than 5% by weight of supercritical fluid in said mixture;
   (iii) a viscosity of less than about 300 centipoise when admixed with a sufficient amount of the at least one supercritical fluid, above the critical temperature and pressure of the supercritical fluid, so as to render the mixture suitable for spray application; and
   (iv) a solubility with the supercritical fluid in the non-supercritical state, at 25° C. and one atmosphere absolute pressure of said fluid, of less than about 0.8% by weight of fluid in said mixture.

2. The precursor composition of claim 1, wherein the at least one polymeric compound is selected from the group consisting of thermoplastic resins, thermosetting resins, crosslinkable film forming systems, and mixtures thereof.

3. The precursor composition of claim 2, wherein said at least one polymeric compound is selected from the group consisting of enamels, varnishes, lacquers, acrylic resins, vinyl resins, styrenic resins, polyesters, alkyds, polyurethanes, urethanes, epoxies, phenolics, cellulosic esters, amino resins, natural gums, natural resins, and interpolymers and mixtures thereof.

4. The precursor composition of claim 1, wherein the weight average molecular weight of the polymeric compound is less than about 100,000.

5. The precursor composition of claim 4, wherein the weight average molecular weight of the polymeric compound is less than about 50,000.

6. The precursor composition of claim 5, wherein the weight average molecular weight of the polymeric compound is less than about 25,000.

7. The precursor composition of claim 1 further comprising pigments, pigment extenders, metallic flakes, fillers, drying agents, anti-foaming agents, anti-skinning agents, wetting agents, ultraviolet absorbers, cross-linking agents, and mixtures thereof.

8. The precursor composition of claim 1 having a solvent fraction composition of:

| Wt % of Total Solvent Fraction | RER |
| --- | --- |
| 40–100% | <50 |
| 0–60% | 50–100 |
| 0–30% | 101–250 |
| <5% | >250. |

9. The precursor composition of claim 1, wherein the solvent fraction has a surface tension at 25° C. of less than about 35 dynes/cm.

10. The precursor composition of claim 9, wherein the solvent fraction has a surface tension at 25° C. of less than about 30 dynes/cm.

11. The precursor composition of claim 9, wherein the solvent fraction has a surface tension at 25° C. of between about 23 to 28 dynes/cm.

12. The precursor composition of claim 1, wherein the solvent fraction has a heat of vaporization of less than about 110 calories/gm of solvent fraction.

13. The precursor composition of claim 12, wherein the solvent fraction has a heat of vaporization of less than about 100 calories/gm of solvent fraction.

14. The precursor composition of claim 12, wherein the solvent fraction has a heat of vaporization of between about 65 to about 95 calories/gm of solvent fraction.

15. The precursor composition of claim 1, wherein the at least one solvent is selected from the group consisting of ketones, esters, ethers, glycol ethers, glycol ether esters, alcohols, aromatic hydrocarbons, aliphatic hydrocarbons, nitroalkanes, unsaturated hydrocarbons, halocarbons, and mixtures thereof.

16. The precursor composition of claim 1 having an apparent gas diffusion rate of between about 7 to about 26 grams of supercritical fluid per gram of precursor composition per second at 25° C. and one atmosphere of pressure.

17. The precursor composition of claim 1, wherein the viscosity of the liquid mixture is less than about 3,000 centipoise.

18. The precursor composition of claim 17, wherein the viscosity of the liquid mixture is about 500 to 2,000 centipoise.

19. The precursor composition of claim 1, wherein the liquid mixture has about 200 to about 400 grams of solvent per liter of mixture.

20. The precursor composition of claim 1 which is sprayed with supercritical carbon dioxide fluid.

21. The precursor composition of claim 1 which is sprayed with supercritical nitrous oxide fluid.

22. The precursor composition of claim 1, wherein the solubility of the supercritical fluid, above the critical temperature and pressure of the supercritical fluid, is greater than about 15% by weight of supercritical fluid in said liquid mixture.

23. The precursor composition of claim 22, wherein the solubility of the supercritical fluid, above the critical temperature and pressure of the supercritical fluid, is between about 20% to about 50% by weight of supercritical fluid in said liquid mixture.

24. The precursor composition of claim 22, wherein the solubility of the supercritical fluid, above the critical temperature and pressure of the supercritical fluid is between about 25% to about 35% by weight of supercritical fluid in said liquid mixture.

25. The precursor composition of claim 1 having a viscosity of 5 to 150 centipoise when admixed with supercritical fluid.

26. The precursor composition of claim 25 having a viscosity of 10 to 50 centipoise when admixed with supercritical fluid.

27. The precursor composition of claim 1 having a solubility with the supercritical fluid in the non-supercritical state, at 25° C. and one atmosphere absolute pressure of said fluid, of less than about 0.6% by weight of fluid in said mixture.

28. The precursor composition of claim 27, having a solubility with the supercritical fluid in the non-supercritical state, at 25° C. and one atmosphere absolute pressure of said liquid, of less than about 0.4% by weight of fluid in said mixture.

29. The precursor composition of claim 1, wherein the predominant polymeric compound has a Mw/Mn ratio of less than about 4.

30. The precursor composition of claim 29, wherein the predominant polymeric compound has a Mw/Mn ratio of less than about 3.

31. The precursor composition of claim 29, wherein the polymeric compound has a Mw/Mn ratio of less than about 2.

32. A precursor coating composition suitable for admixture with supercritical carbon dioxide which admixture is then to be sprayed comprising a liquid mixture of:
  (a) a solids fraction containing at least one polymeric compound capable of forming a coating on a substrate; and
  (b) a solvent fraction containing at least one solvent in which said at least one polymeric compound is at least partially soluble, said solvent fraction having a composition containing a weight % solvent distribution and relative evaporation rates of:

| Wt % of Total Solvent Fraction | RER |
|---|---|
| 30–100% | <50 |
| 0–70% | 50–100 |
| 0–40% | 101–250 |
| <10% | >250; |

(i) a viscosity of less than about 6000 centipoise and having less than about 400 grams of solvent fraction per liter of mixture;
  (ii) a solubility with supercritical carbon dioxide, above the critical temperature and pressure of the supercritical carbon dioxide, of greater than 5% by weight of supercritical carbon dioxide in said mixture;
  (iii) a viscosity of less than about 300 centipoise when admixed with a sufficient amount of the at least one supercritical carbon dioxide, above the critical temperature and pressure of the supercritical carbon dioxide, so as to render the mixture suitable for spray application; and
  (iv) a solubility with the carbon dioxide in its non-supercritical state, at 25° C. and one atmosphere absolute pressure of carbon dioxide, of less than about 0.8% by weight of carbon dioxide in said mixture.

* * * * *